United States Patent
Muller

(10) Patent No.: US 8,271,962 B2
(45) Date of Patent: Sep. 18, 2012

(54) SCRIPTED INTERACTIVE SCREEN MEDIA

(76) Inventor: Brian Muller, Berkeley, CA (US)

( * ) Notice: Subject to any disclaimer, the term of this patent is extended or adjusted under 35 U.S.C. 154(b) by 1157 days.

(21) Appl. No.: 11/852,673

(22) Filed: Sep. 10, 2007

(65) Prior Publication Data

US 2008/0300053 A1 Dec. 4, 2008

Related U.S. Application Data

(60) Provisional application No. 60/844,045, filed on Sep. 12, 2006.

(51) Int. Cl.
  *G06F 9/44* (2006.01)
  *G06F 9/45* (2006.01)
  *G06F 9/445* (2006.01)
(52) U.S. Cl. ......... 717/135; 717/134; 717/138; 717/169
(58) Field of Classification Search ................... None
  See application file for complete search history.

(56) References Cited

U.S. PATENT DOCUMENTS

2008/0127065 A1* 5/2008 Bryant et al. ................ 717/109

OTHER PUBLICATIONS

Who are the Write Brothers? Write Brothers, Inc. [online] Retrieved on Sep. 15, 2008. Retrieved from the internet: <URL: http://www.write-bros.com/about/writebrothers/index.html>.
Write Brothers, Inc.—Movie Magic Screenwriter 6. [online] Retrieved on Sep. 15, 2008. Retrieved from the internet: <URL: http://www.screenplay.com/p-29-movie-magic-screenwriter-6.aspx>.
Write Brothers, Inc.—Story View. [online] Retrieved on Sep. 15, 2008. Retrieved from the Internet: <URL: http://www.screenplay.com/p-32-storyview.aspx>.
Write Brothers, Inc.—Dramatica Pro. [online] Retrieved on Sep. 15, 2008. Retrieved from the internet: <URL: http://www.screenplay.com/p-13-dramatica-pro.aspx>.
Final Draft—About Us. [online] Retrieved on Sep. 15, 2008. Retrieved from the internet: <URL: http://www.finaldraft.com/company/about-us.php>.
Final Draft—Final Draft Features. [online] Retrieved on Sep. 15, 2008. Retrieved from the internet: <URL: http://www.finaldraft.com/products/final-draft/>.
Final Deaft—Final Draft AV, Features. [online] Retrieved on Sep. 15, 2008. Retrieved from the internet: <URL: http://www.finaldraft.com/products/final-draft-av/>.
Welcome to the New Dollhouse—New York Times. [online] Retrieved on Sep. 15, 2008. Retrieved from: <URL: http://www.nytimes.com/2006/05/07/arts/07schi.html?_r=1&pagewanted=print&oref=slogin>.
Unreal Game Engine by Epic Games. [online] Retrieved on Sep. 15, 2008. Retrieved from <URL: http://unrealtechnology.com/features.php?ref=past-versions>.
Terzopoulos, Demetri. "Artificial Life for Computer Graphics." Communications of the ACM. vol. 42 , No. 8 (Aug. 1999), pp. 33-41.
Shao, Wei, Terzopoulos, Demetri. "Autonomous Pedestrians" Proceedings of the 2005 ACM SIGGRAPH/Eurographics symposium on Computer animation, Los Angeles, California, Jul. 29-31, 2005.

(Continued)

*Primary Examiner* — Chuck Kendall

(57) ABSTRACT

Input from a text editor containing lines of text of a script is received, commands to control objects in a simulation are identified in the lines of text in the editor, a state of the simulation is updated in accordance with the input and the commands, and the simulation is displayed in a graphical display. A computer program enables a user to walk around in a simulation, with the events in the simulation determined by pre-written scripts.

40 Claims, 83 Drawing Sheets

OTHER PUBLICATIONS

Funge et al. "Cognitive Modeling: Knowledge, Reasoning and Planning for Intelligent Characters" Proceedings of the 26th annual conference on Computer graphics and interactive techniques, (Jul. 1999) pp. 29-38.

Machinima, Wikipedia, the free encyclopedia. [online] Retrieved Nov. 5, 2008. Retrieved from: <URL: http://en.wikipedia.org/wiki/Machinima>.

Second Life, What is a Second Life? [online] Retrieved Sep. 26, 2008. Retrieved from: <URL: http://secondlife.com/whatis/>.

Artificial Life, Wikipedia, the free encyclopedia. [online] Retreived Nov. 5, 2008. Retreived from: <URL: http://en.wikipedia.org/wiki/Artificial_life>.

The Sims2.com, PC Platform. [online] Retrieved Nov. 7, 2008. Retrieved from: <URL: http://thesims2.ea.com/about/index.php?pid=pcgames>.

* cited by examiner

Grammar for Scripting Language defining commands at iterations of a UPDATE CYCLE.

script::= integer '\n' statement {'\n' statement}
statement::= command '.' {command '.'} | <null>  } 1302

EXAMPLES: ⎯⎯ 1304
script1 = "10\nBob sits.\nBob stands.\nBob waves.";
result: "Bob sits" command is executed at iteration #10 of UPDATE CYCLE.
  "Bob stands" command is executed at iteration #11 of UPDATE CYCLE. } 1310
  "Bob waves" command is executed at iteration #12 of UPDATE CYCLE.

⎯⎯ 1306
script2 = "50\nBob sits.\n\n\n\n\n\n\n\nBob stands.\nBob waves."
result: "Bob sits" command is executed at iteration #50 of of UPDATE CYCLE.
  "Bob stands" command is executed at iteration #59 of UPDATE CYCLE. } 1312
  "Bob waves" command is executed at iteration #60 of UPDATE CYCLE.

⎯⎯ 1308
script3 = "5\nFred waves. Bob waves.\n\n\n\n\n"
result: "Fred waves" command is executed at iteration#5 of UPDATE CYCLE.
  "Bob waves" command is also executed at iteration#5 of UPDATE CYCLE. } 1314

FIG. 13A

Controlling program execution of an UPDATE CYCLE using the user's input position in in a scripting language.

script::= integer '\n' statement {'\n' statement}
statement::= command '.' {command '.'} | <null>  } 1302 user's typing position (cursor) ⎯⎯ 128
↓
script1 = "50\nBob sits.\n\n\n\n\n\n\n\nBob stands.\nBob waves." ⎯⎯ 1306
result: program execution paused after 50 iterations. ⎯⎯ 1316 user's typing position (cursor) ⎯⎯ 128
                   ↓
script1 = "50\nBob sits.\n\n\n\n\n\n\n\nBob stands.\nBob waves." ⎯⎯ 1306
result: program executes 10 iterations and is paused after 60 iterations.
⎯⎯ 1318 user's typing position (cursor) ⎯⎯ 128
        ↓
script1 = "50\nBob sits.\n\n\n\n\n\n\n\nBob stands.\nBob waves." ⎯⎯ 1306
result: program's state restored to state it held after 55 iterations and paused. ⎯⎯ 1320

FIG. 13B

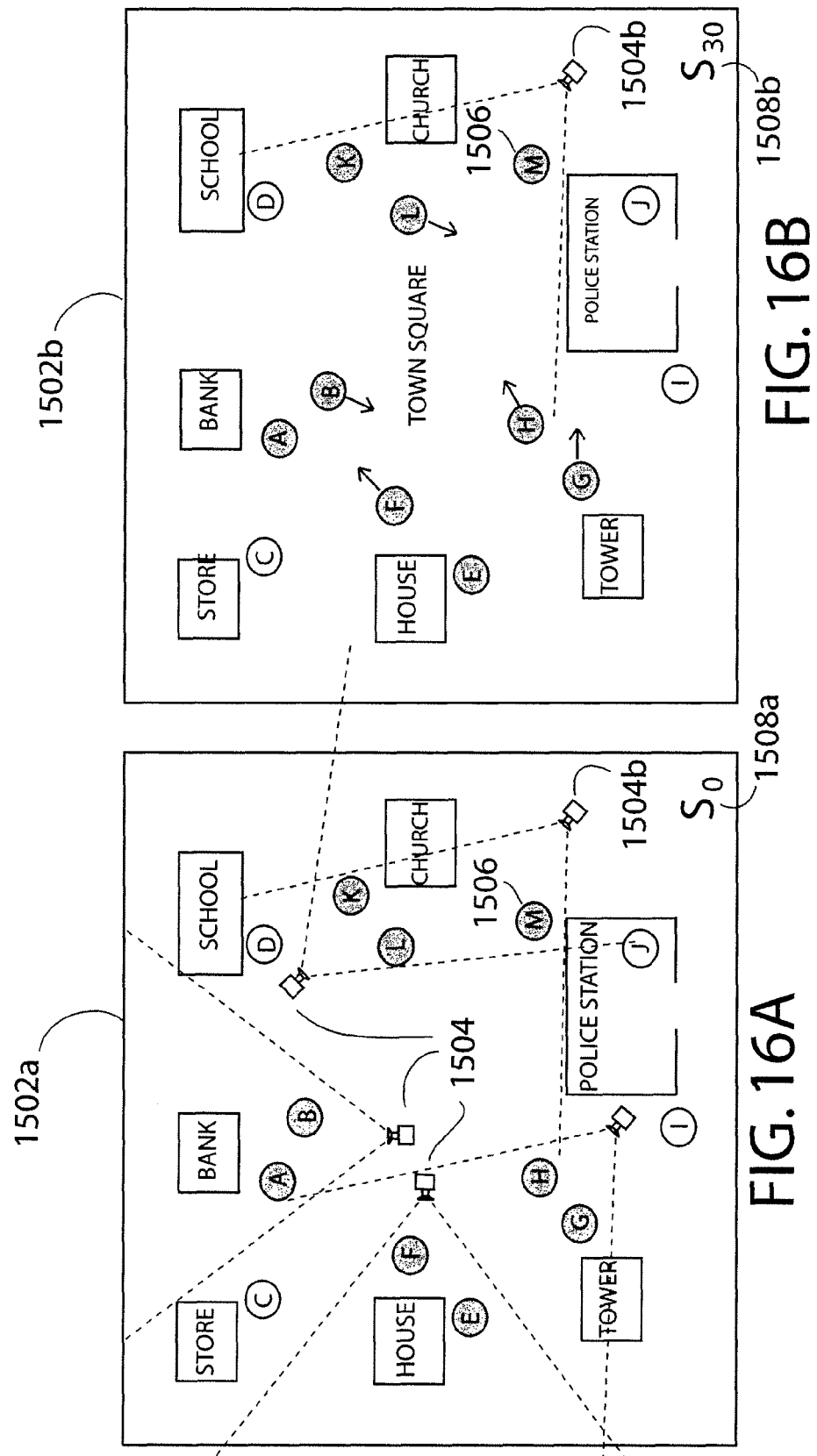

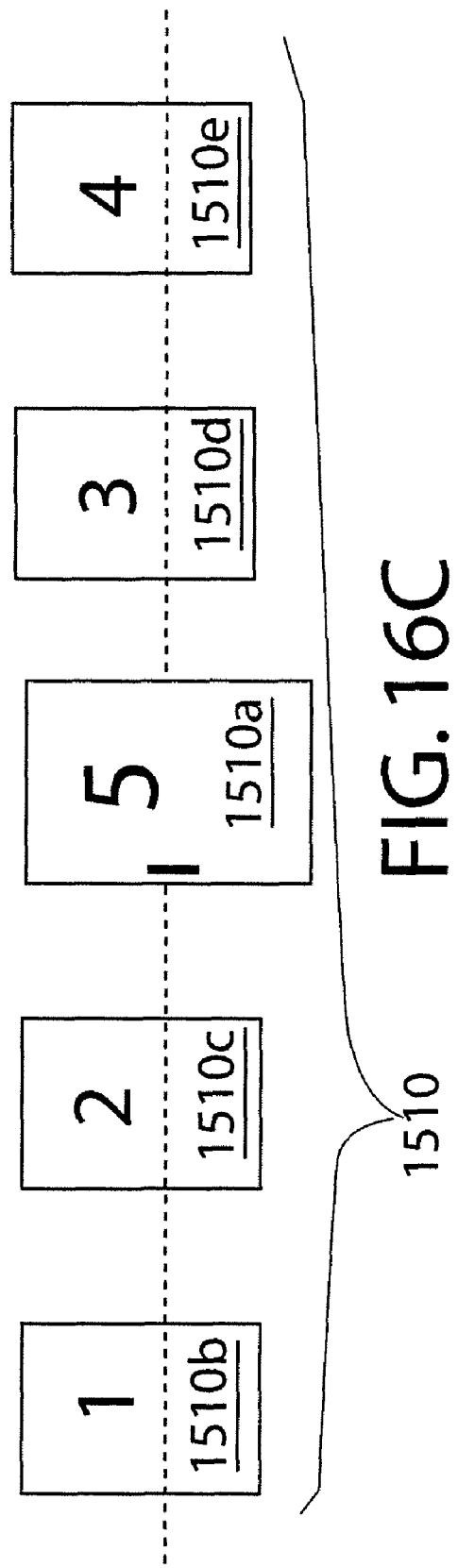

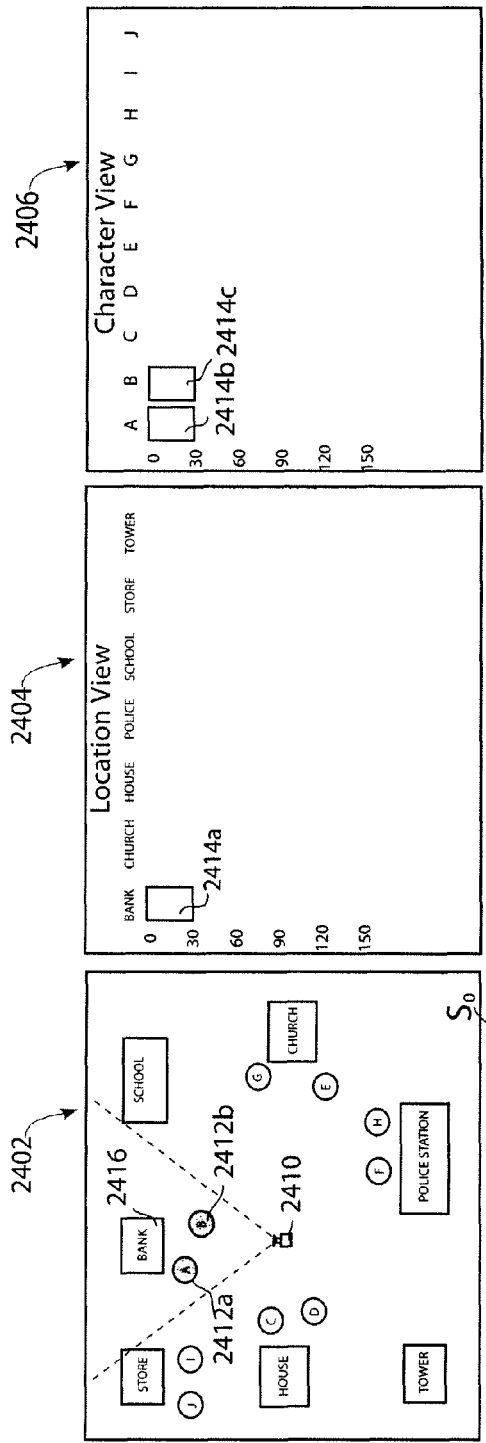
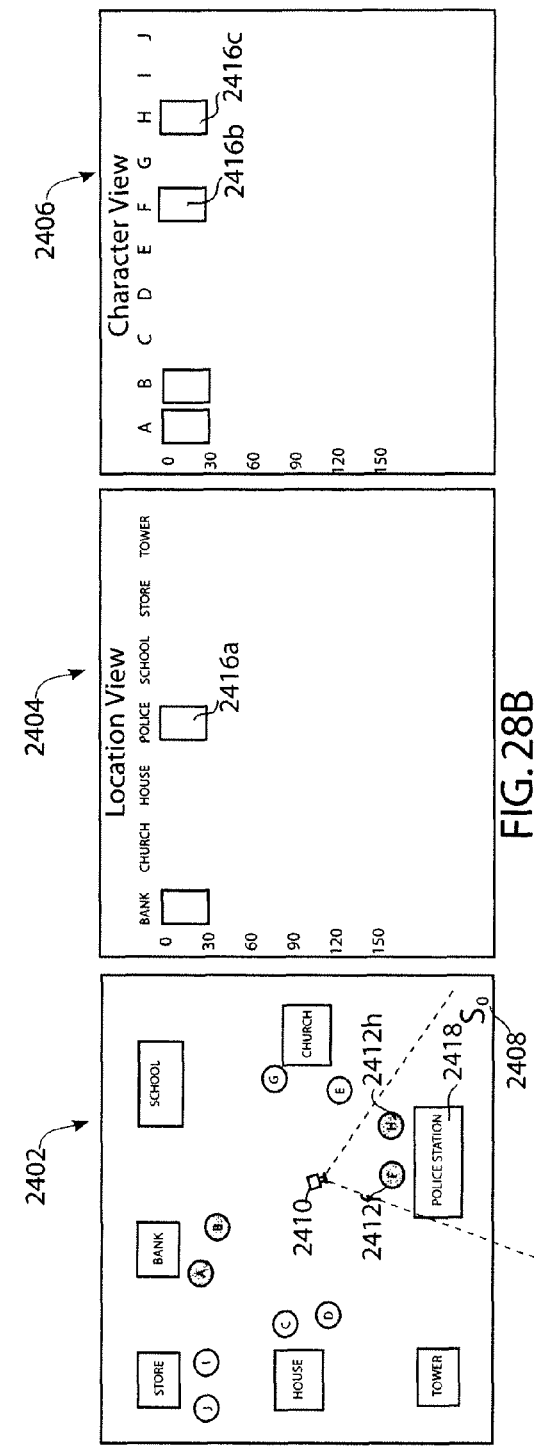
FIG. 28A
FIG. 28B

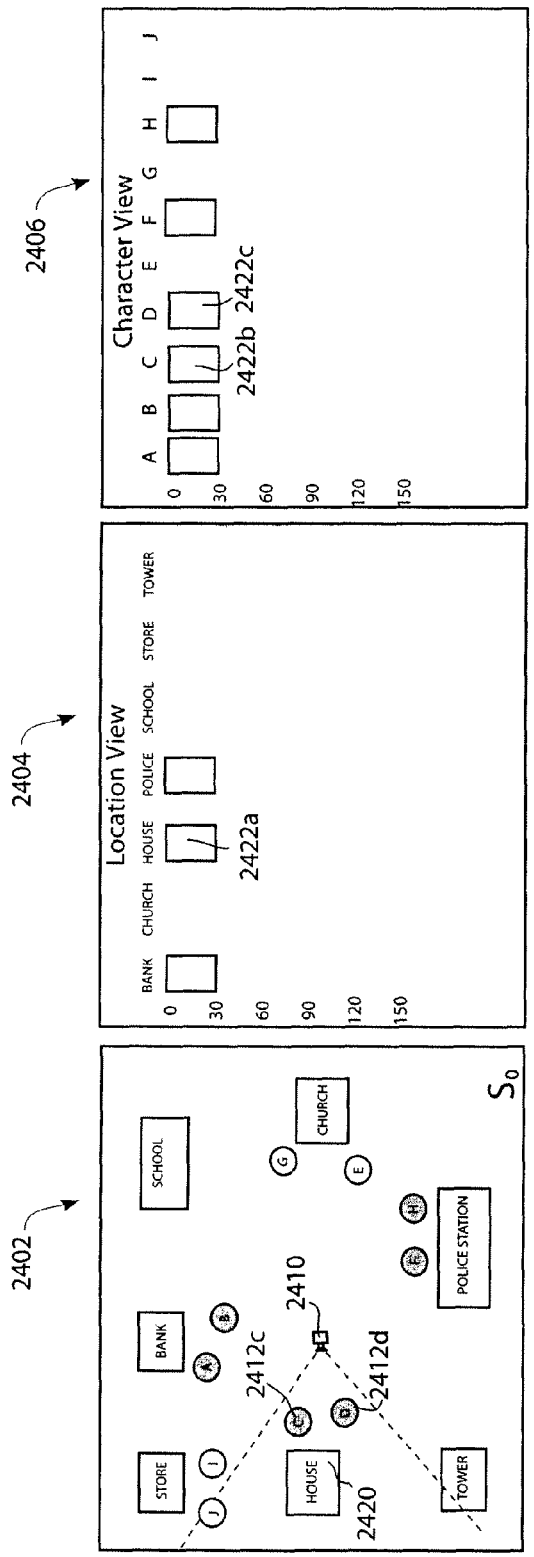
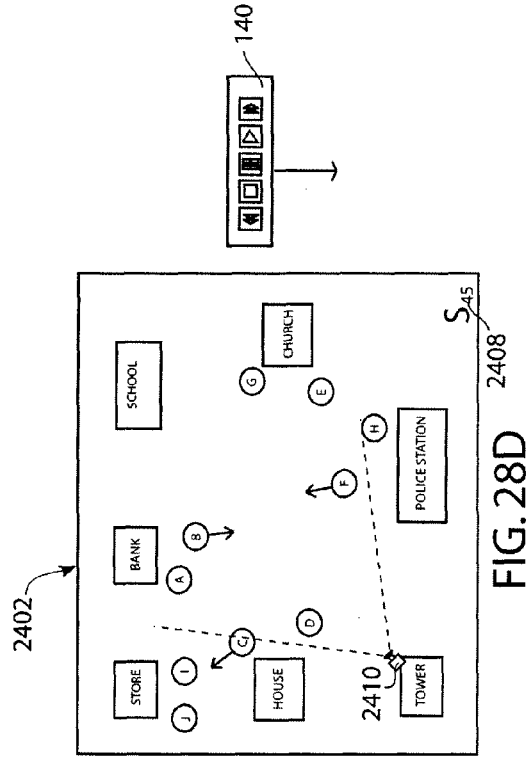
FIG. 28C
FIG. 28D

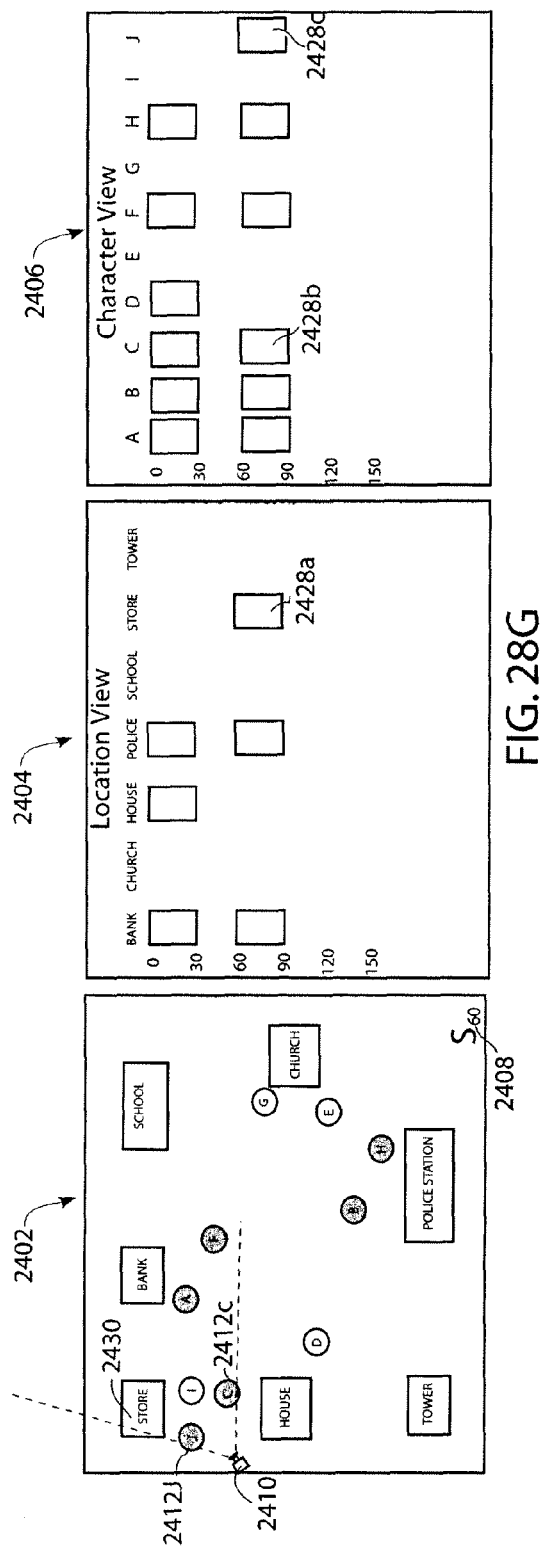
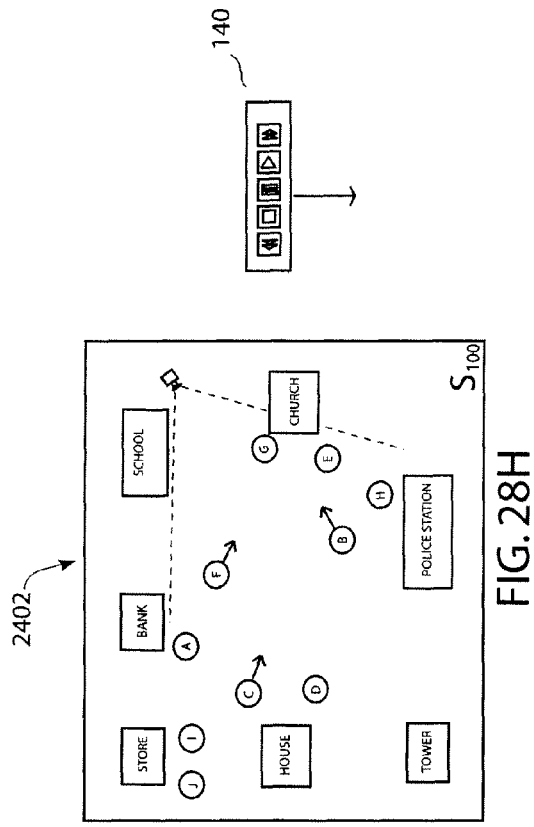
FIG. 28G
FIG. 28H

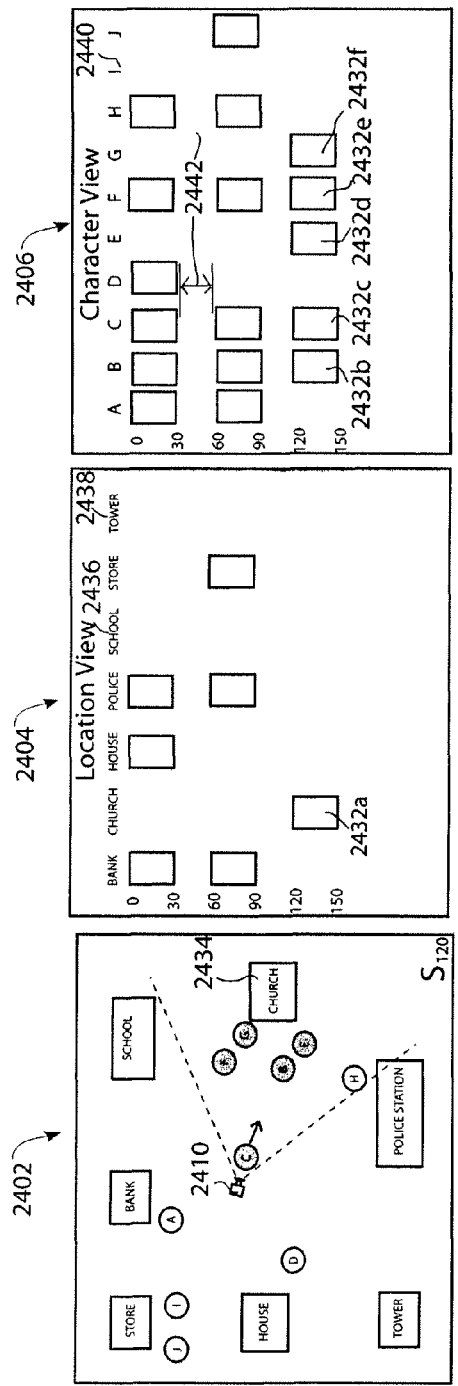

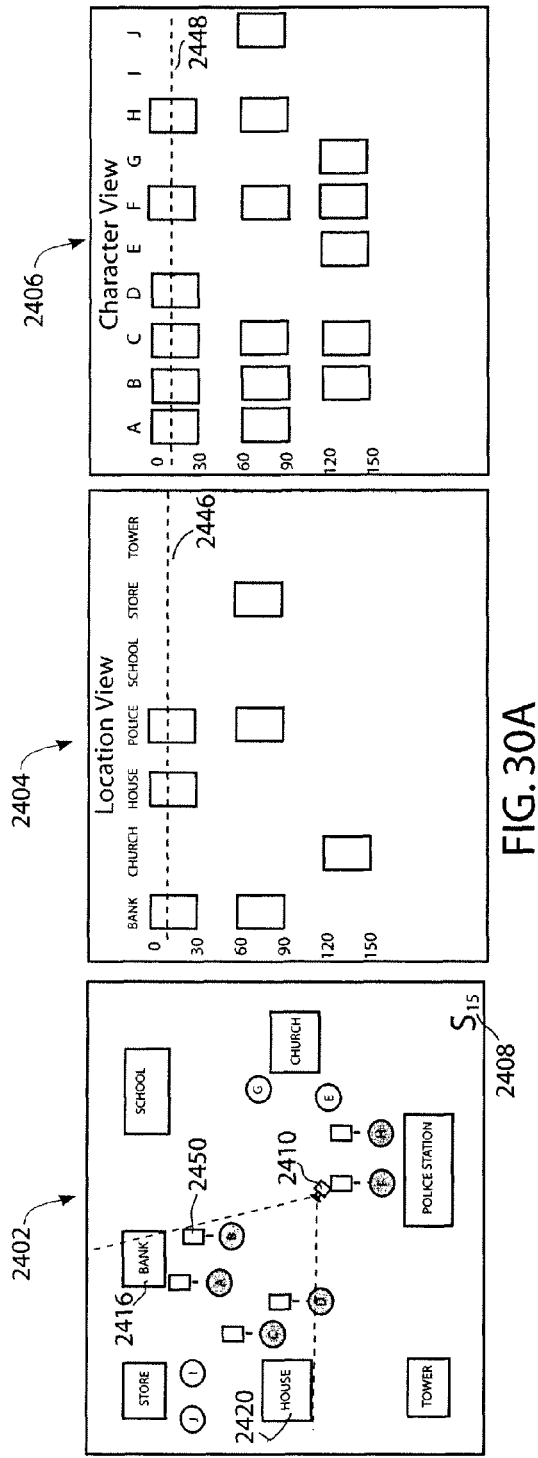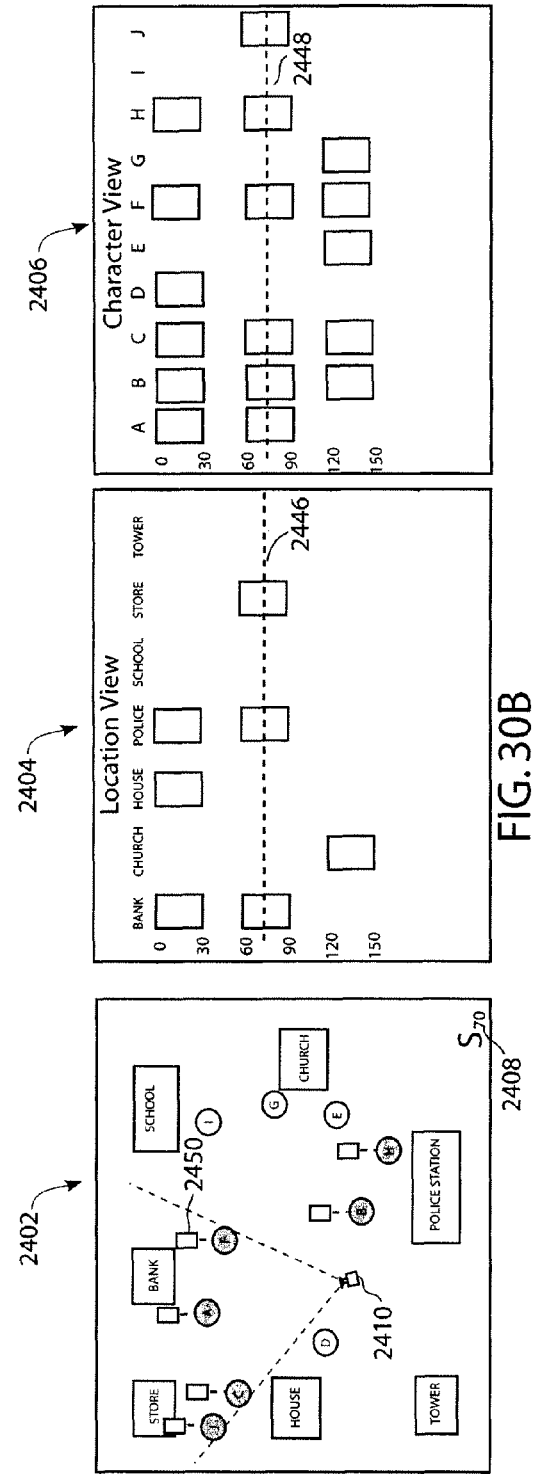
FIG. 30A
FIG. 30B

SCRIPTED INTERACTIVE SCREEN MEDIA

RELATED APPLICATIONS

This application claims priority to U.S. Provisional Application Ser. No. 60/844,045, filed on Sep. 12, 2006, the contents of which are incorporated herein in their entirety.

TECHNICAL FIELD

This disclosure relates to scripting interactive screen media.

BACKGROUND

Video games are examples of an interactive screen medium. Films, or motion pictures, are examples of a non-interactive screen medium. In a video game, the viewer controls the camera and, by interaction, controls the content. In motion pictures, the viewer controls neither the camera nor the content.

SUMMARY

In general, in one aspect, input from a text editor containing lines of text of a script is received, commands to control objects in a simulation are identified in the lines of text in the editor, a state of the simulation is updated in accordance with the input and the commands, and the simulation is displayed in a graphical display.

Implementations may include one or more of the following. Each line of text in the script is dynamically associated with a distinct increment of time in the simulation. Increments of time in the simulation correspond to iterations of an update loop process. Each identified command is associated with an increment of time in the simulation associated with the line of text containing the command. Displaying the simulation includes displaying a rendered image of the objects in the simulation showing a state of each object at an increment of time in the simulation associated with an active line of text. The input includes activation of or changes to lines of text corresponding to increments of time in the simulation, and displaying the simulation also includes simultaneously with receiving the input from the text editor, displaying a sequence of rendered images corresponding to the state of the simulation at the increments of time corresponding to the active or changed lines. Updating the state includes receiving an indication that the input made a particular line of text active, and updating a state of each object in the simulation to the object's state at an increment of time in the simulation associated with the active line. The indication includes a cursor position corresponding to the particular line of text. Updating the state includes receiving an indication that the input changed a command in a particular line of text, identifying an object in the simulation affected by the changed command, and applying the changed command to the identified object to update a state of the object at an increment of time in the simulation associated with the line containing the changed command. The object is a camera, and applying the command includes changing a point of view from which the display of the simulation is rendered. Updating the state includes receiving an indication that the input inserted a new line of text before a first line of text, and increasing an increment of time in the simulation associated with the first line of text. Updating the state includes receiving an indication that the input deleted a first line of text, and decreasing an increment of time in the simulation associated with lines of text subsequent to the first line.

Input is received from the graphical display that a user has selected an object in the simulation, lines of text in the script associated with the selected object are identified and associated with an increment of time of the simulation corresponding to the state of the simulation displayed at the time the selection was made, and the identified lines of text are provided to the text editor. Lines of the script are associated with objects in the simulation, the script is associated with a start time corresponding to a first increment of time in the simulation, the script is associated with an end time corresponding to a second increment of time in the simulation, and in the display of the simulation, displayed objects associated with lines of the script and associated with increments of time in the simulation greater than the start time and less than the end time are highlighted. Associating the script with an end time includes identifying a duration of the script and adding a number of increments of time in the simulation corresponding to the duration to the increment of time corresponding to the start time. Input is received from the text editor selecting a second script, the state of the simulation is updated to a state associated with a start time of the second script, and a rendered image of the simulation is displayed at the updated state from a point of view defined by a camera object associated with the second script. The script including the lines of text in the text editor is a first script, commands to control objects in the simulation are identified in lines of a second script, and the state of the simulation is updated in accordance with the input and with the commands identified in the second script. The second script is loaded in a second text editor and input is received from the second text editor. Windows are automatically arranged displaying the first and second text editors with the first and second scripts displayed so that lines in each script corresponding to a common increment of time are displayed at a common position in each text editor. Lines of text of each of the first and second scripts are associated with objects in the simulation, each of the first and second scripts is associated with first and second start times respectively corresponding to first and second increments of time in the simulation, each of the first and second scripts is associated with first and second end times respectively corresponding to third and fourth increment of time in the simulation, and in the graphical display, displayed objects associated with lines of either the first or the second scripts and associated with increments of time in the simulation greater than the first or second start time and less than the corresponding first or second end time are highlighted.

In general, in one aspect, input is received from a text editor containing lines of text of a first script, first commands to control objects in a simulation are identified in the lines of text in the editor, second commands to control the objects in the simulation are identified in lines of text of a second script, a state of the simulation is updated in accordance with the input and the first and second commands, and the simulation is displayed in a graphical display.

In general, in one aspect first commands to control first objects in a simulation are identified in lines of a first script, second commands to control second objects in the simulation are identified in lines of a second script, a state of the simulation is updated in accordance with the first and second commands.

Implementations may include one or more of the following features. Updating the state of the simulation includes, for each first object and each second object, applying the respective first and second commands applicable to the object to a software agent representing the object. Associating each line of text in each of the first and second scripts with a distinct increment of time in the simulation. Increments of time in the simulation correspond to iterations of an update loop process. Displaying, in a graphical display, a rendered image of a set of the objects in the simulation showing a state of each object in the set at a common increment of time in the simulation. Showing the state of each object in the set includes, for each first object in the set and each second object in the set, showing the object in a state updated in accordance with commands in lines of text in the respective first and second scripts associated with the common increment of time. Associating each identified command with an increment of time in the simulation associated with the line of text in the first or second script containing the command. Determining a state of the simulation at an increment of time N. Determining the state of the simulation at time N includes updating a state of each first and second object according to the cumulative effects of commands associated with each increment of time earlier than and including time N. Updating the states of the objects includes, for each line of text L in the first or second script associated with an increment of time prior to time N, updating the state of each objects from that object's state at the previous increment of time according to commands identified in line L, and updating the states of the objects according to commands identified in a line corresponding to the time N. Displaying a sequence of three-dimensional rendered images in the graphical display. Each image in the sequence corresponds to a successive increment of time in the simulation. The common increment of time is an increment of time N, and displaying the rendered image includes determining the state of each object in the set at the time N, and generating three-dimensional rendered representations of the objects of the set at the increment of time N according to the determined states. The set includes each object referenced in a line of text in either of the first or second script within a set of lines of text in proximity to a line corresponding to the increment of time N.

Associating each identified command with the increment of time associated with its line of text in the corresponding first or second script includes associating a first line of text in the corresponding script with an increment of time T, assigning each increment of time a duration S, and for each line of text L in the corresponding script, associating the commands in line L with an increment of time $N=T+S\times L$. For each time step in the simulation associated with a line of text in either the first or second script, updating a state of the simulation according to the respective first or second commands in the line of text, and storing to a memory a state of the simulation for at least one of the time steps. For a time step in the simulation not associated with a line of text, updating a state of an object in the simulation to account for differences in the state of the object between a previous time step and a later time step. Associating a first camera having a first point of view in the simulation with the first script, associating a start time with the first script, associating a duration with the first script, restoring the state of the simulation to a saved state representing the state at the start time, and rendering a first sequence images of the simulation from the first point of view, the sequence corresponding to a sequence of states of the simulation corresponding to the duration of the first script. Associating a second camera having a second point of view in the simulation with the second script, associating a start time with the second script, associating a duration with the second script, after completing the first sequence of images, restoring the state of the simulation to a saved state representing the state at the start time of the second script, and rendering a second sequence of images of the simulation from the second point of view, the sequence corresponding to a sequence of states of the simulation corresponding to the duration of the second script. The commands include screenwriting stage direction.

In general, in one aspect, a plurality of scripts is received, commands are automatically identified in the scripts that are applicable to objects in a simulation and associated with overlapping periods of time in a timeline of the simulation, and the objects in the simulation are automatically manipulated according to the commands in each of the scripts.

In general, in one aspect, scripts associated with objects in a simulation are displayed by displaying boxes representing each script, a vertical position of each box corresponding to a start time of the script, and a height of each box corresponding to the duration of the script also including, displaying the boxes in parallel columns, the boxes of each column representing a sequence of scripts associated with an object in the simulation. In some implementations, the association of scripts in the columns with the objects is based on a first type of parameters characterizes the objects, user input is received selecting a second type of parameter, and the boxes are arranged into new columns representing sequences of scripts associated with objects characterized by the second type of parameter.

In general, in one aspect a first object in a simulation is associated with a first line of text referencing the first object in a first script including lines of text bearing commands that control objects in the simulation, the first line of text is associated with a first increment of time in the simulation, a section of the first script including the first line of text is associated with the first object, the section of the script including second lines of text associated with increments of time near the first increment of time, and the association of the section of the script with the object is stored.

Implementations may include one or more of the following. For each line of the first script, for each object referenced by the line, determining a type of the object and associating the type with the line. Determining the type of the object is based on a context of commands in the line referencing the object.

In general, in one aspect, within a set of scripts each including lines of text bearing commands that control objects in a simulation, scripts are identified having stored associations with each of a set of the objects. Within each script of the set, a starting increment of time and an ending increment of time to which the lines of text in the script correspond in the simulation is identified, and representations of each of the identified scripts is displayed in a graphical display, sorted into columns corresponding to the objects of the set referenced by each identified script, and arranged vertically according to the starting and ending increments of time of each identified script.

Implementations may include one or more of the following. Each script of the set includes a dynamically selected set of contiguous lines in a document. The set of objects is dynamically determined based on a type associated with each object and the scripts are identified by their association with the type. Displaying, in the graphical display, a rendered image of a set of the objects in the simulation showing a state of each object in the set at an increment of time in the simulation, and displaying an indication in the representations of the identified scripts of the increment of time displayed in the rendered image. Displaying, in the graphical display, a sequence of rendered images of the set of objects showing the state of each object in the set at a corresponding sequence of increments of time in the simulation, associating an active status with each object at each increment of time in the sequence for which the object is associated with one of the identified scripts including lines corresponding to the increment of time, and graphically indicating the active status of any of the objects in the image that have an active status. Arranging the representations vertically includes, displaying each representation at a top vertical position based on the start time of the represented script, and with a vertical extent within its column corresponding to a number of increments of time between the start time and the end time of the represented script, corresponding increments of time in each column being aligned. Identifying a camera position associated with each identified script, receiving user input indicating one of the objects of the set of objects, setting a state of the simulation to a saved state representing the state at the start step of first script in the column corresponding to the selected object, setting a point of view used to produce rendered images of the simulation to the camera position identified for the first script in the column corresponding to the selected object, determining a sequence of increments of time in the simulation defined by the starting and ending increments of time associated with each script in the column corresponding to the selected object, and displaying, in the graphical display, a sequence of rendered images of a set of the objects in the simulation showing a state of each object in the set at the sequence of increments of time.

A computer program stored on a computer readable medium includes instructions to cause a computer to retrieve from a memory a set of definitions of objects in a simulation, maintain a state of each of the objects in the simulation, retrieve from the memory a set of scripts including lines of text including commands to control the objects in the simulation at increments of time in the simulation corresponding to lines in the scripts, update the state of each object in the simulation at each increment of time according to commands for the object in lines of the scripts associated with the increment of time, and display, in a graphical display, a sequence of rendered imaged of the objects in the simulation.

Implementations may include one or more of the following features. The instructions cause the computer to receive, from the user, a selection of a first point of view and an instruction to advance the simulation, and display the sequence of rendered images by, displaying a first image rendered from the first point of view and corresponding to a first increment of time in the simulation, and displaying subsequent images in turn according to a timeline of increments of time in the simulation. The instructions cause the computer to receive, from the user, a selection of a second point of view, and also display the sequence of rendered images by, beginning from the time the selection of the second point of view is received, displaying subsequent images rendered from the second point of view in turn according to the same timeline of increments of time. Receiving the selection of a second point of view includes receiving a series of instructions controlling movement of the point of view in the simulation. The series of instructions include instructions from a video game controller. The instructions cause the computer to receive, from the user, a selection of an increment of time, and also display the sequence of rendered images by, displaying a second image corresponding to the selected increment of time, and displaying subsequent images in turn according to the timeline of increments of time in the simulation, continuing from the selected increment of time. Receiving the selection of the increment of time includes receiving a forward or rewind command. The first increment of time is an increment of time associated with an initial line of text in one of the scripts. The instructions cause the computer to receive a user selection of a sequence of scripts, display the sequence of rendered images by, displaying a rendered image corresponding to the increment of time in the simulation corresponding to each line of each of the scripts in the sequence, in an order determined by a definition of the sequence. Each rendered image is rendered from a point of view designated by a line in a script of the sequence corresponding to the increment of time of the image. Each rendered image is rendered from a point of view designated by the user at the time the image is rendered. The order of scripts determined by the definition of the sequence differs from an order of the increments of time in the simulation associated with the lines of the scripts. Receiving the user selection of the sequence of scripts includes receiving a user indication of one of the objects in the simulation, and the sequence includes each script of the set of scripts containing a line including a command for the indicated object, the order of the scripts determined by a timeline of the increments of time in the simulation. Receiving the user selection of the sequence of scripts includes receiving a user indication of a location in the simulation, and the sequence includes each script of the set of scripts containing a line including a command for objects located near the indicated location, the order of the scripts determined by a timeline of the increments of time in the simulation. Receiving the user selection of the sequence of scripts includes receiving a user indication of an attribute of a subset of the scripts, and the sequence includes each script of the set of scripts having the attribute, the order of the scripts determined by a timeline of the increments of time in the simulation. The attribute is an association with a storyline. The set of definitions and the set of scripts are also stored on the computer readable medium.

A simulation scripting system enables an author to concurrently script and play back a fixed work simulation recording medium. Concurrent scripting and playback allows an author to iterate over a simulation, developing multiple parallel sequences of scripts containing commands controlling the behavior of self-animating agents comprising the simulation. Point of view and transport controls, provide a means of authoring the scripts from multiple points of and at multiple points in time to incrementally shape a simulation. Automatic tagging of scripts, associating scripts with objects in the simulation, provide a basis for dynamic script organizing interfaces. Script organizing interfaces provide a means of measuring the completeness of a set of scripts. Script organizing interfaces provide playback of multiple sequences of scripts using camera tags of the pov used to author the scripts. Fixed work simulation allows author control of content and user control of camera for large navigable worlds. Multiple sequences of scripts comprise multiple stories unfolding in the same virtual reality space, providing narrative backbone for a non-linear entertainment device.

BRIEF DESCRIPTION OF THE FIGURES

FIGS. 13A-B show a grammar for concurrently scripting and running a simulation.

FIGS. 15, 16A-C, and 17 show schematic views of a method of scripting a simulation.

FIGS. 19 and 28A-I, 29, and 30A-B show schematic views of script organizing.

DETAILED DESCRIPTION

Overview

A hybrid medium, as used in this description, gives a user control of the camera but not the content. In one example of a hybrid medium, the content, including dialogue and choreographed action for all the characters in a 3D simulation of a town, is precisely scripted, but control of the camera is left to the user.

In a hybrid medium, a writer scripts the world in which a viewer will walk. This results in a screen medium sharing advantages of both video game and film mediums. This type of screen medium, a fixed-work 3D simulation, where the user controls the camera, may be viewed as a variation of the original motion picture medium. Originally, pre-recorded images were projected without sound at 16-20 frames per second (fps), then sound synchronization enabled "talkies." More recently, the ability to render images at 32 fps coupled with the ability to give control of the camera to the user, results in hybrid media that we refer to as "walkies," i.e., "movies you can walk around in."

Figure 1A:
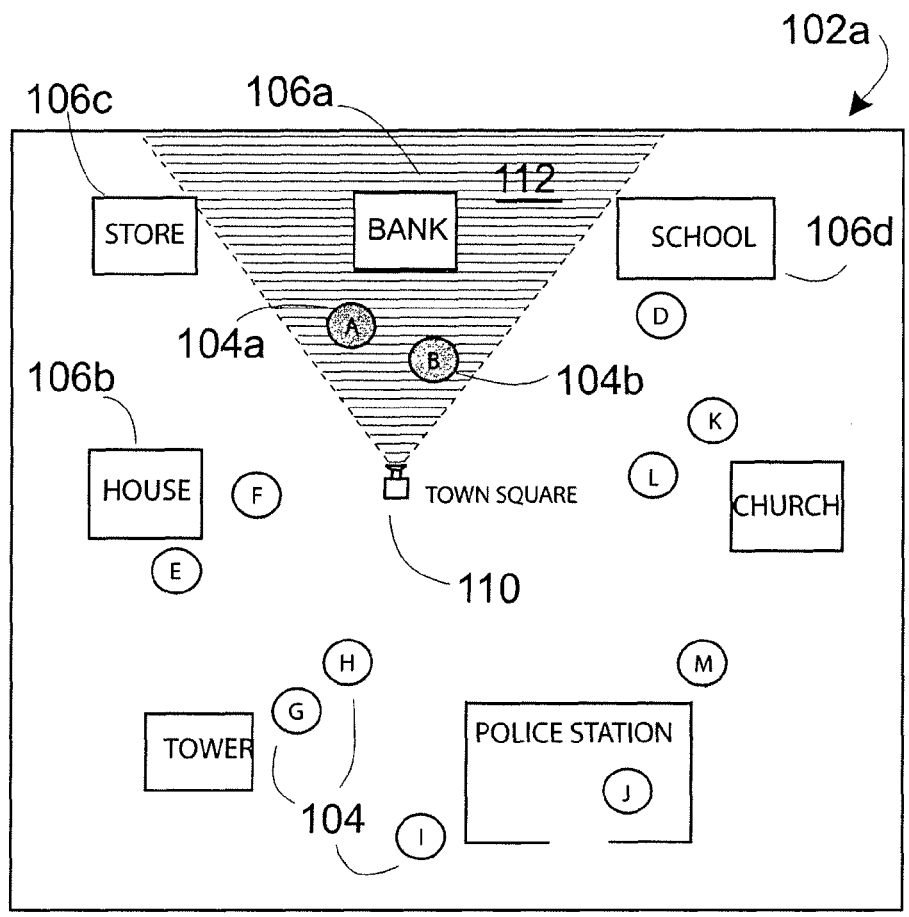
FIGS. 1A-E, 20B, 23A-B, show schematic views of simulated worlds.
Figure 1B:
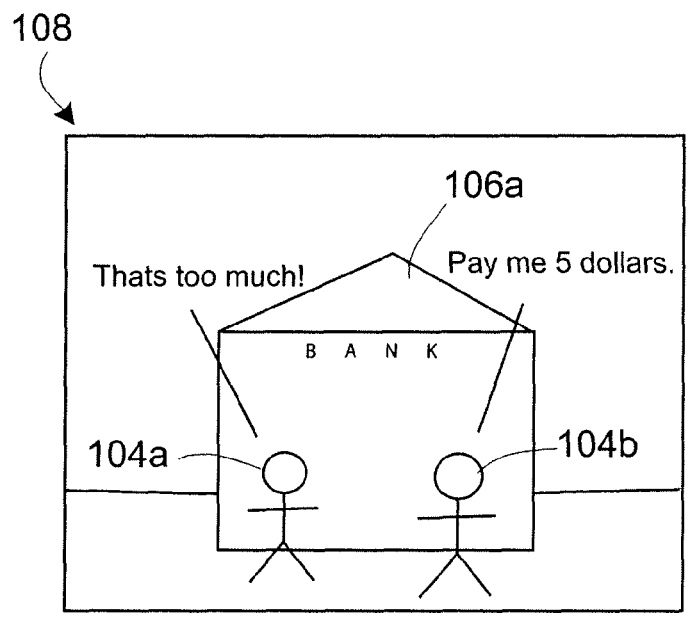

Relinquishing control of the camera in a scripted screen medium presents challenges for authorship and production not present in film or video games. FIGS. 1A-E illustrate scripting considerations in a hybrid medium. FIG. 1A shows an idealized plan view 102a of a town square with people 104 and buildings 106. An image 108 in FIG. 1B represents a view obtained by positioning a camera 110 in the town at the position shown in FIG. 1A. An author of a film containing this scene scripts a single conversation between people 104a and 104b at the bank 106a. The house 106b, store 106c, school 106d and other people and locations are out of the camera's viewing area 112, and are of little consequence to the author during the scene in FIG. 1B.

Figure 1C:
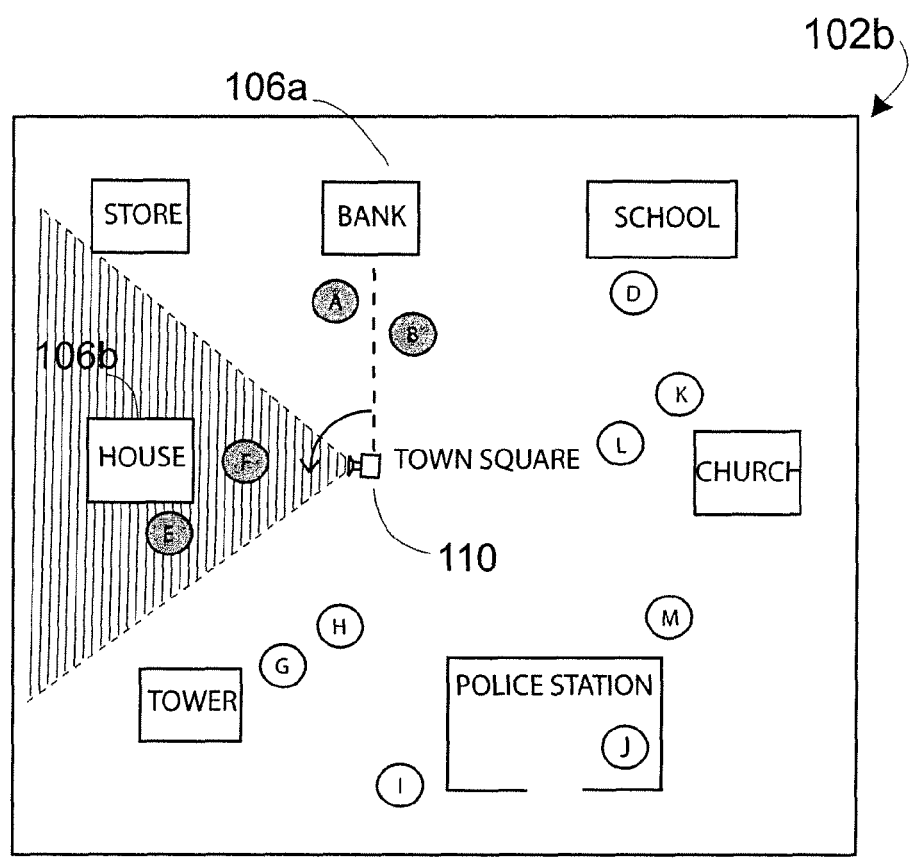
Figure 1D:
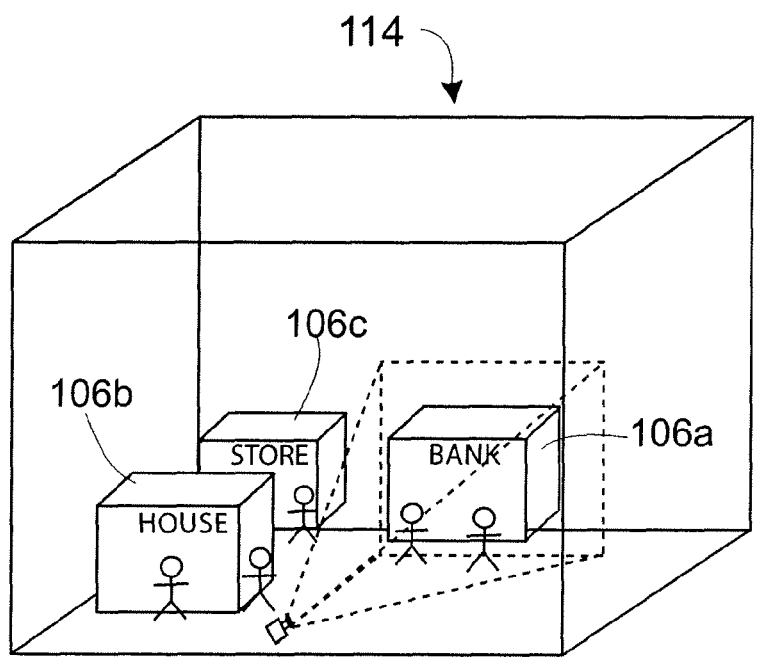

FIG. 1C shows a view 102b of the same town containing the scene at the bank 106a authored in FIGS. 1A and 1B. In this example, a user (not necessarily the author of the scene) controls the camera 110 using a 3D simulation medium 114, as shown in FIG. 1D. In the view 102b, while the scene at the bank 106a is unfolding, the user has chosen to turn the camera 110 to the left. Now, for the user to see anything other than a static scene, the author needs to script two scenes occurring in parallel, one at the bank 106a and one at the house 106b.

Figure 1E:
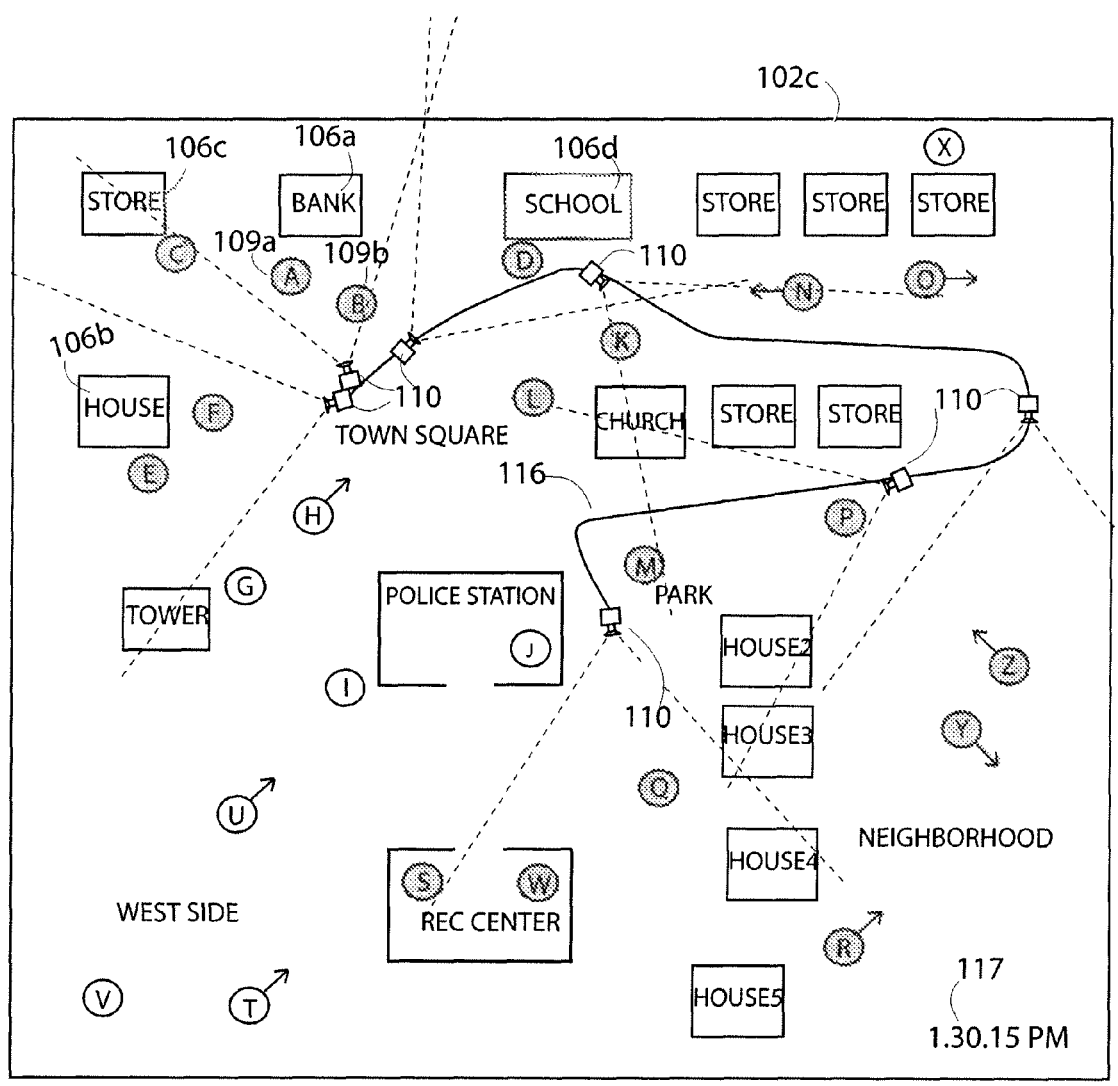

Creating a larger simulation involves scripting multiple scenes all occurring simultaneously as time progress, shown as a plan view 102c in FIG. 1E. A line 116 denotes a user's path through the world and camera icons 110 represent different camera positions selected by the user. An indicator 117 shows the time within the simulation currently being viewed.

Such a large scale navigable, real-time, scripted character animation medium has increased content demands relative to traditional scripted or fully-interactive media. To create the medium, fluid, dynamic simulation systems are modified to resemble a fixed-work traversable recording medium, whereby scripted content is fixed to the progression of time. A scripting process suitable for authoring action unfolding at advanced points in a prolonged simulation is added to such a simulation system as described below.

This scripting process provides a content development tool allowing authorship of fixed work simulations where the user controls the camera. Such a system enables a new, non-interactive entertainment medium to be produced from the same technology that has enabled the success of the video game industry. This system allows individual authors to infuse 3D simulations with the sort of content that has enabled other fixed-work mediums, such as books, television, film, and music.

Figure 2:
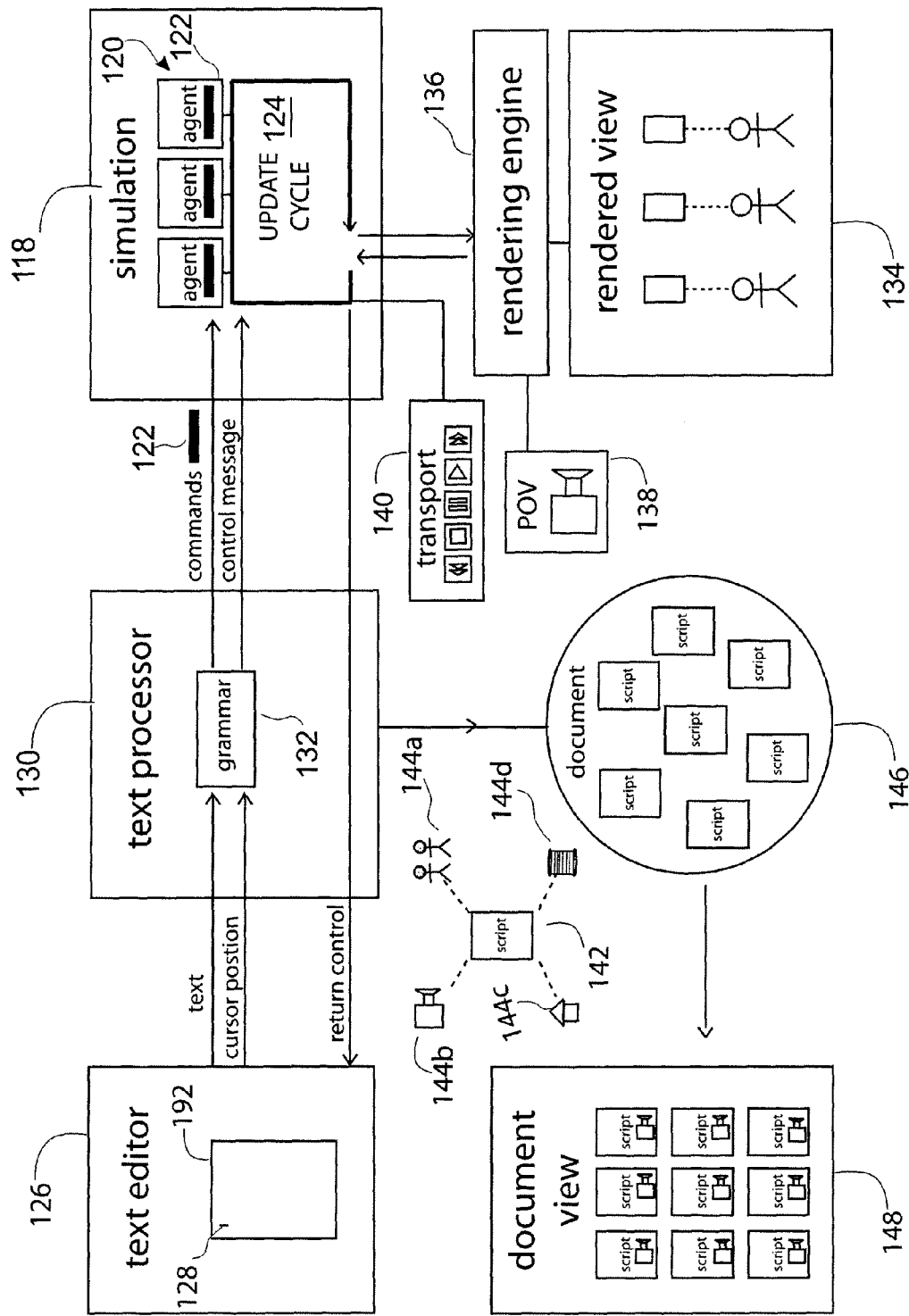
FIG. 2 is a block diagram of a simulation scripting system.

As shown in FIG. 2 a simulation scripting system includes several interrelated elements. A simulation 118 includes one or more scriptable agents 120. Agents store commands 122 that affect the state of the agent at successive iterations of an update cycle 124. A text editor 126 contains a script 142 and a cursor position 128. Text from the script 142 and the cursor position 128 are sent to a text processor 130. The text processor 130 applies a grammar 132 to the text and parses commands 122 affecting agents 120 at iterations of the update cycle 124. The text processor 130 uses the position 128 of the cursor in the text of the script 142 to control program execution of the update cycle 124. This allows the author to concurrently script and playback the simulation. The current state of the simulation is viewable as rendered images projected onto a rendered view 134 by a rendering engine 136. A point of view (POV) control 138 allows the author to change the position and angle of a virtual camera by which the rendering engine 136 determines which objects to project onto the rendered view 134. A transport control 140 allows the author to restore and advance the state of the agents in the simulation while not actively scripting.

The text processor tags scripts 142 to associate them with agents and other objects in the simulation. Tags 144 include identifications of the particular characters 144a, cameras 144b, or points of view (povs), locations 144c, and threads 144d, discussed below, used to author a script. Multiple tags of the same type may be associated with a single script. For example, a single script may contain references to multiple characters partaking in the script, ad thus include a tag for each character. As discussed below, tags 144 are useful for generating multiple views of the same document 148 according to different types of tags. Scripts are stored in a collection as a document 146. A script organizing interface, or document view 148, provides organizational and playback methods involving sequences of scripts 142 and the associated camera tags 144b.

There are numerous ways each of these components may be implemented. Each of these functions may be carried out my more or fewer components than those illustrated. The components may be off-the-shelf components, such as a standard text editor and a virtual reality engine from a video game development system, or they may be custom-built.

Scriptable Agent System

Figure 3:
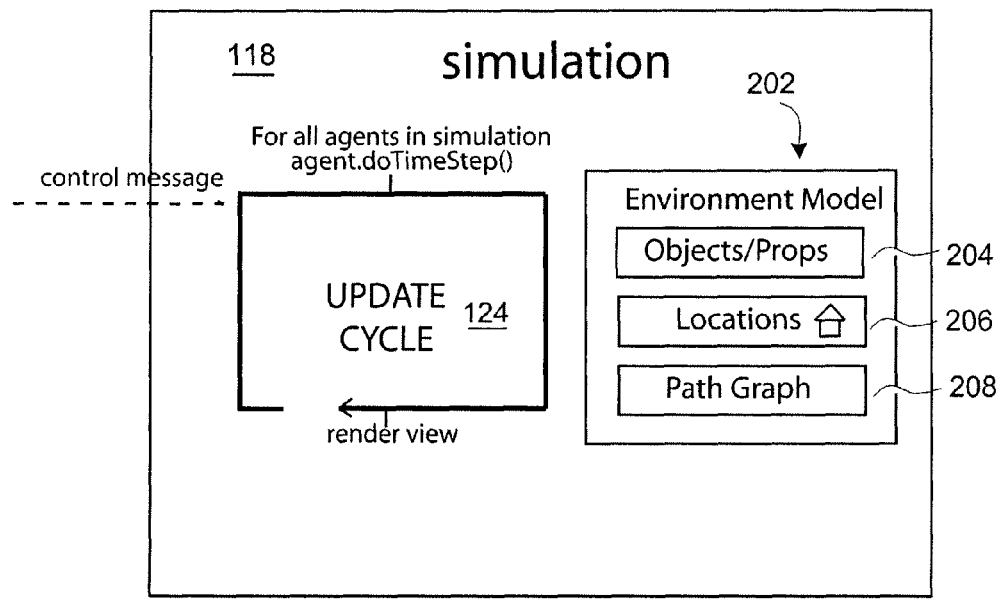
FIG. 3 is a block diagram of a simulation processor.

As shown in FIG. 3 the simulation 118 includes an environment model 202. At each iteration of the update cycle 124, agents 120 (FIG. 2) query the environment model 202 for information. The environment model includes, for example, a set of objects or props 204, locations 206, and a path graph 208. Objects and props 204 are used as parameters in directing the agents 120. Named locations 206 are used as destinations for the agents. A path graph 208 contains pre-calculated paths that the agents use to navigate to and from locations 206. The environment model may be constructed manually by a user or may be constructed autonomously by the simulation from a geometric model of a virtual world. The grammar 132 of the text processor 130 (FIG. 2) is initialized with the names of objects, props, and locations to be used in parsing the commands 122 associated with the agents 120. The environment model 202 aids in agent perception, collision avoidance, path planning, and other such tasks. The environment model 202 also enables the author to set high-level direction for the agents from within the text editor 126 (FIG. 2), as described below.

Figure 4:
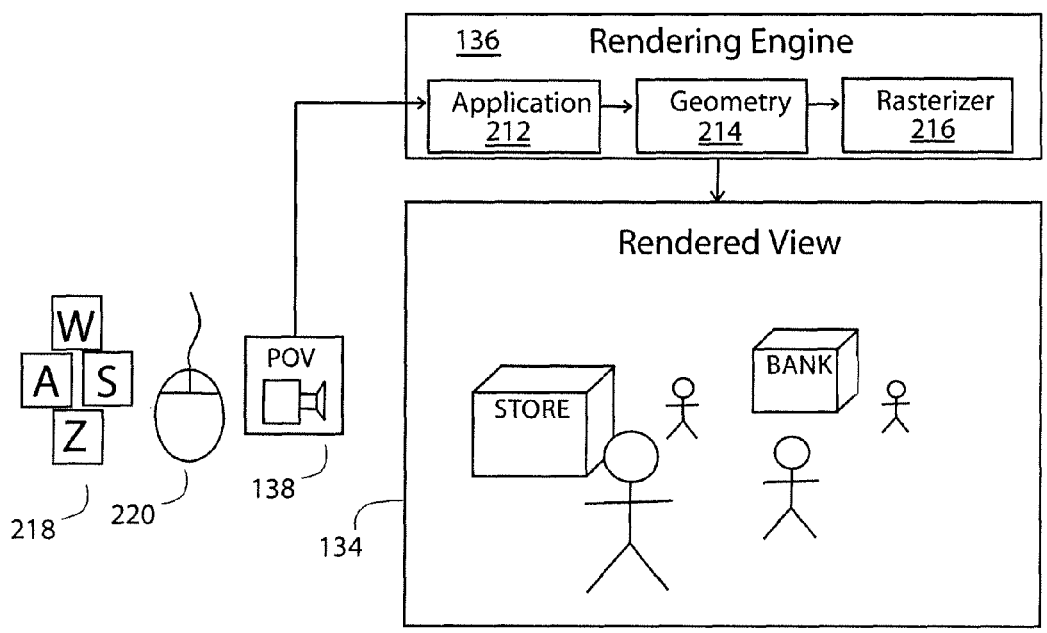
FIG. 4 is a block diagram of a rendering engine.

In some examples, the real-time rendering engine 136 for generating the rendered view 134 of the simulation is structured as shown in FIG. 4. The rendering engine 132 includes an application stage 212, a geometry stage 214, and a rasterizing stage 216. The application stage is responsible for updating the parameters affected by the POV control 138. The user operates the POV control to change the position and direction of a virtual camera. The application stage 212 updates a view transform according to the user input obtained from the POV control. In the geometry stage 214, vertices and normals of models representing the agents in the simulation are transformed according to the view transform calculated in the application stage. In the rasterizing stage 216, the model primitives are converted to pixels in the rendered view. In some examples, the user manipulates keys 218 on a keyboard and a mouse 220 to affect the parameters of the POV control 138.

Figure 5:
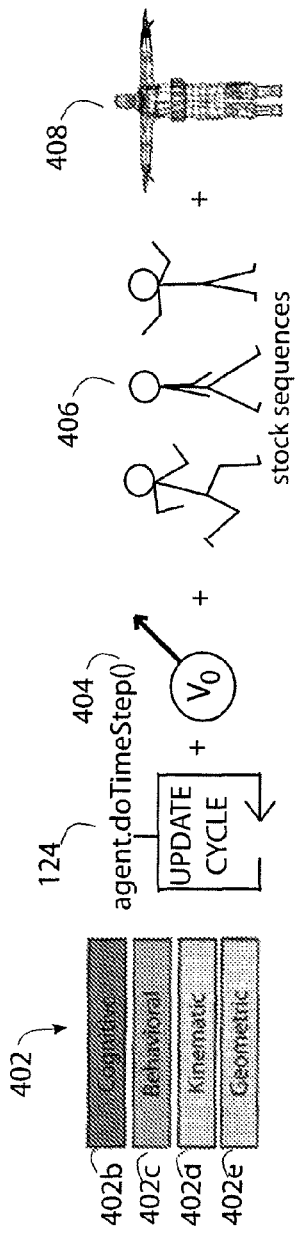
FIG. 5 is schematic diagram of an autonomous agent.

In some examples, as shown in FIG. 5, the agents 120 may be implemented as self-animating autonomous agent as described by Terzopolous in Cognitive Modeling "Artificial life for computer graphics," D. Terzpoulos, *Communications of the ACM,* 42(8), August, 1999, 32-42. Geometric, kinematic, behavioral, and cognitive controllers 402 operate at time steps or iterations of the update cycle 124. High-level direction of the agent, such as "Go to the store," is enabled by the cognitive controller 402b. When such a command is given, the cognitive control queries the environment model 202 (FIG. 4) for a suitable path. The behavioral controller 402c handles reactive actions, such as avoiding collisions while traveling the path. The kinematic controller 402d governs how a moving model 404 moves. In some examples, the geometric controller 402e controls a choice of stock animation sequences 406 to animate how a character or other model moves when it implements the movement dictated by the kinematic controller 402d. Such sequences 406 are applied to a model 408, resulting in character animation.

Figure 6:
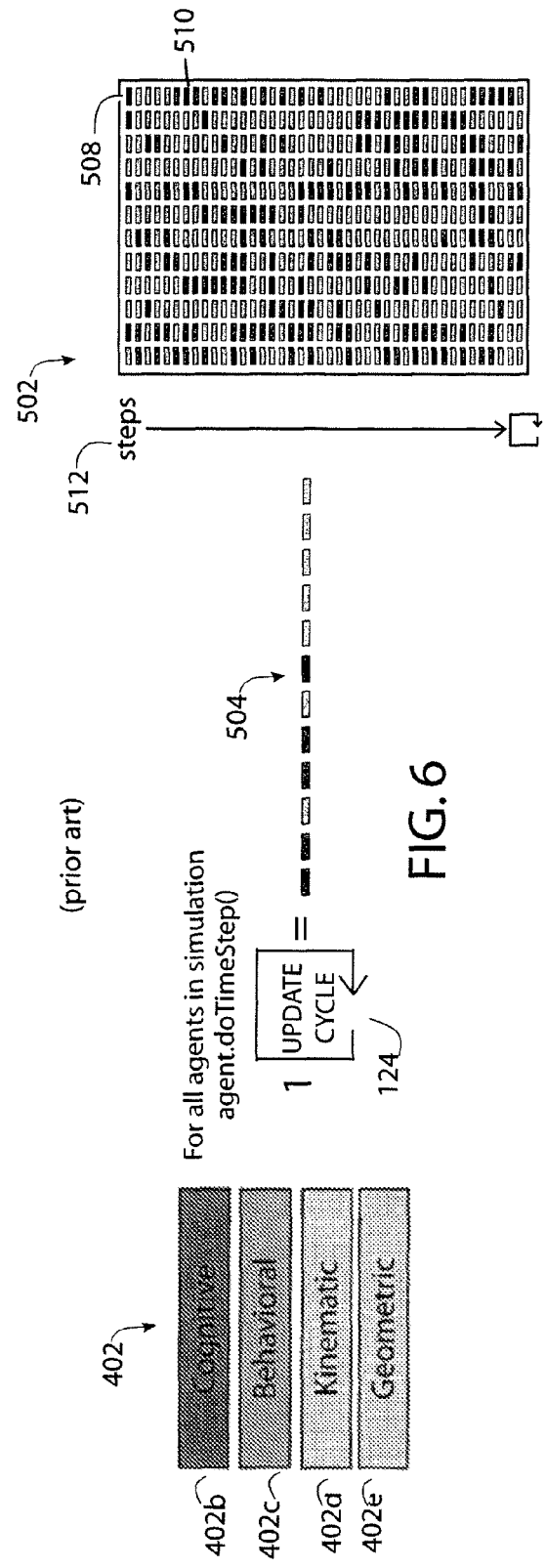
FIG. 6 is a block diagram of an autonomous agent simulation.

FIG. 6 introduces a useful way of illustrating agent control in a simulation over time. A chart 502 plots the execution of successive time steps of an autonomous agent animated by the controllers 402. At run-time, the update cycle 124 directs each agent to update its state, resulting in a single row 504 of the chart 502 for each time step (with timeline 512 indicating the progression of time steps). Each column, e.g., column 508, represents an agent. Each box, e.g., box 510, represents generally the type of control being activated for that column's agent at each time step. This type of illustration of a simulation is used in this description to contrast traits of autonomous agent simulations with scripted agent simulations. An autonomous agent simulation is characterized by a lack of author presence at run-time. Rather, the cognitive and behavioral controls 402b and 402c decide what should be done and when, according to parameters and rules written by the author off-line, such as game rules in a video game. Also, autonmous agent simulations are generally non-traversable in time by use of a transport control.

Figure 7:
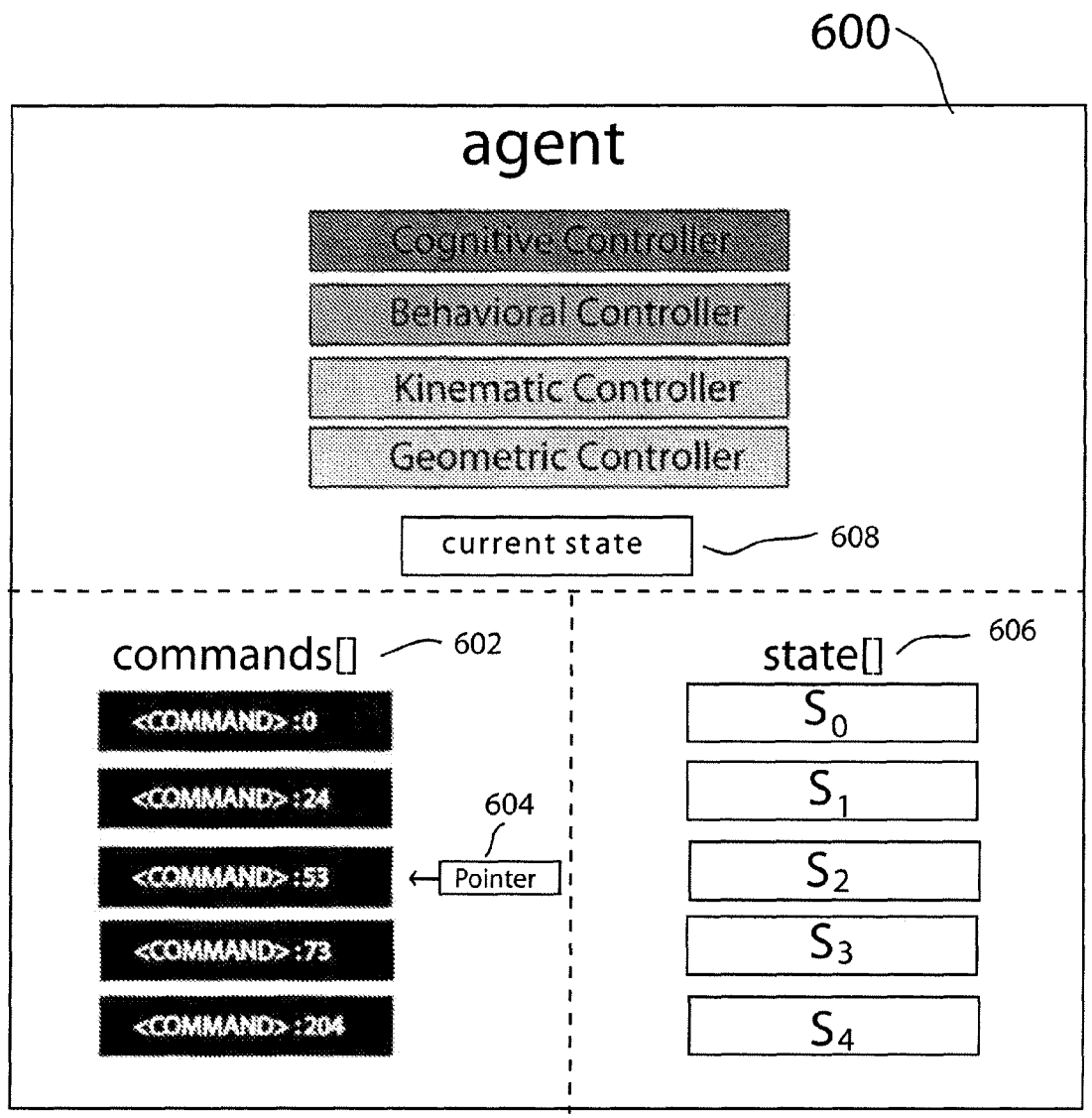
FIG. 7 is a block diagram of a hybrid autonomous/scriptable agent.

In contrast, the scripted simulation uses a hybrid autonomous and scriptable agent 600, as shown in FIG. 7. Authorial commands 602 received from the text processor 130 (FIG. 2) are stored to be executed at specific time steps. The commands 602 are sorted by time step and carried out when called for as inputs to the cognitive and behavioral controllers (in place of, for example, game rules, as in an autonomous agent simulation). A pointer 604 containing a memory address of the next command to be executed provides efficient retrieval of the next command at run-time. An agent may go many steps without encountering an authorial command. An array of state records 606 containing a snapshot of agent's current state 608, as updated when carrying out commands, is saved at each step. Depending on such factors as memory resources of the hardware system, state records may be stored at greater intervals.

Figure 8:
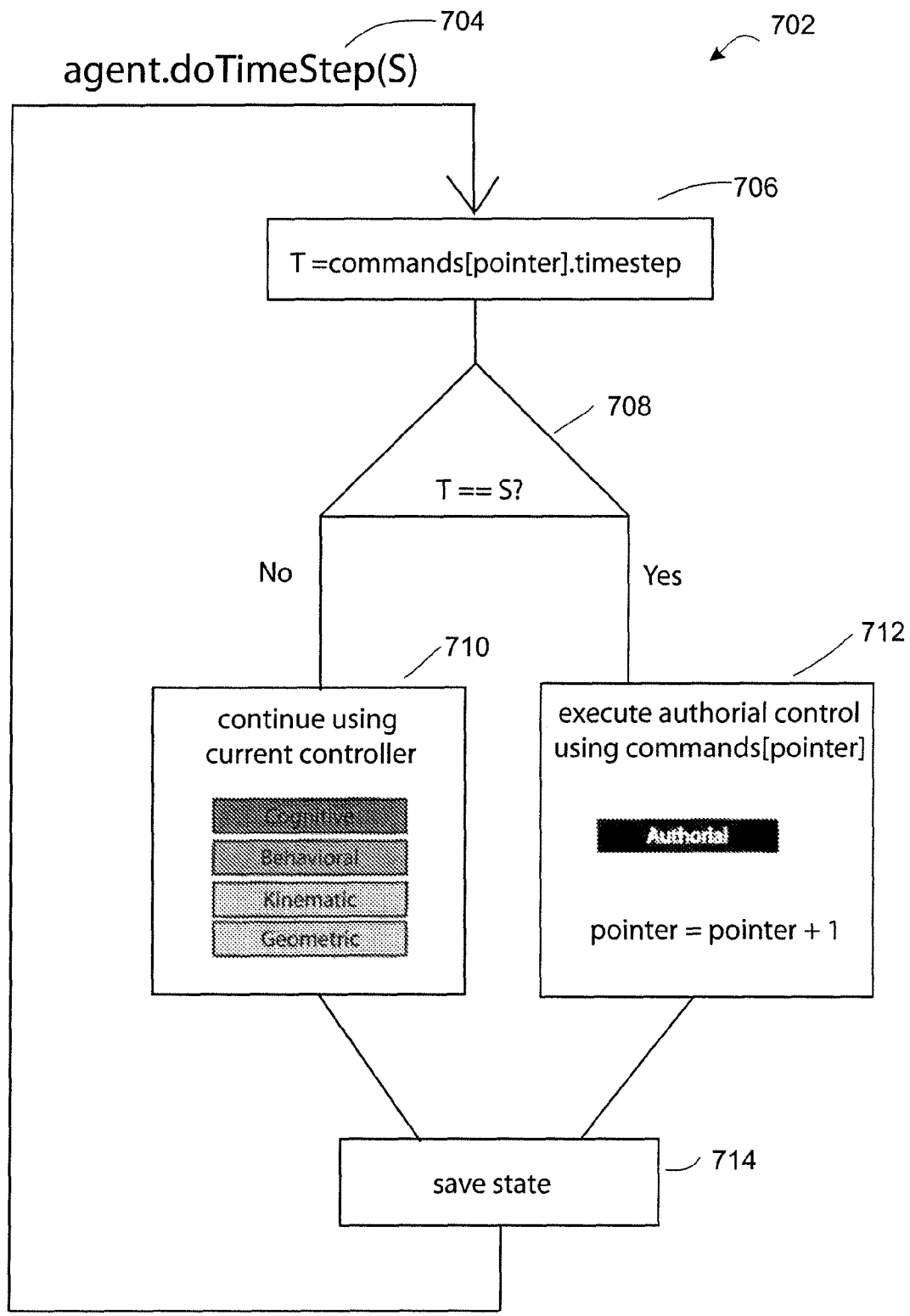
FIG. 8 is a flowchart of a scriptable agent.

In some examples, the hybrid agent 600 uses an agent routine "doTimeStep" 704 according to the process 702 shown in FIG. 8. At the beginning of the process, the time step T associated with the command at the current address of the agent's pointer 604 (FIG. 7) is obtained 706. The time step T is compared 708 to the current step S. If they match, this means the command is scheduled for this step S, and execution proceeds to an authorial control routine to carry out 712 the command 602. If the command time step and the current time step do not match, then the agent uses 710 the autonomous controllers. After the command is carried out 712 or the autonomous controllers execute 710, the new state of the agent is saved 714. This process 702 allows for an authorial command to be retrieved from agent memory and executed at any given step during the update cycle 124 shown in FIG. 6. The cognitive controller 402b of FIG. 6, is thus enhanced to carry out authorial commands. The structure of the agent 600 in FIG. 7 operates according to the process 702 of FIG. 8 to provide a recordable and traversable simulation medium.

Figure 9:
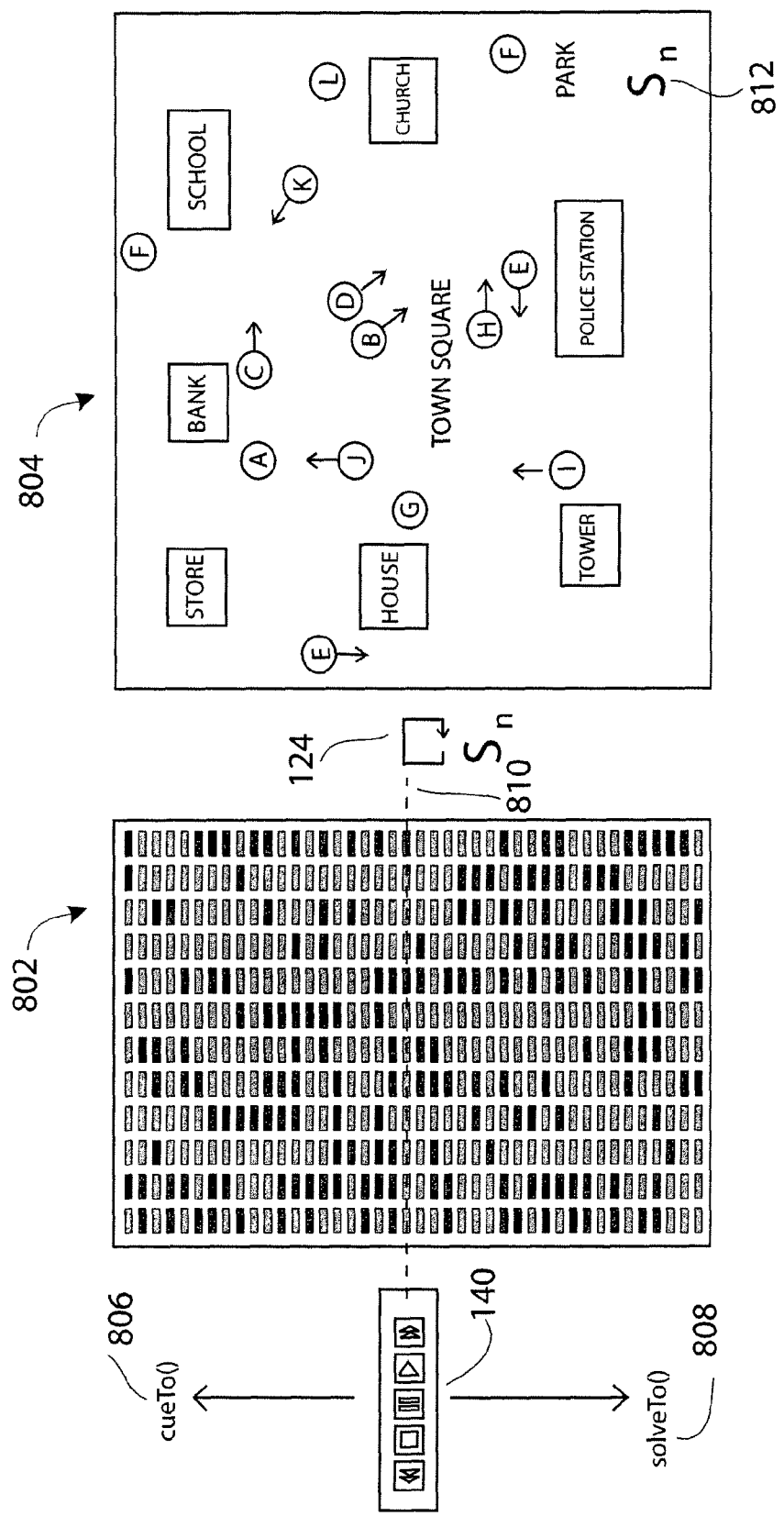
FIG. 9 is a schematic view of a traversable simulation.

FIG. 9 illustrates the traversable quality of the simulation. The transport 140 is used to move forward and backward over a simulation represented by the chart 802. A two dimensional view 804 of the simulation illustrates the state of agents at a step Sn, marked by an indicator 812. The transport control can restore the state of the simulation to one which existed at prior iterations of the update cycle 124 by using state records stored in the agent as described above. The transport 140 can advance the simulation to a future state by solving subsequent timesteps with doTimeStep function outlined in FIG. 8. These functions are carried out by cueTo 806 and solveTo 808 processes of the simulation, discussed below. The rendered view 804 always reflects the current state of the simulation Sn, which, in this example, is the cumulative effect of all time steps above the dashed line 810.

Figure 10:
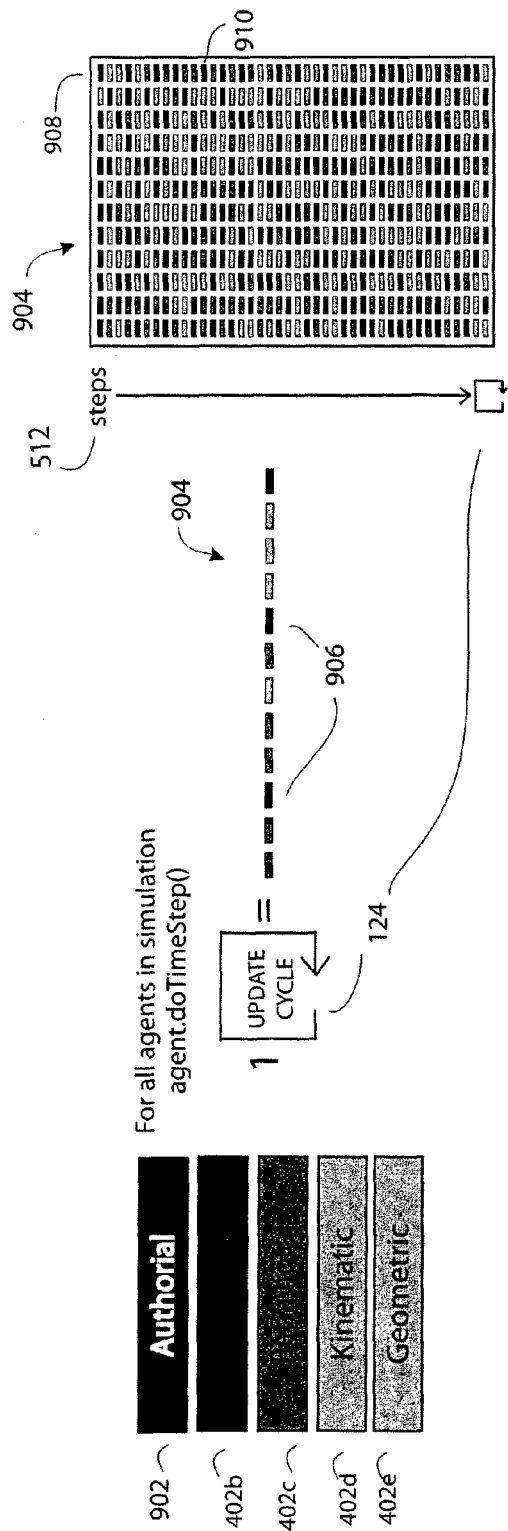
FIG. 10 is a block diagram of a scripted agent simulation.

FIG. 10 illustrates the recordable quality of the simulation, showing the imprint of authorial commands 906 on a traversable simulation medium represented by chart 904. At successive iterations of the update cycle 124, commands 906 executed by agents effect authorial presence in multiple places at once. This presence is represented by the black boxes 910 distributed over chart 904. This allows an author to shape a simulation over the course of time, and in many places at once, by defining commands 906 to be executed at iterations of the update cycle 124. This is made possible by the structure of the agent 600 operating according to the process 702. The appearance of chart 904, as contrasted with chart 508 (FIG. 6), demonstrates the difference between an autonomous agent medium and a scriptable agent medium. Authorial control at specified time steps may be represented as a fifth controller 902 added to the earlier autonomous system model of FIG. 6. In the scriptable simulation medium, not all agent actions have to be selected specifically by the author. In some examples, only specific dialogue and choreographed movements require athorial control. Other actions, such as path planning, obstacle avoidance, and selection of animations can be left to the cognitive, behavioral, and kinetic controllers 402*b*-402*e*. This hybrid control process relieves an author of low-level tasks and enables the author to generate large amounts of scripted character animation without requiring the author to provide any more input than the script. Once scripted, the simulation can be recorded as it is played out by the controllers.

Figure 11:
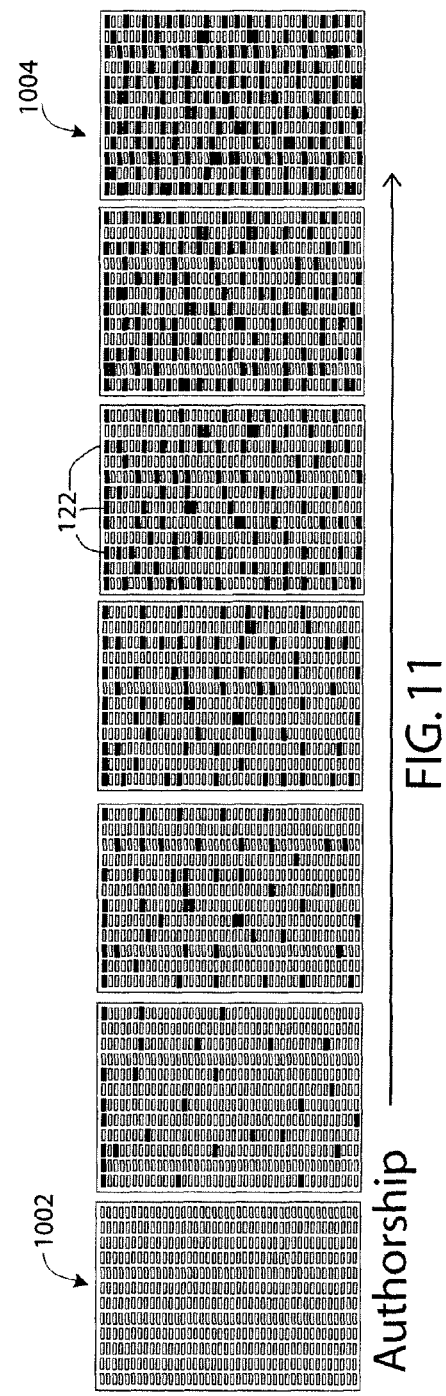
FIG. 11 shows a range of scripted simulations.

FIG. 11 illustrates possible degrees of scripting in a fixed-work simulation medium. A simulation can be regarded as falling on a continuum 1000 ranging from no authorial control, shown in the left-most chart 1002, incrementally towards a heavily-authored fixed work, shown in the right-most chart 1004. The components described below provide a scripting method that allows an author to define the commands 122 that shape the simulation in this manner.

Scripting

Figure 12A:
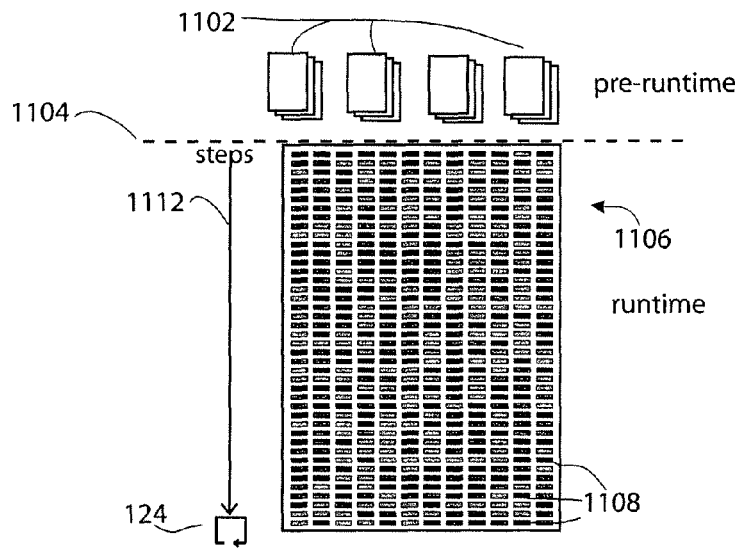
FIGS. 12A-C show schematic views of methods of simulation scripting.
Figure 12B:
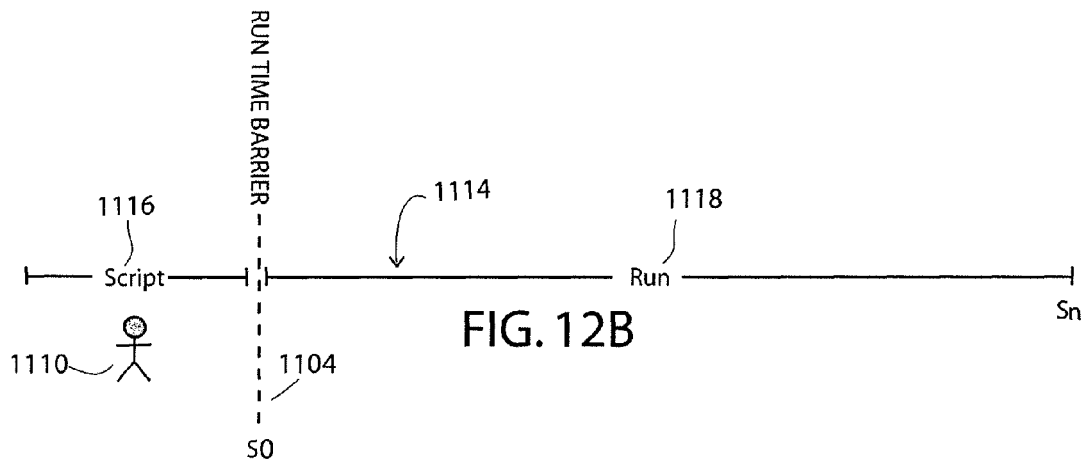

FIGS. 12A and 12B illustrate a traditional scripting method applied to a fixed-work simulation. In the example of FIG. 12A, an author uses a text editor prior to runtime to create an initial set of scripts 1102. The scripts 1102 define parameters and conditionals that affect the behavior of agents at run-time. The behavior of the agents is represented by the chart 1106. While authoring commands 1108 prior to run-time, i.e., from the temporal position of behind the dashed line 1104, the author does not know what the overall state of the simulation will be when, at some future time in the simulation, the individual commands 1108 are executed. Therefore, it is difficult to write scripts from an authorial position of time T=0 on a sequence of time steps 1112 that will remain semantically correct for advanced positions in the simulation of times T>0. Further, it is difficult to synchronize a first script, intended to occur at an advanced point, with a second script intended to occur simultaneously at that advanced point (e.g., scripts covering simultaneous events at two different locations within the simulated world). It is also difficult to predict the cumulative effect of a series of scripts for a single agent over time. Therefore, in general, this method is characterized by a lack of updated world-state knowledge while scripting. Consequently, authorial precision diminishes the longer the simulation is run, as it becomes difficult for the author to predict the state changes that result from subsequent iterations of update cycle 124.

FIG. 12B illustrates the author's temporal scripting position on a timeline 1114 in relation to execution of a simulation using standard scripting methods. The author is represented by icon 1110 as scripting 1116 behind a run-time barrier 1104 because the script is fully written and edited before the simulation is run 1118.

Figure 12C:
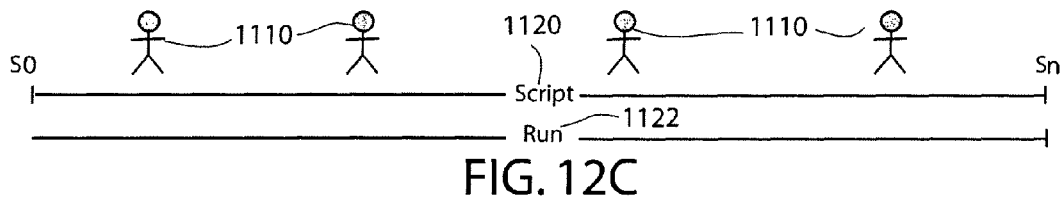

FIG. 12C illustrates a new scripting method made possible by the system disclosed herein. The author 1110 writes 1120 the scripts while the simulation is running 1122. This allows the author to view the simulation as it will be at any time step at which he is writing the script.

FIG. 13A-B are examples of a grammar that allows an author to script commands at iterations of an update cycle for agents in a simulation while also controlling program execution of the update cycle. FIG. 13A includes a formal BNF grammar specification 1302 and examples of valid scripts 1304, 1306, 1308 according to the grammar specification 1302, and the results 1310, 1312, and 1314 of executing the scripts. A leading integer, representing a loop entry point, is followed by a series of statements delineated by the newline character "in". A statement can contain one or more commands. Grammar productions for commands are not shown, as they can vary according to the capabilities of the scripted agents and the environment model used. The text processor 130 (FIG. 2) uses a command production to identify commands and the script production to associate commands with iterations of the update cycle.

FIG. 13B shows a second function of the same grammar 1302 of 13A. The text processor 130 uses the cursor position 128 passed from the text editor 126 to control program execution of the update cycle 124 according to the script production. This includes pausing the simulation 118 (result 1316) advancing the simulation (result 1318) and restoring the simulation to prior states (result 1320).

The combination of functionality illustrated in FIGS. 13A and 13B provide an intuitive and simple means for editing time-based commands as explained in more detail below. The use of the grammar 1302 effectively marries the functionality of a word processor with a simulation, allowing for the same cut, past, insert, and delete tool set to be used in creating content in the simulation. It also has the effect that the simulation is run at the speed at which the user types. Text-based control provides for a simple user interface, described below.

The combination of functionality has a more significant result, however, in that it enables a writer to concurrently script and run a simulation. This is a departure from off-line scripting methodologies. The grammar has an effect similar to that of an audio tape head that can simultaneously record to one portion of a tape while playing back from another. A musician cannot play two instruments at once. However, if one track can be played back while another is being recorded, the musician can iteratively record a symphony. This type of dual functionality is useful for shaping fixed-work simulations where the user controls the camera and scenes may unfold concurrently. It addresses the problem of parallel scene authorship in a scripting system.

Figure 14A:
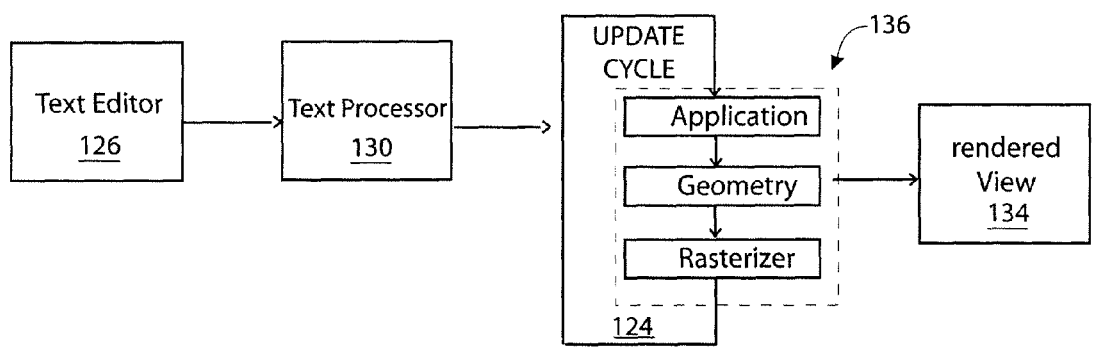
FIGS. 14A-B are block diagrams showing program control flow.

FIG. 14A shows the flow of program control in off-line scripting systems. Scripts are authored off-line in the text editor 126 and parsed by the text processor 130. An update loop 124 is activated resulting in a display of the simulation in a rendered view 134. The update loop is generally activated and controlled by a separate user interface. This type of program flow is characterized by a process of opening an editor, scripting and compiling offline, running the simulation to see the effect of the new script, and repeating this process to make adjustments.

Figure 14B:
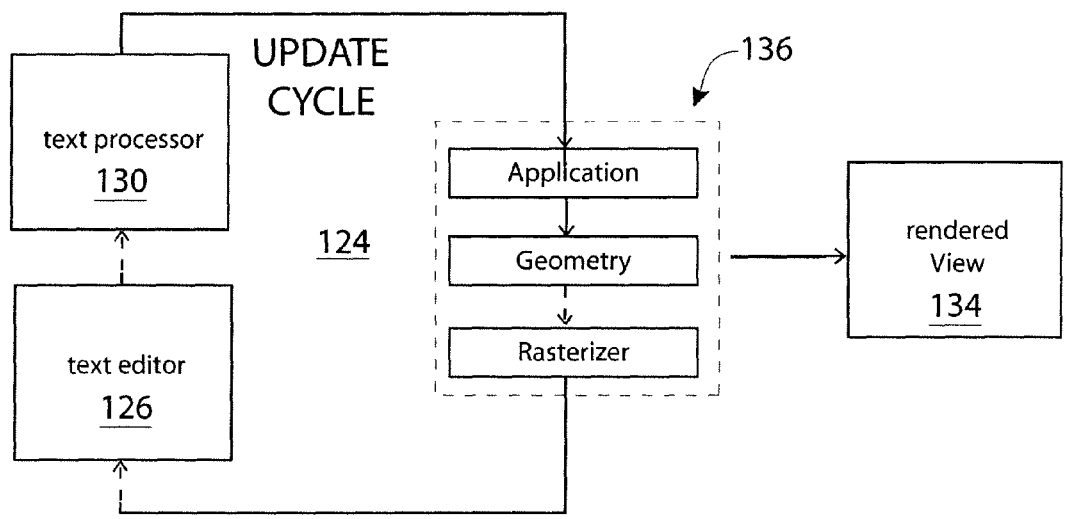

FIG. 14B shows the flow of program control enabled by the use of the grammar 1102. The author is "in the loop" 124 scripting commands, compiling them, and controlling program execution of the loop all at once. The text processor 130 uses the position 128 (FIG. 2) of the cursor in a text editor 126 to control program execution of the loop 124. Control is returned to the text editor as the user types commands affecting the simulation. The author writes scripts with the benefit of viewing the updated simulation state, including the cumulative effect of prior scripts, as they are displayed in the rendered view 134. The simulation is advanced at the speed at which the author types. This program flow also decreases production time as it replaces multiple user interface controls, required in off-line scripting to separately author scripts, compile scripts, and control program execution, with a single continuous stage.

Figure 15:
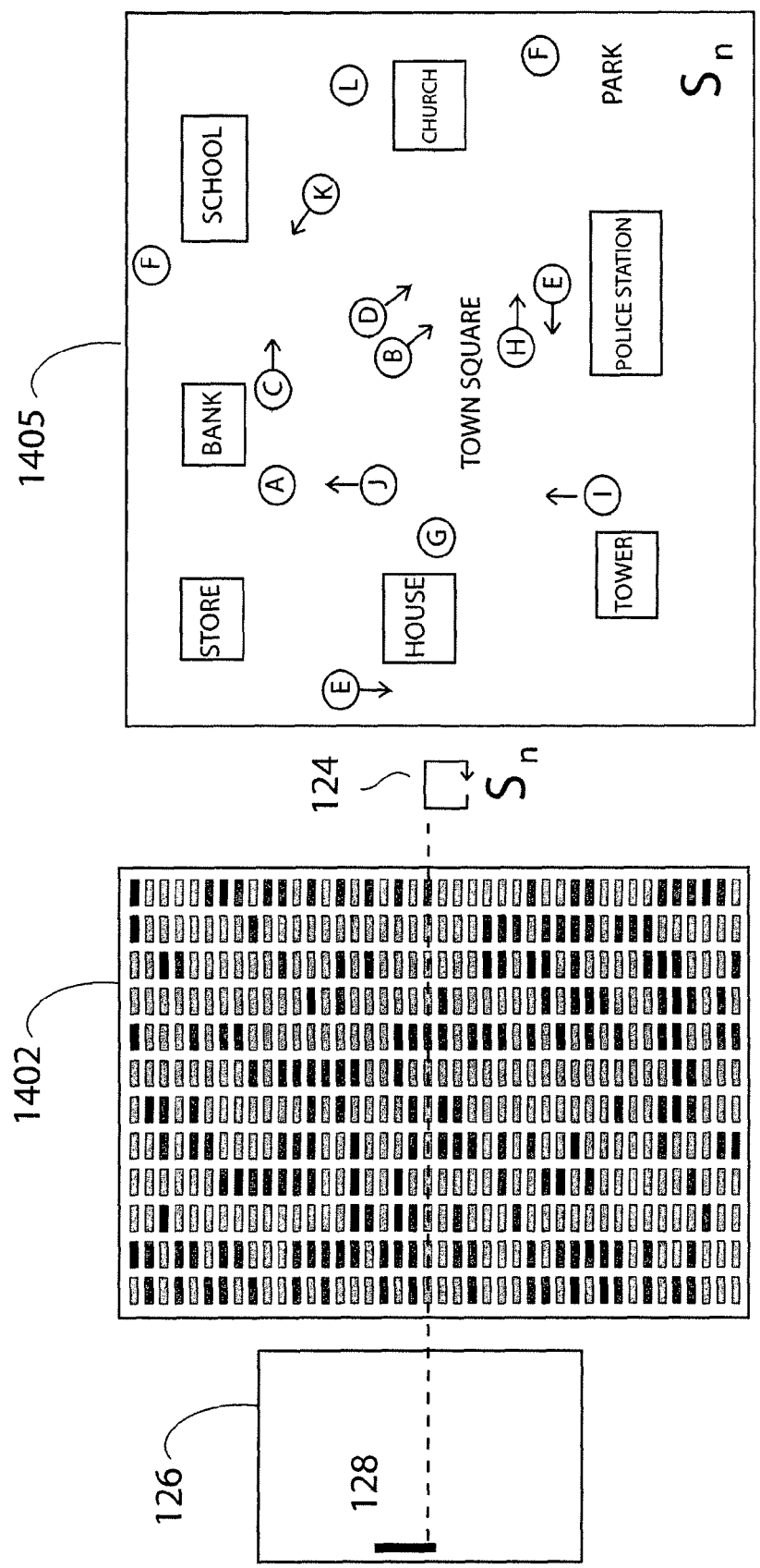

FIG. 15 schematically shows a text editor 126, cursor 128, a simulation chart 1402, and idealized view 1405 of the rendered view 134. The cursor position 128 controls execution of the update cycle 124 (that is, the cursor position determines what time step the simulation is solved for in the update cycle) for the entire simulation regardless of which agents are currently being scripted for in the text editor 126. This allows an author to write a script for one scene affecting one group of characters while previously authored scenes are being played back and viewable in the rendered view 134.

FIGS. 16A through 16C show an example of authoring a set of scripts 1510 for scenes occurring simultaneously in a simulation. The POV control 138 of FIG. 2 (not shown), provides a way to select different perspectives in the simulation for authoring different scenes. This is useful when scenes are occurring simultaneously at discreet locations in the model representing the simulation. FIG. 16A shows a view 1502a of a simulation including camera icons 1504 representing the different POVs used to write each of the five scripts 1510a-1510e. This third person perspective is useful for illustrating the system, though generally the author would view the rendered three-dimensional perspective generated for one of the camera positions (see FIG. 4). The set of scenes corresponding to the scripts 1510 includes a fifth scene (script 1510a) involving an agent 1506 authored from a POV represented by camera icon 1504b. In this example, the state $S_0$ 1508a of the simulation in FIG. 16A corresponds to time step 0, at which point all the scripts defining the action of the simultaneous scenes are about to begin.

FIG. 16B shows a view 1502b the simulation at an advanced state $S_{30}$ 1508b, time step 30, half-way through the execution of the scripts 1510 defining action of five simultaneous scenes. The author is half-way through authoring the fifth scene using the POV position 1504b, behind agent 1506. The four other scenes are being carried out by other agents and are visible to the author in the background of the scene currently being authored, to the extent that they take place within the field of view of the POV position 1504b. The author can script along with prior scripts. This process allows for developing content consisting of multiple scenes occurring simultaneously in a simulation in an interactive, rather than strictly iterative, process.

FIG. 16C illustrates the process used to create the scenes in FIGS. 16A and 16B. While the author is writing the fifth script 1510a, the four other scripts 1510b-1510e are being played back, thus producing semantically accurate content in the view of the simulation the author sees while working on the current script 1510a. For example, the actions defined for the agent 1506 in FIG. 16B may be synchronized with certain events unfolding behind him as scripted by scenes in the scripts 1510b-1510e. This is similar to the way a recording artist records a new track in synchronization with content of tracks previously recorded, except that the author can more freely move between points within each of the scripts, rather than having to lay down one track after another.

Figure 17:
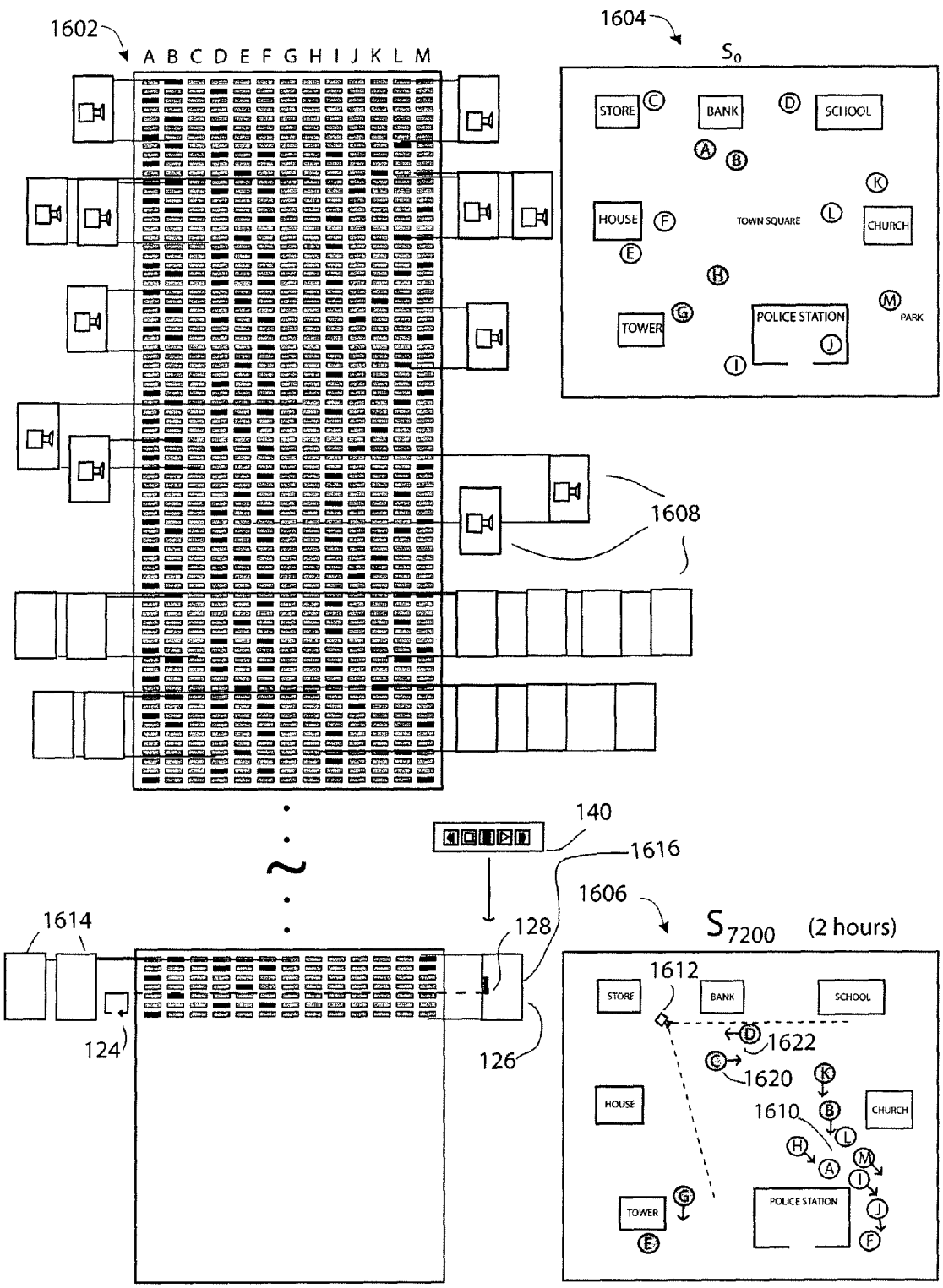

FIG. 17 shows an extended chart 1602 of a simulation including agents A through M and idealized views 1604 and 1606 represent the states $S_0$ and $S_{7200}$ of the simulation at time steps 0 and 7200 in the chart 1602, respectively. Boxes 1608 and 1614 represent scripts. By setting the lead integer of a script in the grammar of FIG. 13A, blocks of a simulation are scripted at early and advanced stages. This maintains authorial precision locally and at advanced points in a simulation. The transport control 140 is used to traverse the simulation while not scripting. In the example of FIG. 17, the author is scripting in the editor 126. While scripting, the cursor position 128 controls program execution of the update cycle 124. The updated state $S_{7200}$ is displayed in the rendered view 1606. The updated state includes content defined in the scripts 1614 occurring simultaneously with the current script 1616 being authored as well as the cumulative effect of all scripts 1608 executed at the 7199 prior steps. The updated state is viewable from the author's chosen point of view, represented in the view 1606 by camera icon 1612, while the author is writing the new scene. This gives the author a large amount of information not available to an author using traditional methods to script for advanced points in a simulation.

Authoring from a pre-runtime position as shown in FIG. 12B, the author does not have updated world-state information. As a result, it is difficult for the author to script meaningful content for agents 2 hours (for example) into a complex simulation. The dynamic simulation scripting system allows for the creation of fixed work simulations running multiple hours.

The example of FIG. 17 also demonstrates how improvisation can occur in script writing. The author's position is represented by the camera icon 1612 in the view 1606. The author may notice agents C and D 1620, 1622 passing each other. This may be a coincidental result of prior scripts controlling these agents to put them in the same place at the same time. However, the author may choose to now author a scene for C and D, having come across this situation without necessarily planning it.

The example of FIG. 17 also demonstrates how emergent behavior can occur in an extended simulation. The view 1606 shows that a bottleneck is forming in an area 1610. The author's knowledge of this bottleneck while writing the scene for agents C and D might affect the content of C and D's conversation. This would be difficult to accomplish in other systems. An author's virtual participation in the simulation, scripting while running, greatly increases accuracy and allows creation of more meaningful content.

Script Organizing

Script organizing interfaces present a large collections of scripts, authored from many points of view, containing commands for different groups of agents, at different locations, over the course of time. To support creating content for a fixed-work simulation medium, new types of script organizing interfaces differ from applications directed toward scripting for film or video games.

Figure 18:
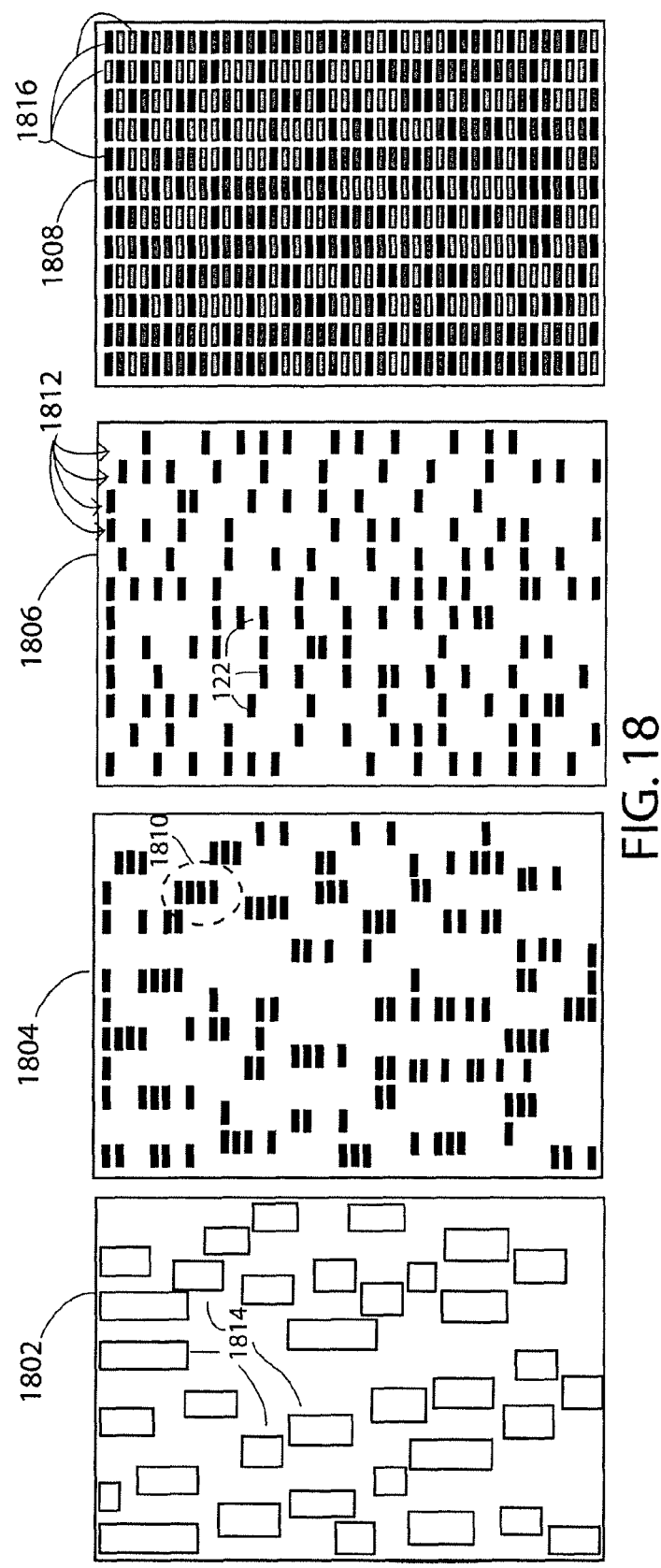
FIG. 18 shows the relationship of a script organizing interface to scripted commands.

FIG. 18 shows a first level of organization in a script organizing interface 1802 and its relationship to scripted commands. In the script organizing interface 1802, boxes 1814 represent scripts. The vertical position of a box corresponds to the script's start time. The height of a box represents its duration. This interface 1802 provides a visual representation of the temporal relationships between scripts.

Charts 1804 and 1806 represent the relationship between the boxes 1814 representing scripts and individual commands in a simulation chart 1808 as used in the above discussions. Each box 1814 represents a script containing a group 1810 of commands defined in that script, as shown in chart 1804. Chart 1806 redistributes the commands 1810 horizontally into columns 1812 arranged by agent. Chart 1808 includes boxes 1816 representing non-authorial controls to complete the simulation chart.

Another script organizing consideration is how to arrange the boxes of the interface 1802 horizontally. A script reflects the positioning of a camera on a set of objects at a time in the simulation and includes a series of commands controlling the behavior of the camera and objects for a certain duration. There is no definitive underlying structure present in a set of such scripts. Rather, multiple underlying structures will exist pertaining to different objects being scripted in a fixed-work simulation medium.

Figure 19:
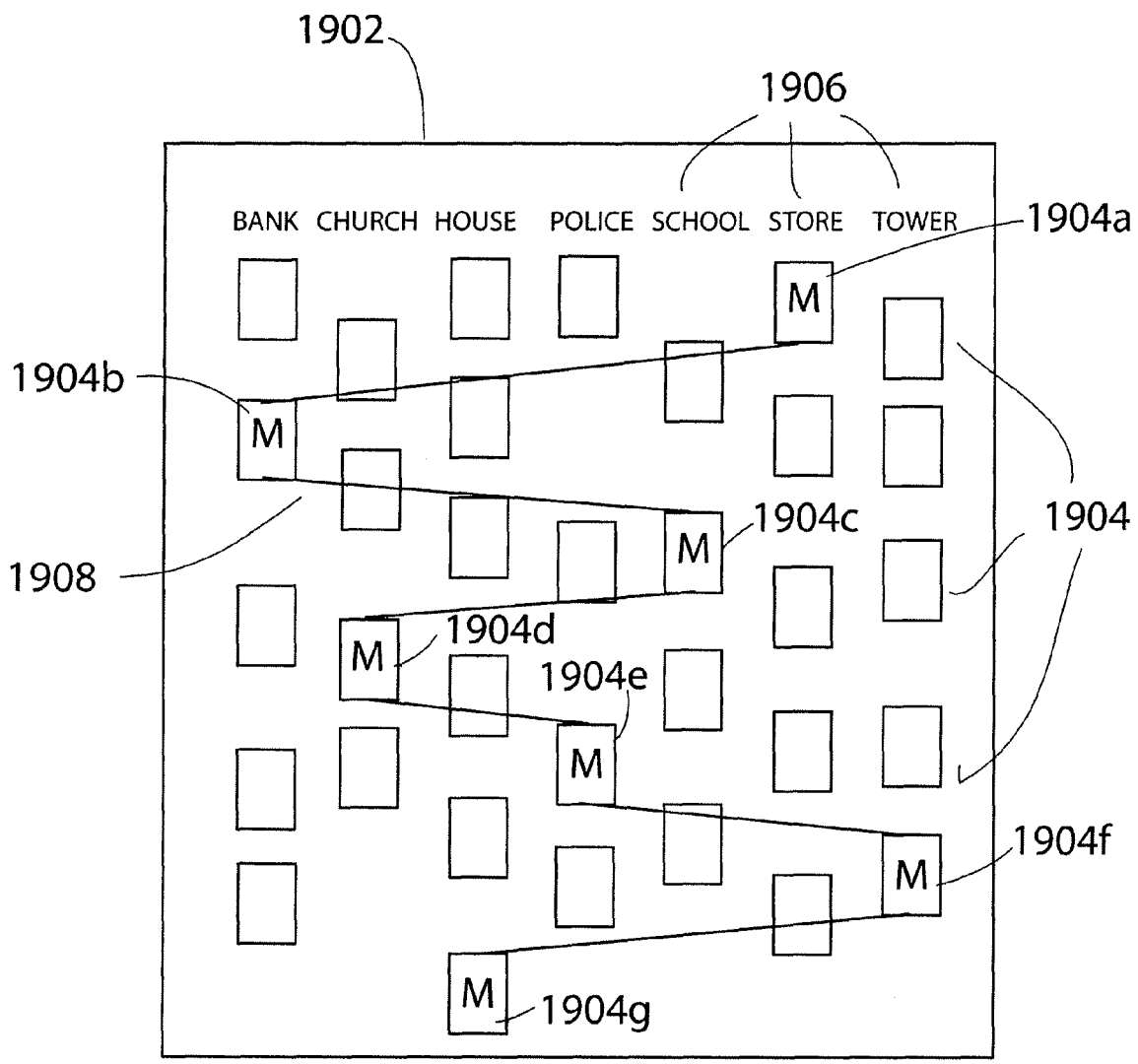

In some examples, as shown in FIG. 19, an interface 1902 arranges boxes 1904 representing scripts in columns 1906 according to the location associated with each script, as tagged by the text processor 130 at the time the scripts were authored. This arrangement is useful for viewing sequences of scripts pertaining to locations in a simulation, but is less useful for an author interested in viewing the sequence of a particular character. For example, consider a script sequence for an agent M representing a mail man. A line 1908 connecting boxes 1904*a-g* represents the sequence of scripts in which the mail man participates over the course of time. Over the course of time, the mail man visits every location in a given area. The mail man's script may be difficult to follow when its parts 1904*a-g* are arranged by location. Dynamically re-organizing a set of scripts by character, as described below, improves readability of the mail man's scripts. In some examples, a set of scripts contains multiple story lines.

The script organizing interface also allows the author to measure the completeness of a set of scripts for a simulation containing many locations, characters, and stories. Determining the completeness of a set of scripts may include ensuring that all the locations have been scripted for at all times, or that all the characters have been scripted for at all times. In general, no single view provides a measure of completeness of the overall simulation. Rather, completeness is better measured by viewing multiple views. To accomplish this, the tags associated with each script are used to provide a dynamic level of script organization.

Figure 20A:
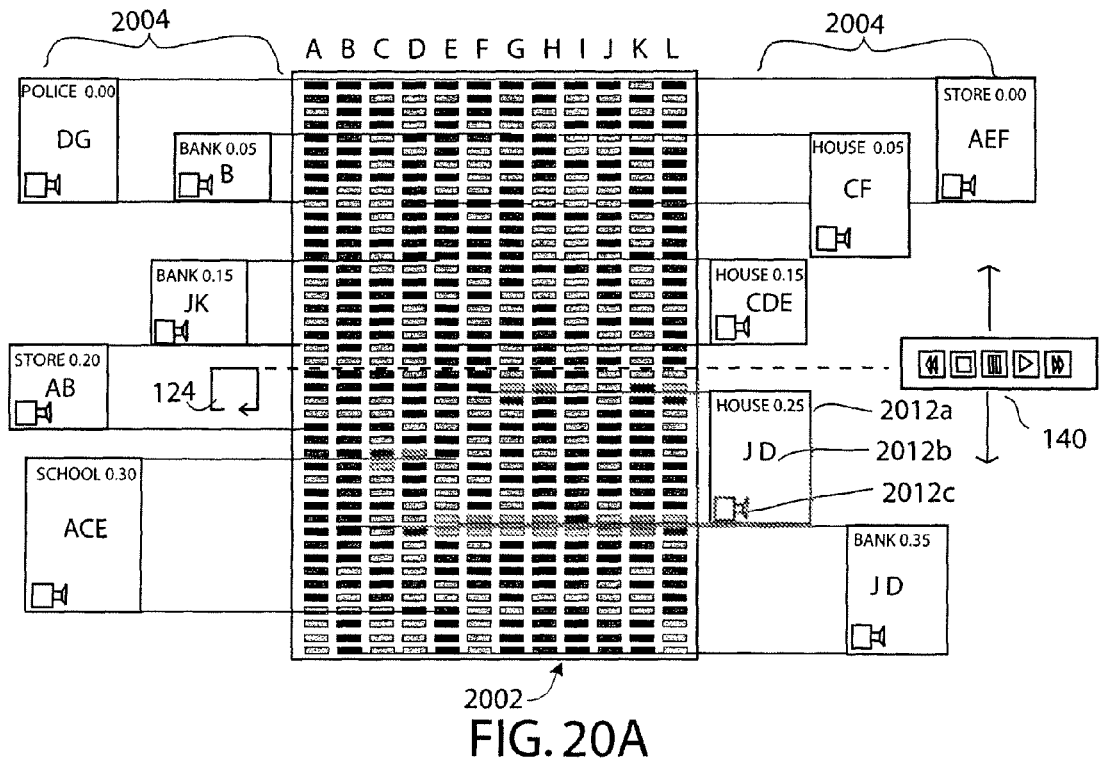
FIGS. 20A and 21A-B, and 22 show schematic views of the construction of script organizing interfaces.
Figure 20B:
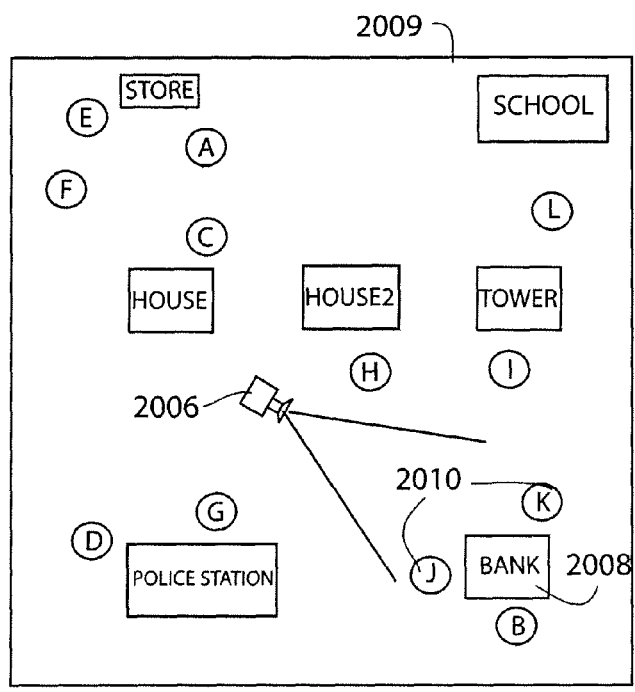
Figure 21A:
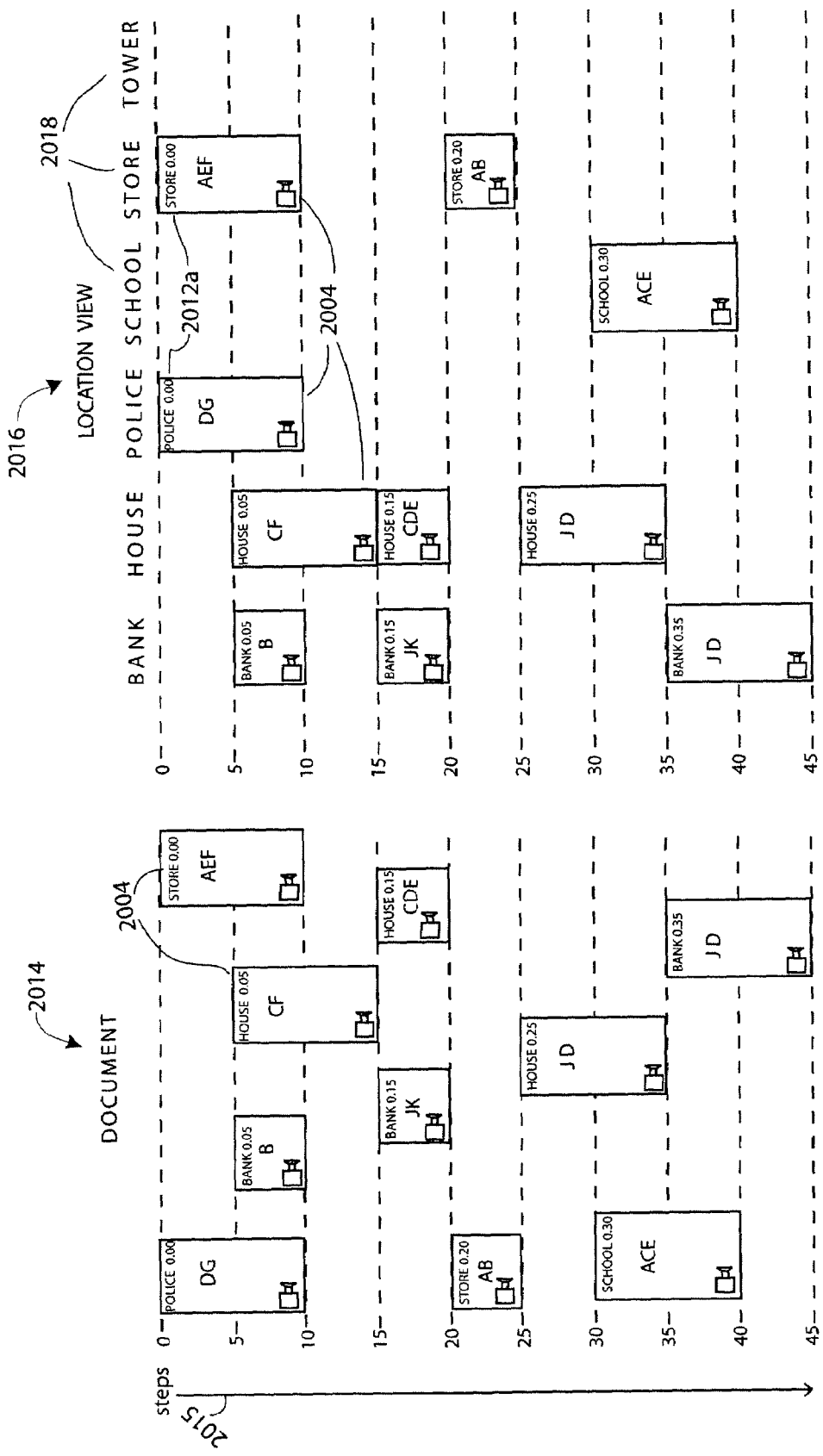

In some examples, script organizing interfaces are constructed from a set of tagged scripts comprising a document, as shown in FIGS. 20A-B, 21A-B, 22, and 23A-B. FIG. 21A shows a simulation chart 2002, transport control 140, and scripts 2004. FIG. 20B shows a third person perspective 2009 of the rendered view 134 (FIG. 2) corresponding to the simulation chart 2002 at the time step used in the current update cycle 124 (indicated by a dotted line 2005). Each script 2004 has been tagged by the text processor 130 (FIG. 2) with a location 2012*a*, one or more agents 2012*b*, and a camera 2012*c* used as the point of view while authoring the particular script 2004. These tags 2012 are dynamically identified by the text processor 130 while the author is writing a scene and stored with the script 2004 for use in generating the script organizing interfaces. An example is shown in the view 2009, where the author has used the POV control 138 (FIG. 2) to position a camera 2006 to write a script containing commands for agents 2010 at the location 2008. Moving around and scripting in this manner, as described with regard to the examples of FIGS. 16 and 17, generates a collection of tagged scripts 2004.

FIG. 22A shows construction of a location view 2016 from the set of scripts 2004 of FIG. 20A. An unsorted arrangement 2014 of scripts 2004 is shown at left to provide contrast. There is no single arrangement of columns in a non-linear set of scripts that is the definitive perspective. Rather, multiple views of a single document are used to gain different types of information. In the location view 2016, the scripts 2004 are arranged in columns 2018 according to the location tag 2012*a*. In practice, the tags themselves may not be displayed, as they are for purposes of this illustration. The vertical position of each box representing a script 2004 corresponds to that script's start time, or step, in the timeline 2015 of the simulation. The height of each box corresponds to the duration of that script. Moving vertically down a column, a location view is useful for following a sequence of scripts as they pertain to a location in the simulation and identifying gaps of activity for a span of time in any given location. The example of FIG. 21A shows a complete lack of scripted content for the location "TOWER." Moving horizontally, a location view is useful in reviewing where activity takes place at a given time, though it may not show the relationship between locations.

Figure 21B:
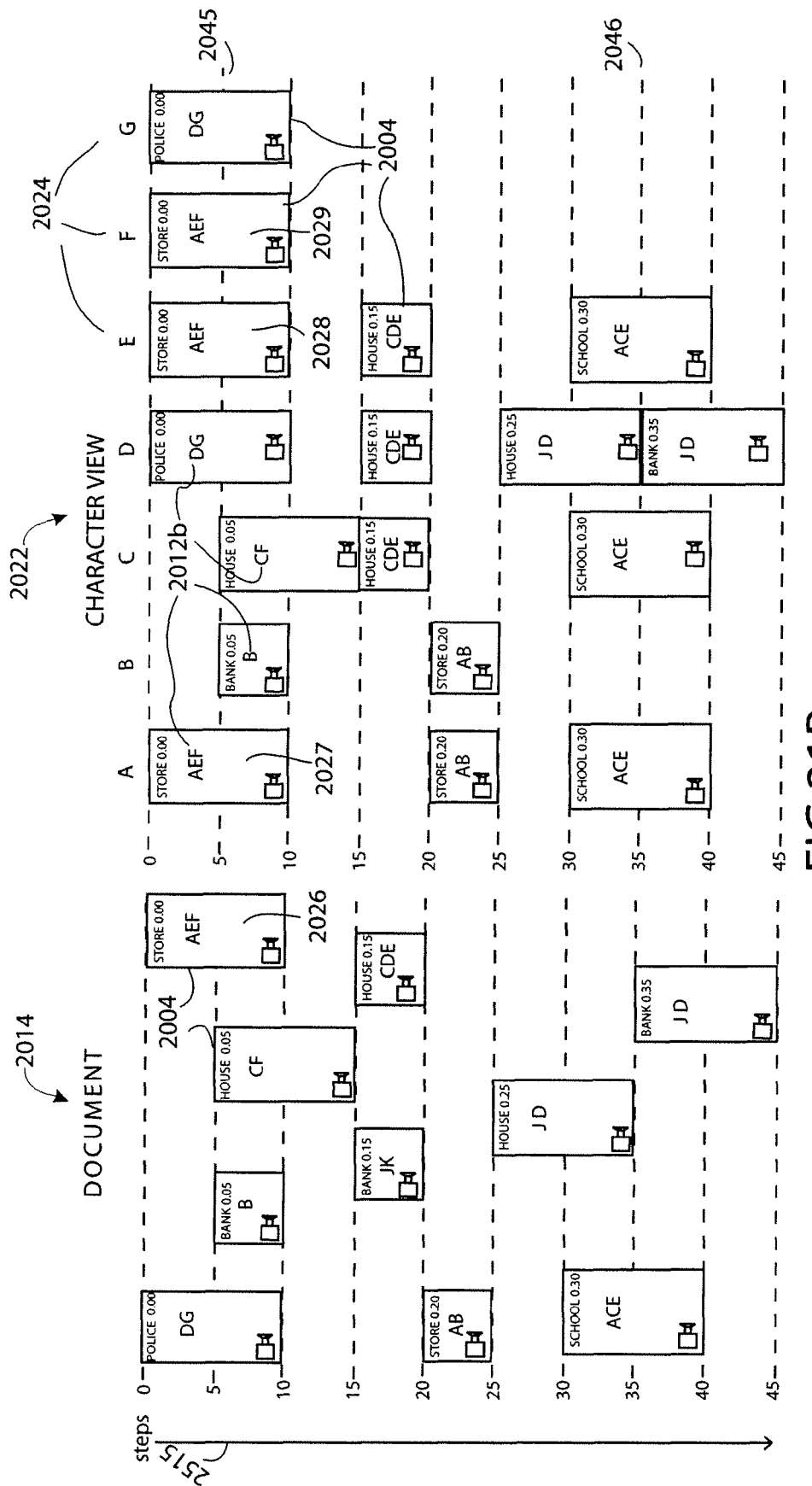

FIG. 21B shows construction of a character view 2022 (the unsorted arrangement 2014 is repeated for clarity). In a character view 2022, the same set of scripts 2004 as in the example of FIG. 21A are arranged in columns 2024 according to character tags 2012*b*. A single script may appear in multiple columns. In the character view 2022, boxes 2027-2029 all correspond to box 2026 of the document view 2014, because all three of the characters A, E, and F are tagged the corresponding script 2004. A character view is useful for identifying gaps in a character's sequence. For example, FIG. 21B shows a lack of scripted content for characters F and G after step 10. Other views can be constructed according to other tags or user-defined tags, such as story threads. Examples are shown in the section below describing user interaction with script organizing interfaces.

These views also provide a way to return to the original point of authorship for any script. In any document view, a user can click on the box representing a script and the user interface is changed to that of FIG. 31. The simulation and corresponding rendered view 134 is restored to the state the simulation had at the start time associated with the script. The point of view is set to camera associated with the script. In this way, the document view, arranged according to any given tag, provides a high-level interface for navigating the simulation in time and space. This is useful for reviewing the content of a large simulation over the course of time.

These views also provide a rich set of playback functions that can aid in the authorship process or form the basis of an entertainment device. In any document view, a user can select the name of the location, character, or other tag at the top of a column to playback an entire sequence of scripts in a movie-style presentation. This is accomplished based on the information stored automatically in each script. The simulation is cued to the start time associated with the script, and the point of view of the rendered view is set to the camera associated with the script. The simulation is then rendered and the rendered view is played for the duration of the script. This is repeated for each scene in a sequence, resulting in a movie-style playback of linear sequences of scenes through a non-linear medium. In some examples, a movie view, as described below, provides a tool for an author to manually define custom sequences of scenes by selecting scripts from the automatically-generated character and location views.

Figure 22:
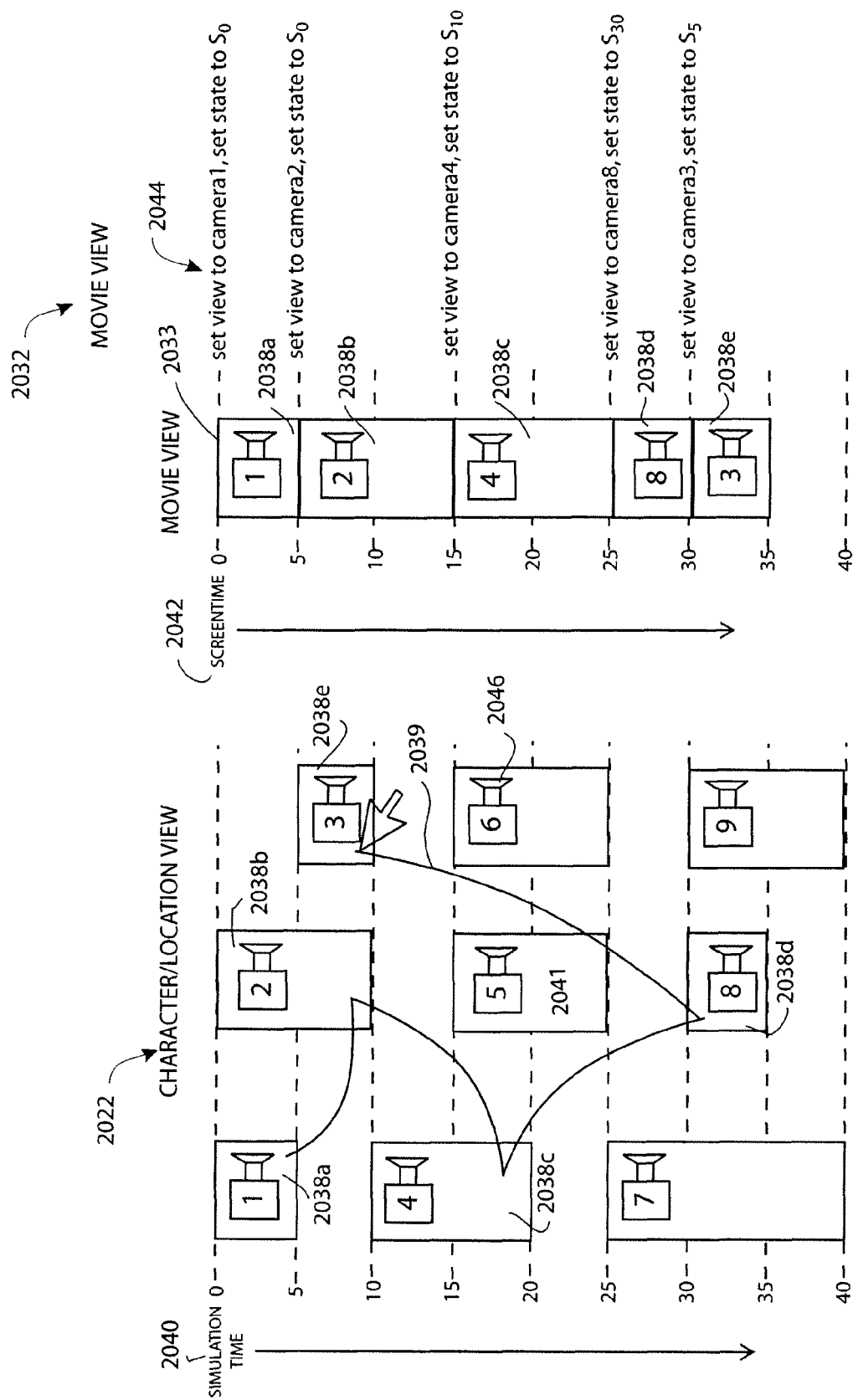

Sequences of scripts pertaining to converging and diverging story lines may be difficult to follow on a view where the scripts are arranged by location (as in FIG. 19) or character (as in FIG. 21B). FIG. 22 shows an interface for construction of a movie view 2032. A movie sequence 2033 is a custom sequence that may contain scripts in non-chronological order representing a particular narrative thru-line defined by the author. The author defines a custom sequence 2039 of scripts by selecting a sequence of scripts from a character, location, or other tagged document view 2022. In the example of FIG. 22, the user has selected boxes 2038a-2038e from the document view 2022. In the document view 2022, a script's vertical position corresponds to simulation time 2040. The sequence can be named by user input. The sequence 2039 of scripts defined by the author is displayed as the movie sequence 2033 in the movie view 2032 where the vertical position of each script 2038i corresponds to screen time 2042. The first selected script 2038a is set to begin at screen time zero, and the starting screen time for each successive script 2038b-2038e is automatically computed by adding together the start time and the duration of the previous script. This interface allows for non-chronological sequences of scenes. The run-time of a sequence as it will be played out on the screen is clearly shown as soon as the scenes are selected.

Playback of non-chronological sequences of scenes is possible using a simple set of instructions 2044. To play a given script in the sequence 2033, the system sets the state of the simulation to the start step associated with that script, and sets the POV to the camera associated with the script. The commands 2044 to set the starting state and camera for each script in the sequence may be added to the data defining the sequence or computed on the fly based on the tags in each script. Scripted commands in all scripts (including those not chosen for the movie view but taking place at the same time in the simulation, such as script 2041) have already been distributed to the agents and are executed regardless of which script is being used for playback. Through this movie view interface, the camera tags and start steps of a script are used disjointedly from other attributes of a script to create sequences of camera control.

Figure 23B:
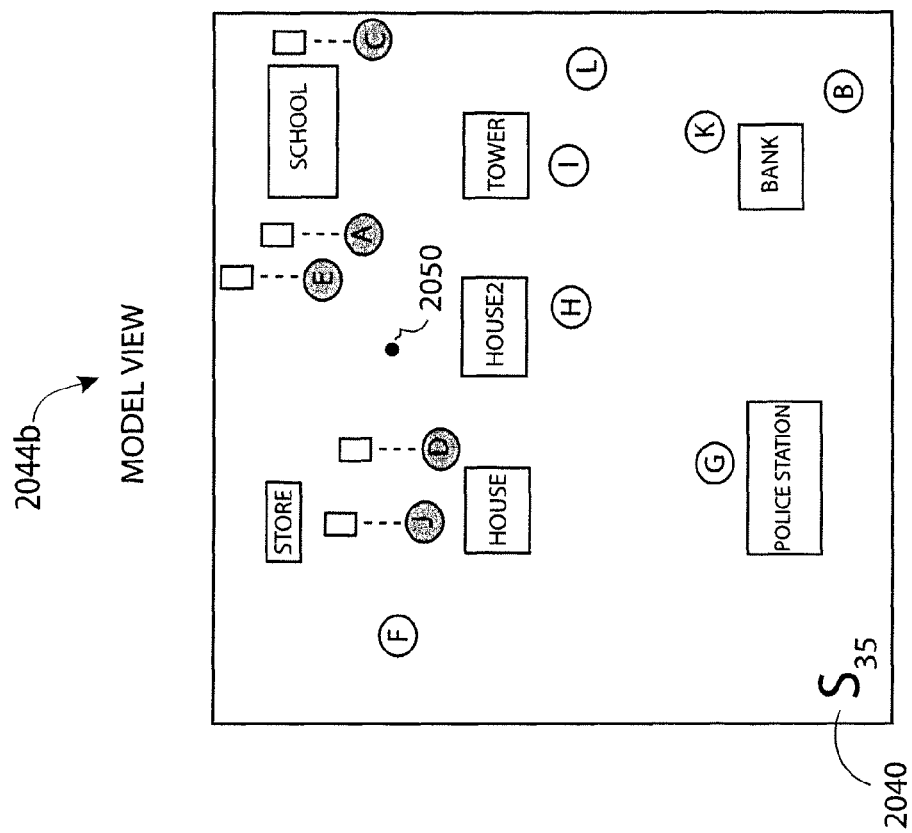
Figure 23A:
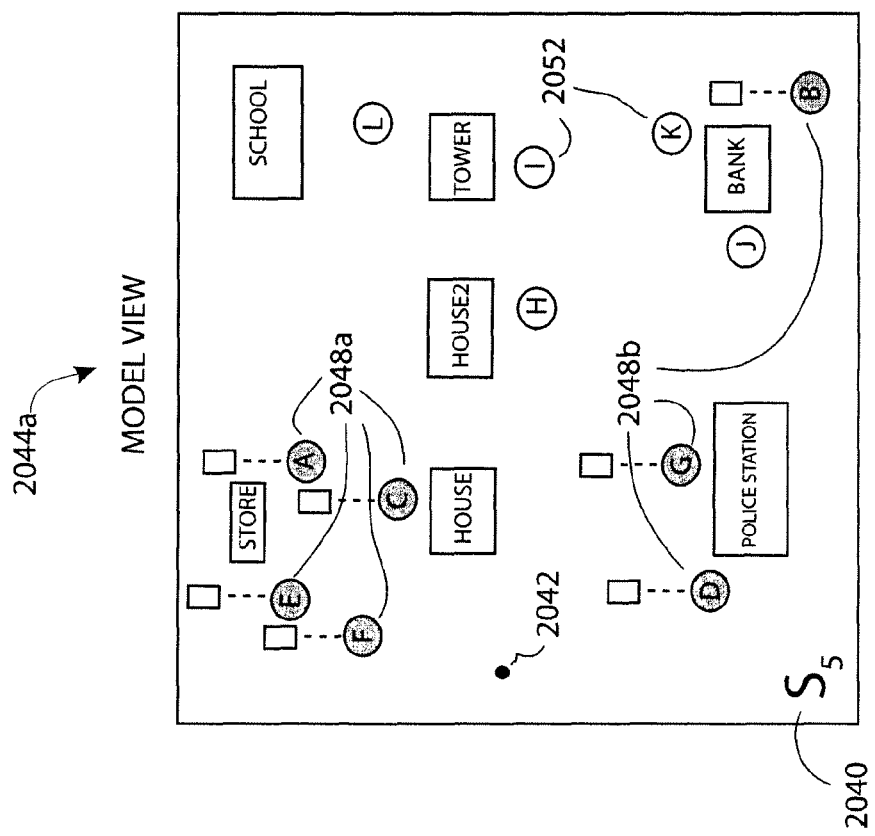

FIGS. 23A and 23B show instances of a model view 2044a, 2044b. A model view is an alternative way to use the rendered view 134 to view a document. In some examples, it is difficult to use the location view to determine which scripts affect a particular area of the model at a particular time. Scripts that start at different locations may converge in an area of the model but not converge graphically in the columns of a location view, where the arrangement of location columns may not reflect the locations' geographical proximity in the model. The model view is constructed by highlighting agents 2048 in the rendered view that have script associations at a the current time step (shown by an indicator 2040). In FIG. 23A, the model view 2044a shows agents 2048a and 2048b highlighted at time step 5. This corresponds to the set of scripts intersecting the dashed line 2045 of FIG. 21B. This view is useful to an author viewing the simulation at a position 2042 in the model. Other agents 2052 are not highlighted, indicating that they are not participating in any script at the current time step. FIG. 23B shows the model view 2044b at time step 35. The set of scripts available from this view correspond to the scripts intersecting the dashed line 2046 in FIG. 21B. This is useful to an author viewing the simulation at a position 2050. In some examples, selecting a highlighted agent retrieves the script and loads it into the editor 126. In some examples, a user double clicks a highlighted agent and the user interface changes to that of FIG. 31.

The document views described above automatically generate linear sequences of scripts pertaining to the different objects in a simulation while the author writes. This frees the author to develop content in a non-linear fashion. In pursuit of a particular story or set of stories, an author may jump around in time, authoring scenes which incidentally involve many different locations and characters. This process may not correspond to methodically filling in the rows or columns of a character or location view, but rather involves generating scenes to cover the significant events required to produce a certain narrative effect. In other words, the invention automatically generates these views, and they are useful for maintaining comprehension, measuring progress, retrieving previously authored scripts, identifying gaps, developing story lines, and generating a rich set of playback options. The views do not constrain the author to a particular method or order of content development.

On the other hand, an author may choose to partially use the guidance provided by the script organizing views to manually create one set of scripts, and the system will automatically create other sets. For example, an author may choose to author scenes by location and have the system generate a set of scripts by character. Conversely, and author may choose to author scenes by character, and have the system generate a set of scripts according to location. In other examples, an author may choose to author scripts according to a particular set of story lines, and have the system generate both character and location scripts. Interactions with a script organizing interface are shown in FIGS. 34A-D, described below.

Using the POV control, transport control, text editor, and document views, an author can effectively shape a fixed-work simulation. The author writes significant scenes, while artificially intelligent agents self-animate and fill-in actions between scenes (e.g., if an agent has lines in two scenes in different locations, and not inbetween, the simulation can make the agent walk between the locations, absent other direction). The creation of camera agents for each script allow an author to script a portion of action and the camera control best suited for view that portion of action. The authoring session is interactive, in that the rendered view provides feedback while the author is writing. Automatic camera tagging of scripts provides rich playback options and a convenient way to return to the point of authorship for any script. Document views provide high-level abstraction making it possible for the author to focus on converging and diverging plot lines involving entire scenes, rather than individual commands. Several detailed examples of various features follow.

ILLUSTRATED EXAMPLES

FIGS. 24A through 24J illustrate an example of parallel scene authorship. The text editor 126 contains the script. The script contains a lead integer 2108 designating, in this case, that subsequent commands in the text editor will be associated with subsequent iterations of an update cycle 124 beginning at time step 0 in the simulation. A simulation containing agents A-F is represented by a chart 2102 showing boxes 2114 representing which controls are active at each step. The boxes 2114 are arranged in columns 2110 corresponding to the agents 120 of the rendered view 134. Grey boxes 2114 indicate non-authorial control executed at a time step. A black box 2114 in a column indicates authorial command at a time step. The rendered view 134 displays the state of the simulation according to the cumulative effect of rows in the chart above the dashed line 2112 that indicates the time step corresponding to the current cursor position in the editor 126. In the example of FIGS. 24A-24J, the rendered view 134 is shown as a two-dimensional plan view, but it could be any view suitable for showing the author what is happening in the simulation, such as the three dimensional perspective view in FIG. 31. The cursor position 128 controls execution of the update cycle 124, and the position within the simulation. The text processor may tag this script with the location "STORE," based on the location notation at the beginning of the script.

Figure 24A:
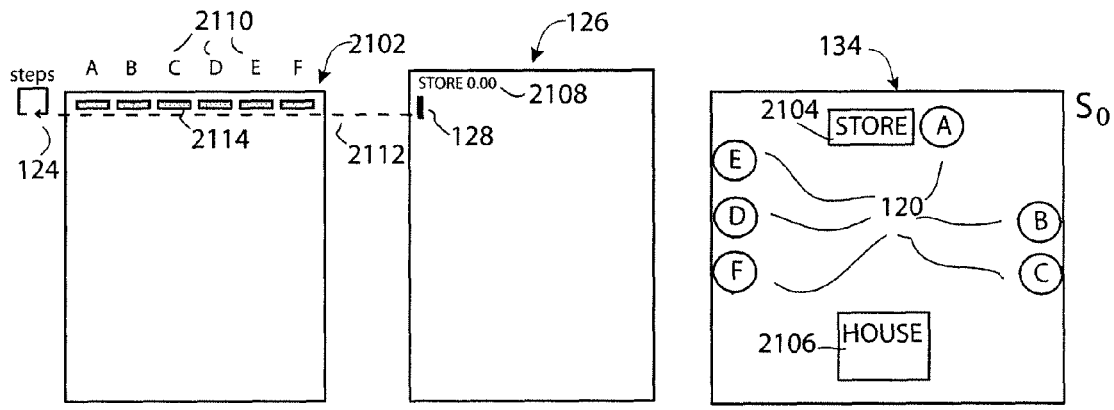
FIGS. 24A-J show parallel script authorship.
Figure 24B:
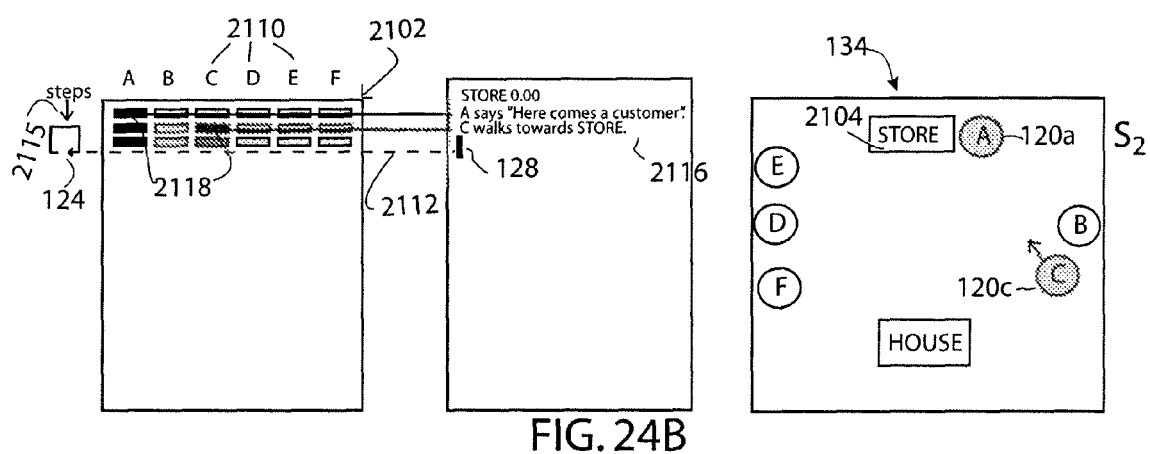
Figure 24C:
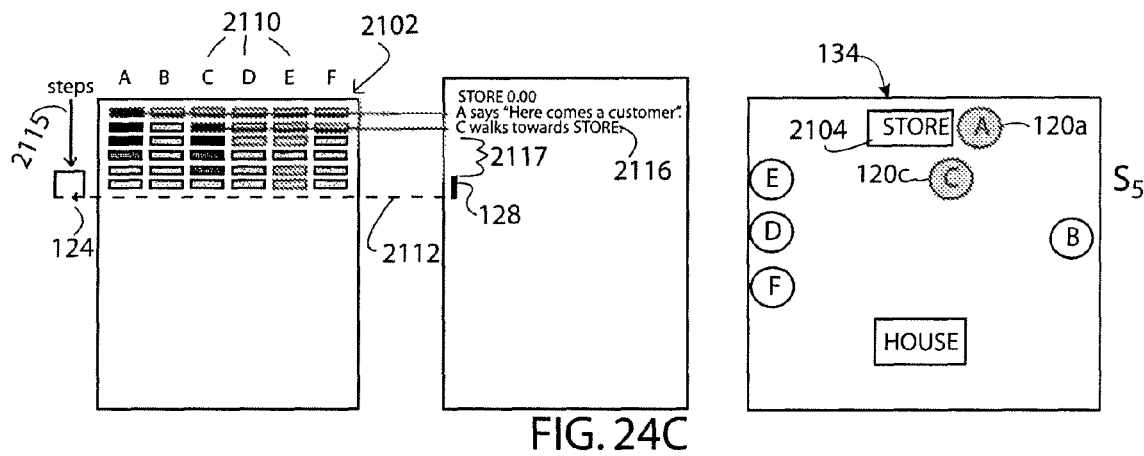
Figure 24D:
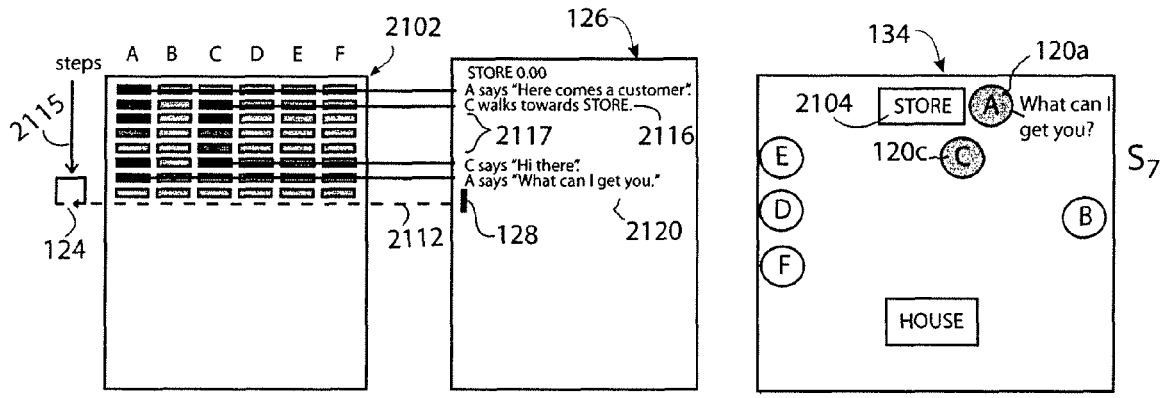

In the example of FIG. 24A, no authorial commands have been scripted, so all the boxes 2114 are grey and none of the agents are highlighted. In FIG. 24B, the author has scripted two lines of text 2116, extending the timeline 2115. While the author was typing, the text processor 130 found two commands, "A says . . . " and "C walks . . . ," and advanced the simulation accordingly. A command for agent A was found in the first line and associated with time step 0 according to the rules of the grammar. A command for agent C was found in the second line and associated with time step 1. The commands were sent to the agents as represented by the black boxes 2118 in columns A and C, in rows 0 and 1 respectively, of the chart 2102. The text processor 130, based on the cursor position 128, has sent control messages to the update cycle 124, causing two steps of the simulation to be computed. The state $S_2$ at time step 2 is computed and displayed in the rendered view 134. Agent C 120c is seen having begun executing the command issued at time step 1 by traveling on a vector towards the Store 2104. Agents A and C are highlighted, indicating their participation in a script at the present time step. Subsequent lines 2117 inserted in the text editor cause program execution to advance the state of the simulation to state S5, for time step 5, as illustrated in FIG. 24C. In this figure, the agent C 120c has now reached the store 2104.

Figure 24E:
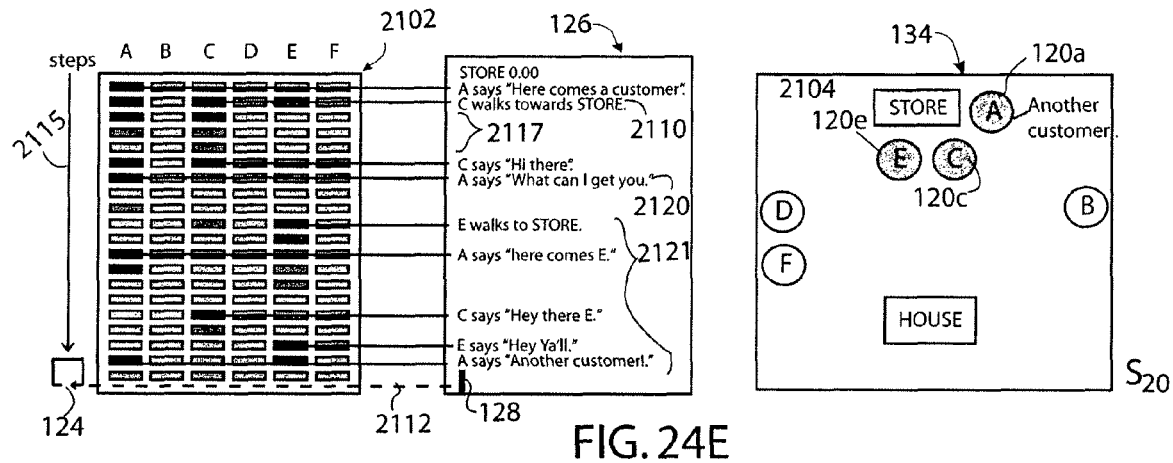
Figure 24F:
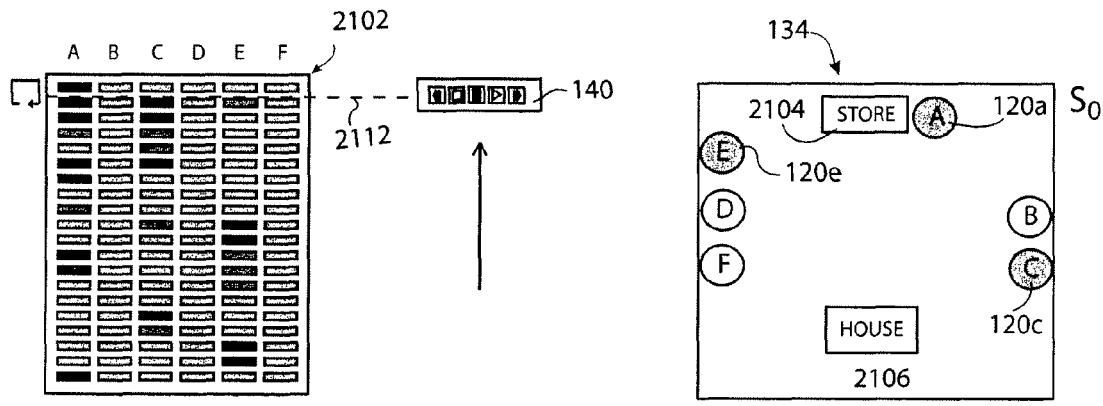

Access to continuously updated state information, made possible by running the simulation while editing the scripts, aids the author in timing scenes. Observing the agent C's arrival at the store, the author proceeds in FIG. 24D to script a conversation between agents A and C including additional lines of text 2120. The cursor position 128 has advanced and causes the update cycle 124 to advance the simulation to a state $S_7$ as displayed in rendered view 134. FIG. 24E shows the completion of the script with more dialogue 2121 and now includes agent E 120e. Agent E is also now highlighted in the rendered view 134. Agent A 120a is seen in the view executing the speak command with the text "Another customer." In the example of FIG. 24E, the simulation has been advanced to time step 20. In FIG. 24F the author employs the transport control 140 to "rewind" the simulation and restore the state to $S_0$. The rendered view 134 reflects that the state of the simulation has been restored to that which it had in FIG. 24A. This enables a second pass, or iteration, of scripting to take place over the same time period in the simulation. The author can now script a second scene while the first scene is playing back.

Figure 24G:
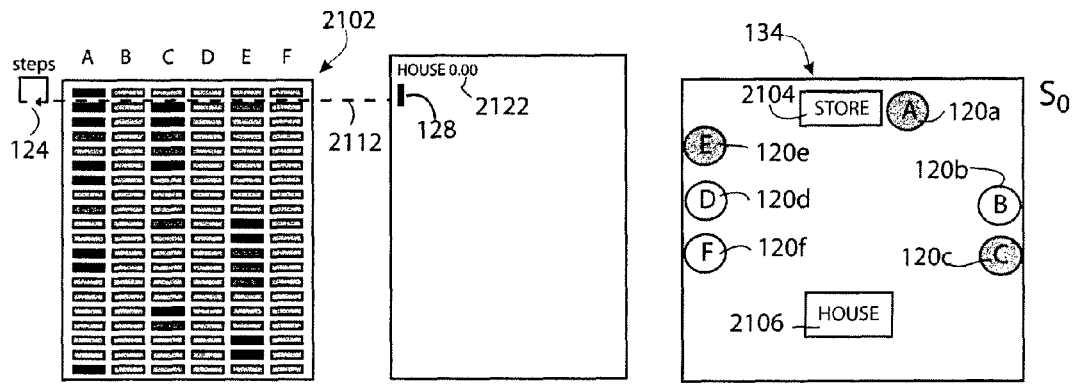

FIG. 24G shows the author beginning a second script to define a scene at the house 2106. The lead integer 2122 of the script is 0, indicating this scene will begin at the same time step as the scene authored in FIGS. 24A-E. The rendered view 134 is restored to state $S_0$, the same state shown in FIG. 24A. Agents A, C, and E, 120a, 120c, 120e, are highlighted indicating their participation in the first script authored at this time step. Agents D, F, and B, 120d, 120f, 120b, have yet to be identified as participating in any script at this time step and remain un-highlighted.

Figure 24H:
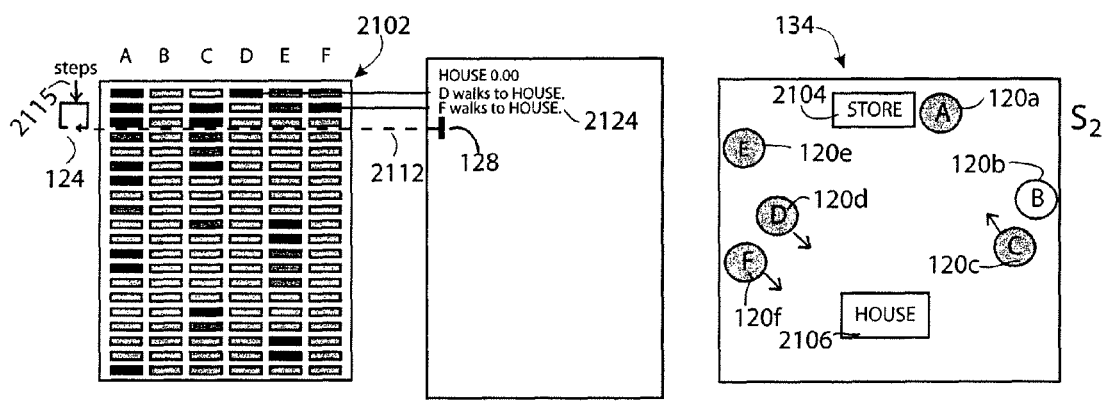

In FIG. 24H, the author has completed two lines of text 2124 containing commands for agents D and F, 120d, 120f, at time steps 0 and 1, respectively. The cursor 128 has been advanced to line 3 for time step 2 and caused two iterations of the update cycle 124, which in turn activated the commands for agents D and F. The progress of agents D and F is shown in the rendered view 134, as well as agent C's progress. Agent C is executing stored commands issued from the first script as shown in FIG. 24B.

Figure 24I:
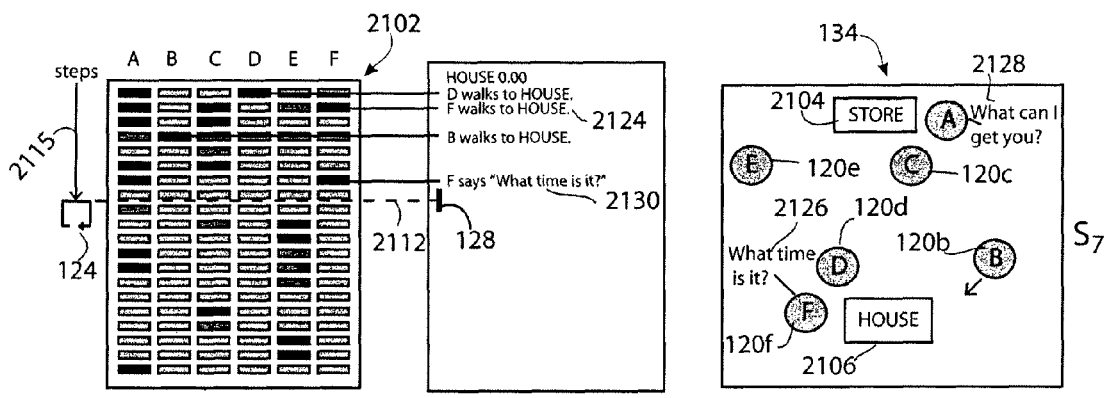
Figure 24J:
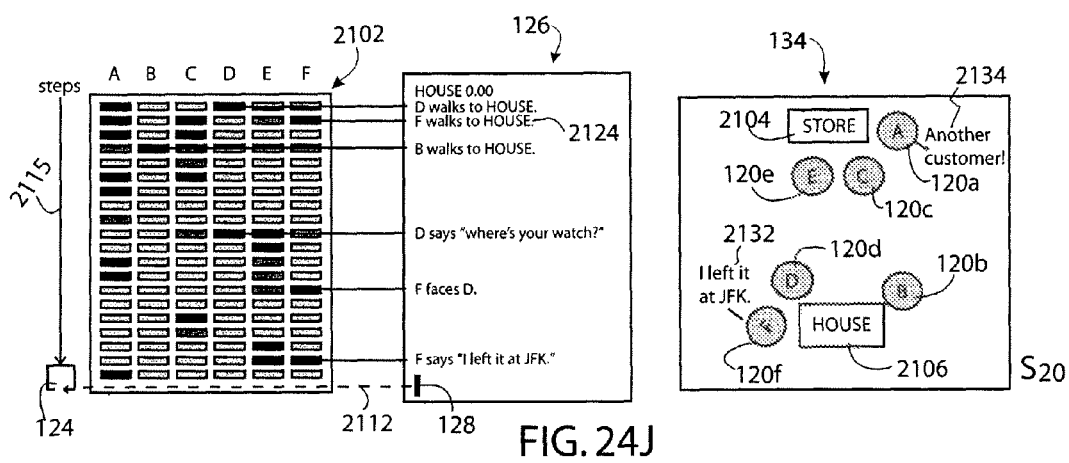

In FIG. 24I, the author has continued the scene at the house 2106 by including agent B 120b and writing a dialogue command 2130 for agent F at time step 6. The command 2130 is executed at step 6 resulting in dialogue text, 2126, rendered at state $S_7$, shown in the rendered view 134. Here the new dialogue is executed simultaneously with dialogue 2128, scripted in FIG. 24D. The author completes the second scene in FIG. 24J with additional dialogue 2132 that is executed in parallel with dialogue 2134, scripted in the last line 2121 of script in FIG. 24E.

Figure 25A:
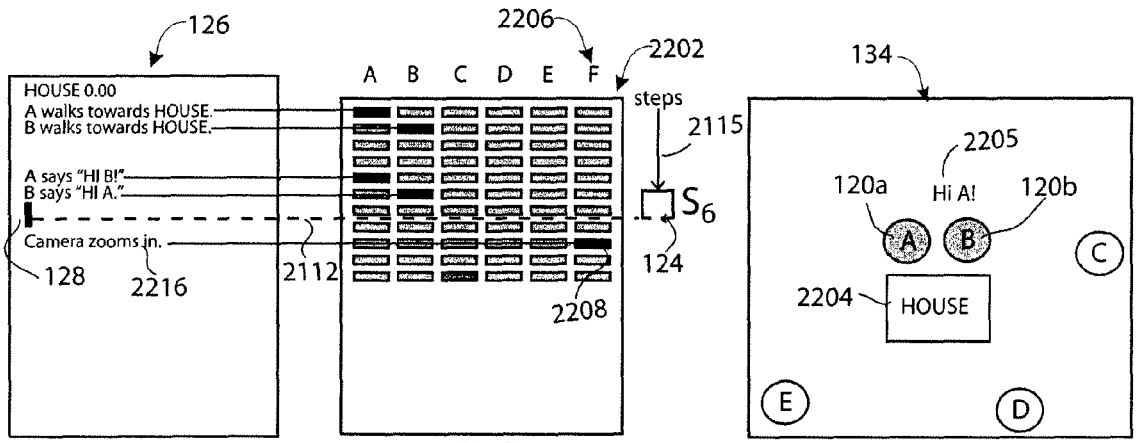
FIGS. 25A-I show script editing.

FIGS. 25A through 25I illustrate an example of script editing capabilities and coupling scripted action with scripted camera control. In FIG. 25A, the text editor 126 contains a script in progress with corresponding chart 2202. Agents A and B, 120a-120b, are being scripted in a scene at a house 2204. Agent B has executed a command stored at time step 5 resulting in dialogue text "Hi A!" 2205 in the rendered view 134 appearing at the current time step 6. In this example, agent F, in column 2206, is not a character, but is the camera controlling the POV of the rendered view 134. In some examples, the camera agent is automatically added to the simulation by duplicating the parameters of the POV control 138 when the author launches the text editor 126 to begin a new script. This allows the author to couple scripted action with a set of camera commands tailored to meet the needs of a particular scene.

Figure 25B:
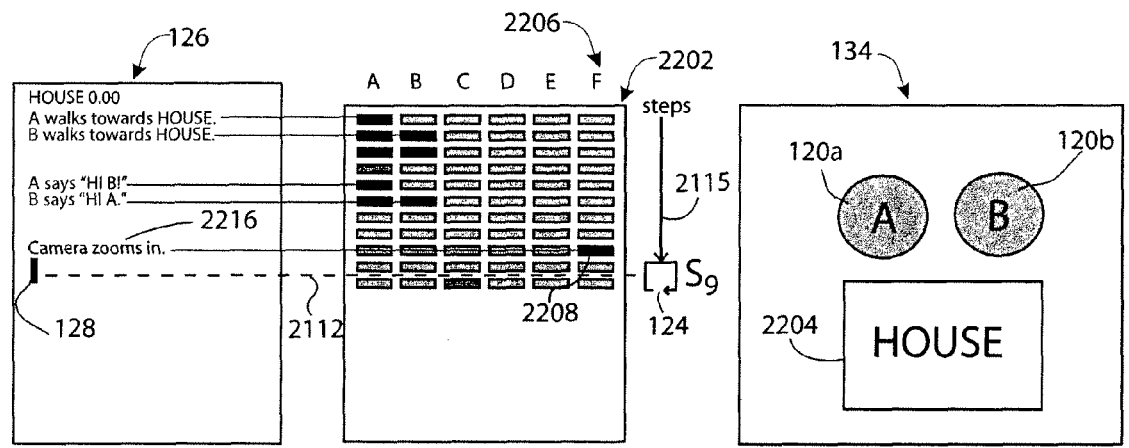

The simulation is paused at time step 6 before a "Camera zooms in" command 2216 in FIG. 25A because the cursor 128 is in the line preceding that command. In FIG. 25B, the author has moved the cursor 128 to the line immediately following the camera command 2216. The command 2216 is represented by block 2208 in the column representing the camera agent 2206. The text processor has sent a message to the simulation calling on all agents in the simulation, including the camera agent F, to update their state according to the current time step. This results in the camera zooming in as shown in the rendered view 134 for FIG. 25B. The text processor tags this scene with a camera tag to be used later in the playback modes provided by the script organizing interfaces.

Figure 25C:
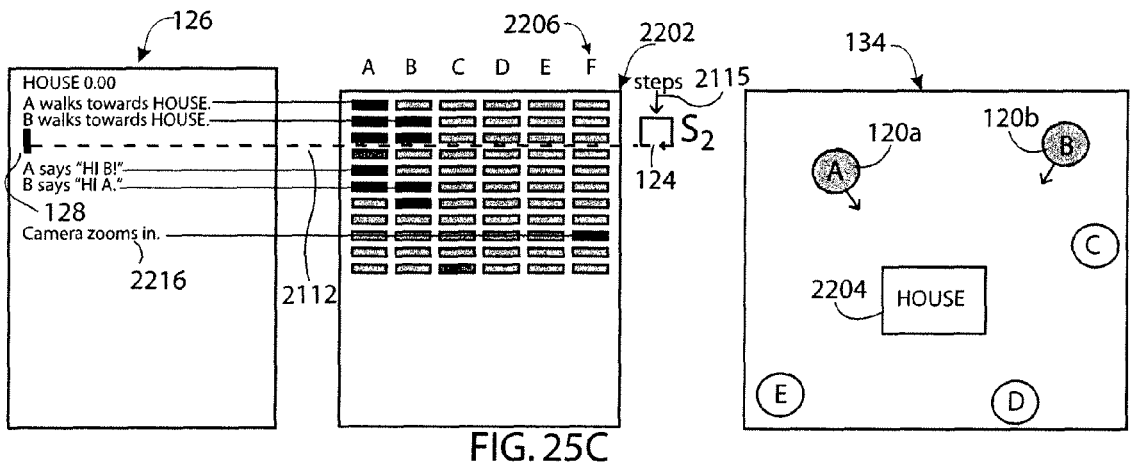
Figure 25D:
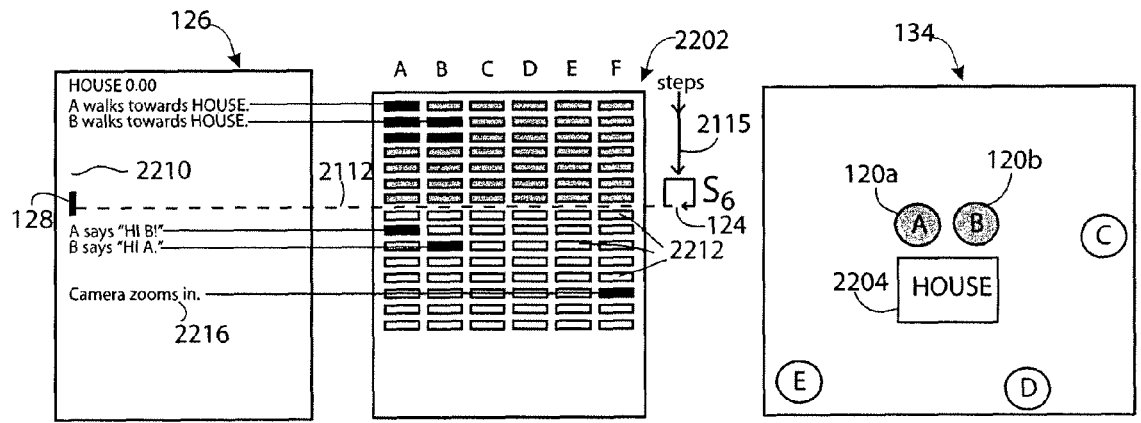

In FIG. 25C the author has moved the cursor 128 to a point in the script prior to a conversation between agents A and B. The text processor has sent a control message causing the simulation to be cued to a prior step 2 and the rendered view 134 reflects the prior state of the simulation $S_2$. This includes A and B prior to arriving at the house, and the camera in its initial zoomed-out state. In FIG. 25D, four new lines 2210 have been inserted, pushing the conversation and camera commands down 4 steps in the simulation. This operation would not affect the times associated with any commands issued to agents by scripts other than the script currently displayed in the editor 126.

Figure 25E:
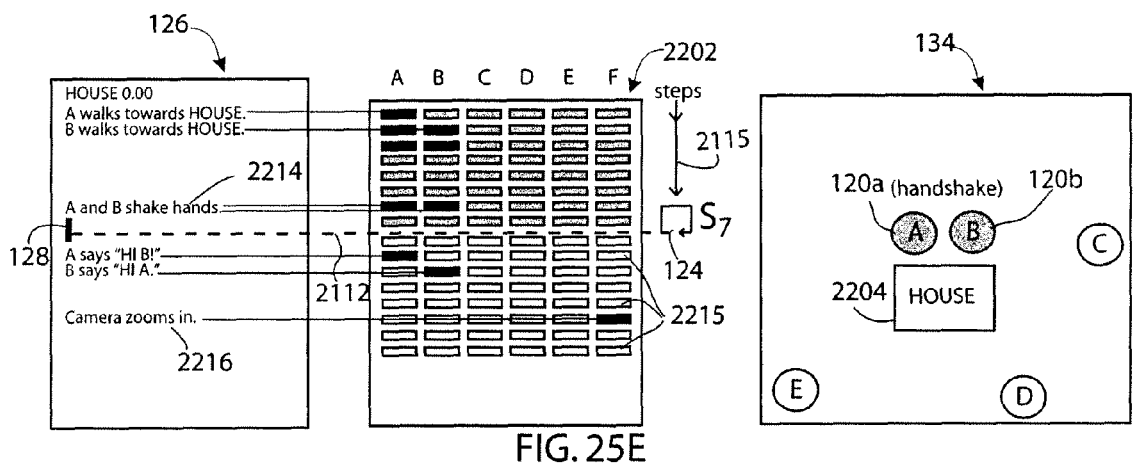
Figure 25F:
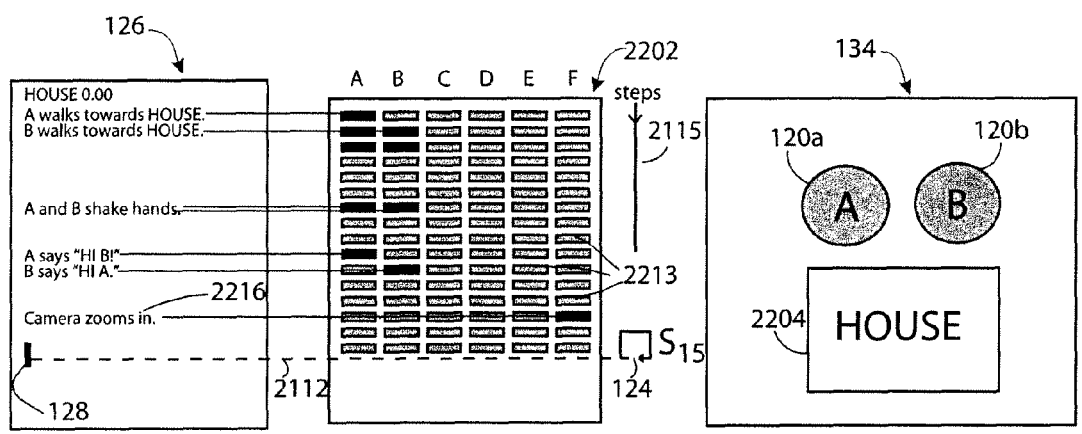

Clear boxes 2215 in the simulation chart 2202 indicate invalidated time steps. When a change is made in a script affecting commands, including inserting of time, as in FIG. 25D, time steps beyond the point of the edit, though possibly solved at one point, are assumed to now be invalid. They will be resolved the next time the cursor is advanced and the update loop 124 executed. FIG. 25E shows the author has observed that the agents A and B 120a-120b arrived at the house and inserted a "handshake" command 2214. In FIG. 25F, the cursor 128 has been moved to the last line of the scene, causing all time steps to be resolved as indicated by the solid boxes 2213. The rendered view 134 in FIG. 25G reflects the state of the simulation after the zoom command 2216 has again been executed.

Figure 25G:
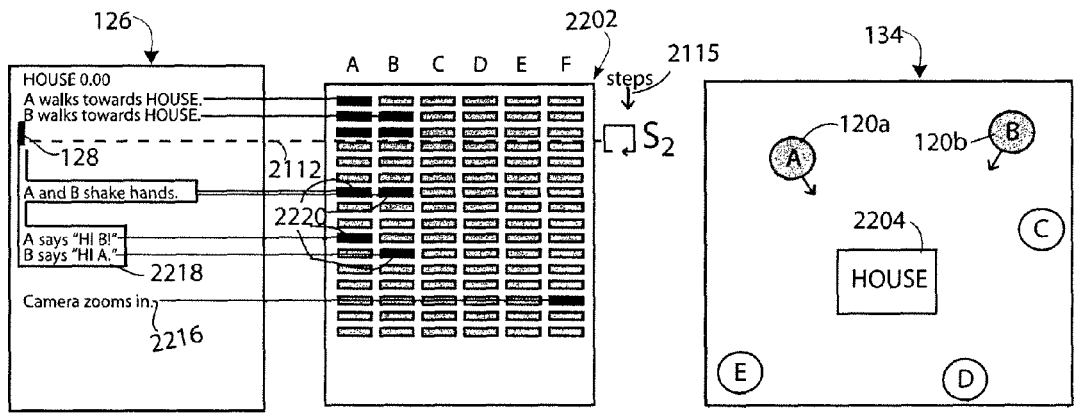
Figure 25H:
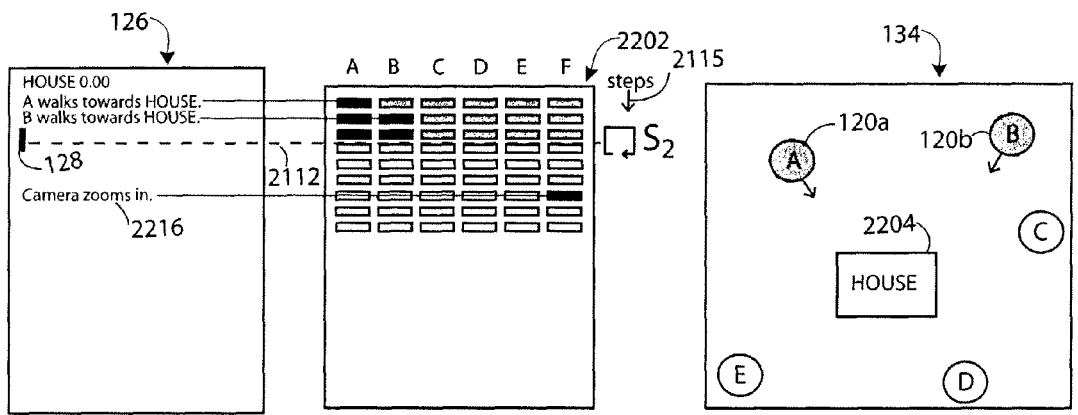
Figure 25I:
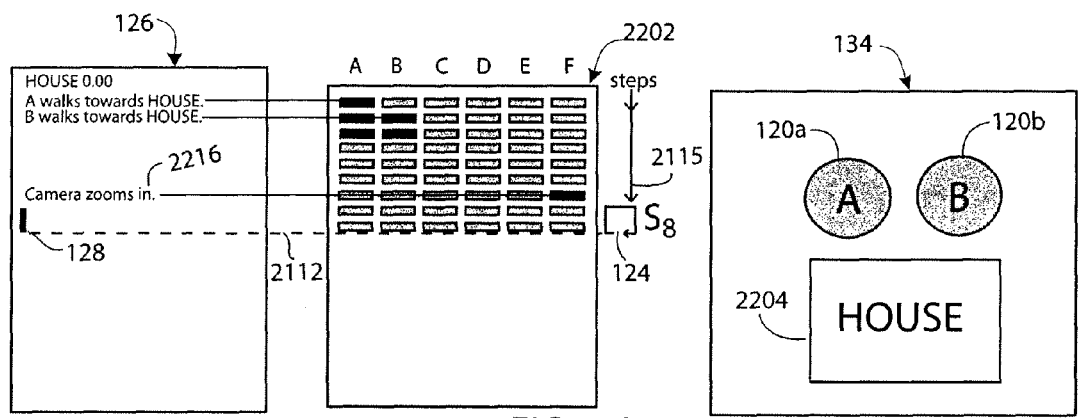

FIG. 25G shows the author selecting lines of text 2218. This has been accomplished by dragging upwards in the editor leaving the cursor 128 at a prior line (e.g., using standard text document editing tools). Commands 2220 stored in the simulation correspond to the selected text 2218 and would be deleted if the text 2218 were deleted. The text processor has sent a message to cue the simulation to step 2, given the position of the cursor 128. This is useful because the rendered view shows the author a state of the simulation that a delete operation will result in, before that delete operation is executed. In certain cases, this is useful for deciding how much action to delete. In FIG. 25H, the selected text 2218 of FIG. 25G has been deleted. Commands 2220 of FIG. 25G have been removed from the agents in the simulation chart 2202. In FIG. 25I the author advances the cursor 128 to the end of the scene, and the rendered view 134 reflects the fact that commands (e.g., the zoom command 2216) after a delete operation remain unaffected.

Figure 26A:
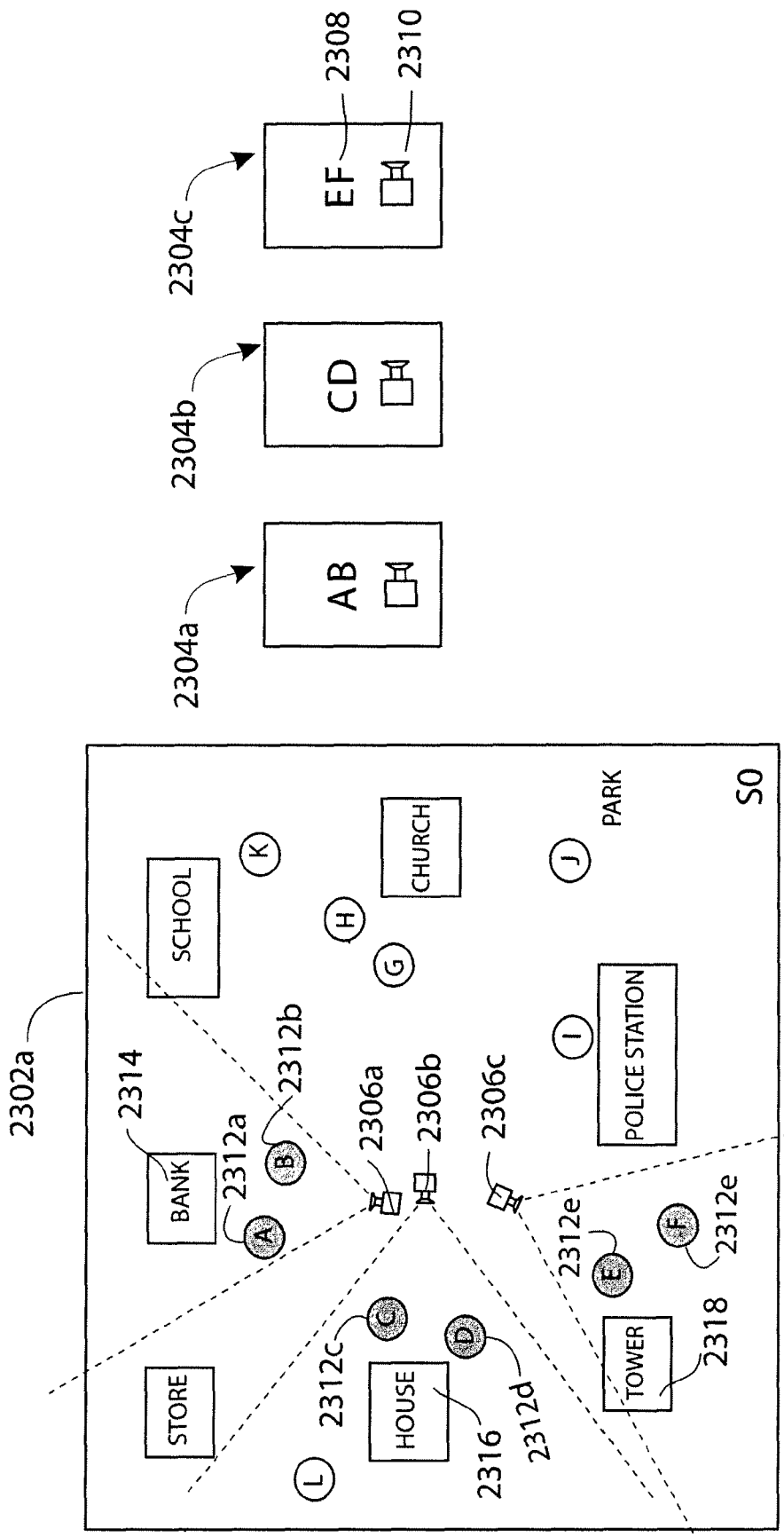
FIGS. 26A-E and 27A-B show content development.

FIGS. 26A through 26E and 27A and 27B illustrate an example of content development of the new narrative structures made possible by the system described above. FIG. 26A shows a third-person idealized view 2302 of the simulation, including agents, locations, and cameras. The cameras 2306a-2306c represent three different points of view chosen by the author to script three scenes 2304a-2304c. In some examples, the author has achieved this state by alternatively using the POV control 138 and text editor 126 to author one scene and using the transport control 140 to rewind to time step 0 to author another scene. The camera icons 2306a-2306c are all displayed in FIG. 26A for purposes of illustration, though they may not appear in the rendered view. The scripts 2304a-2304c are tagged with a reference to the camera 2306a-c used and the agents 2312-af included in each script. For example, script 2304c has tags 2308 for characters E and F 2312e, 2312f included in the script and a tag 2310 as a reference to camera 2306c used to author the script. The camera positions represent the author's determination of a suitable point of view for viewing the particular portions of action defined by each script. Here, the author has agents A and B 2312a, 2312b at the bank, C and D 2312c, 2312d at the house, and E and F 2312e, 2312f at the tower. Though the view 2302a shows the position of agents at time step 0, the step at which the scripts were originated, the scripts may cover dialogue and action for the time span of steps 0-30, for example.

Figure 26B:
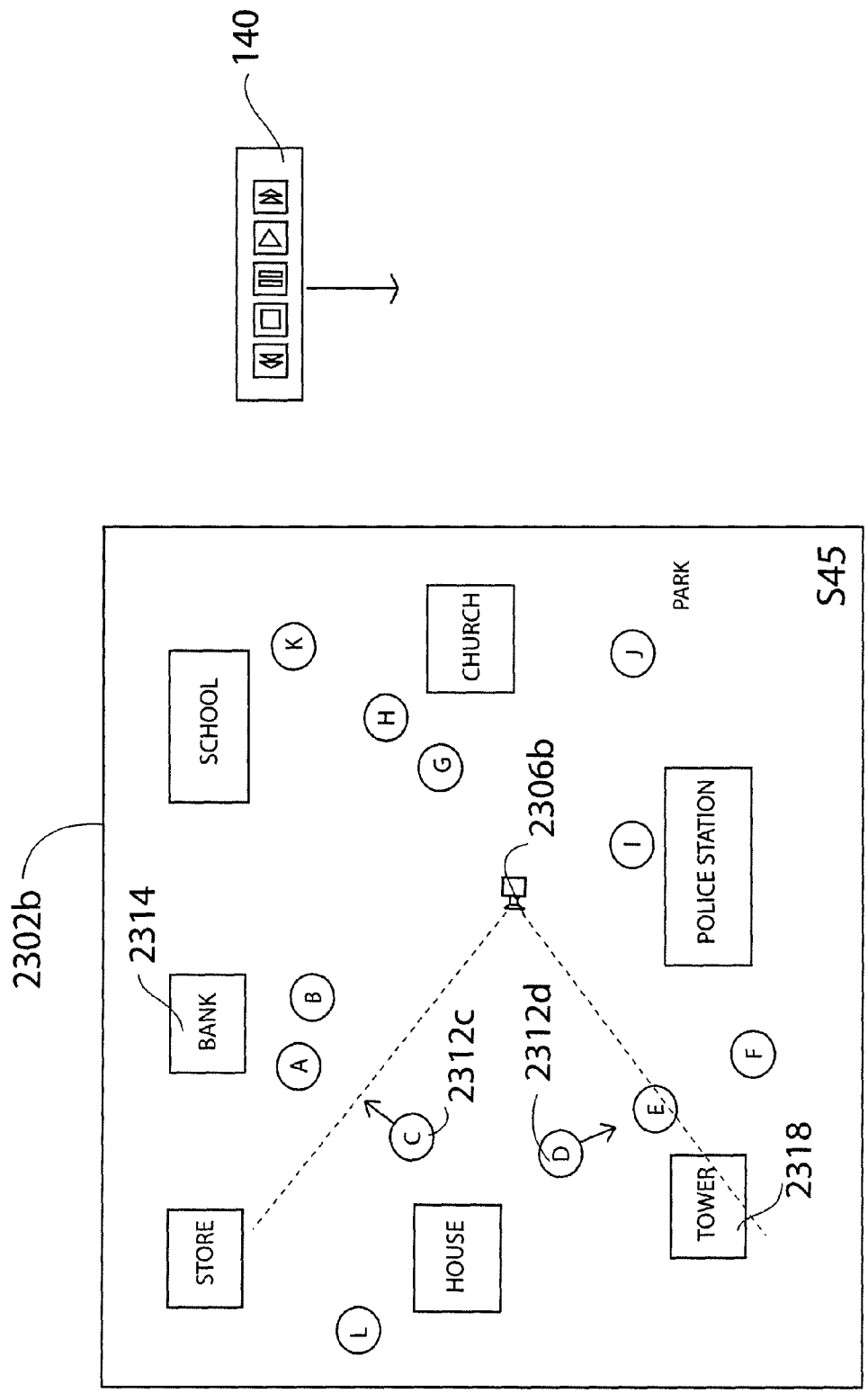

In FIG. 26B, the author advances the simulation using the transport control 140. The view 2302b shows the state at time step 45 and agents C and D 2312c, 2312d are seen traveling on vectors towards the bank 2314 and tower 2318 respectively. The commands initiating this action may have originated at the end of script 2304b of FIG. 26A.

Figure 26C:
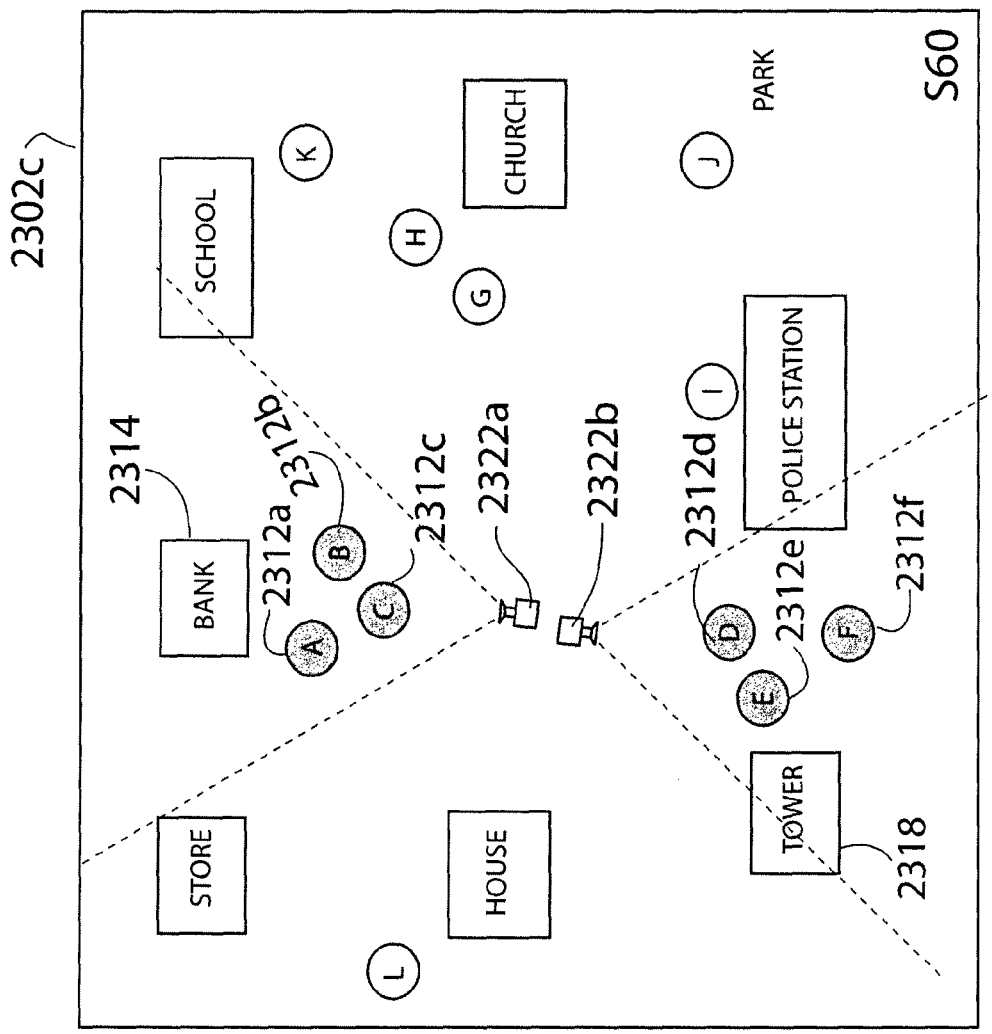
Figure 26D:
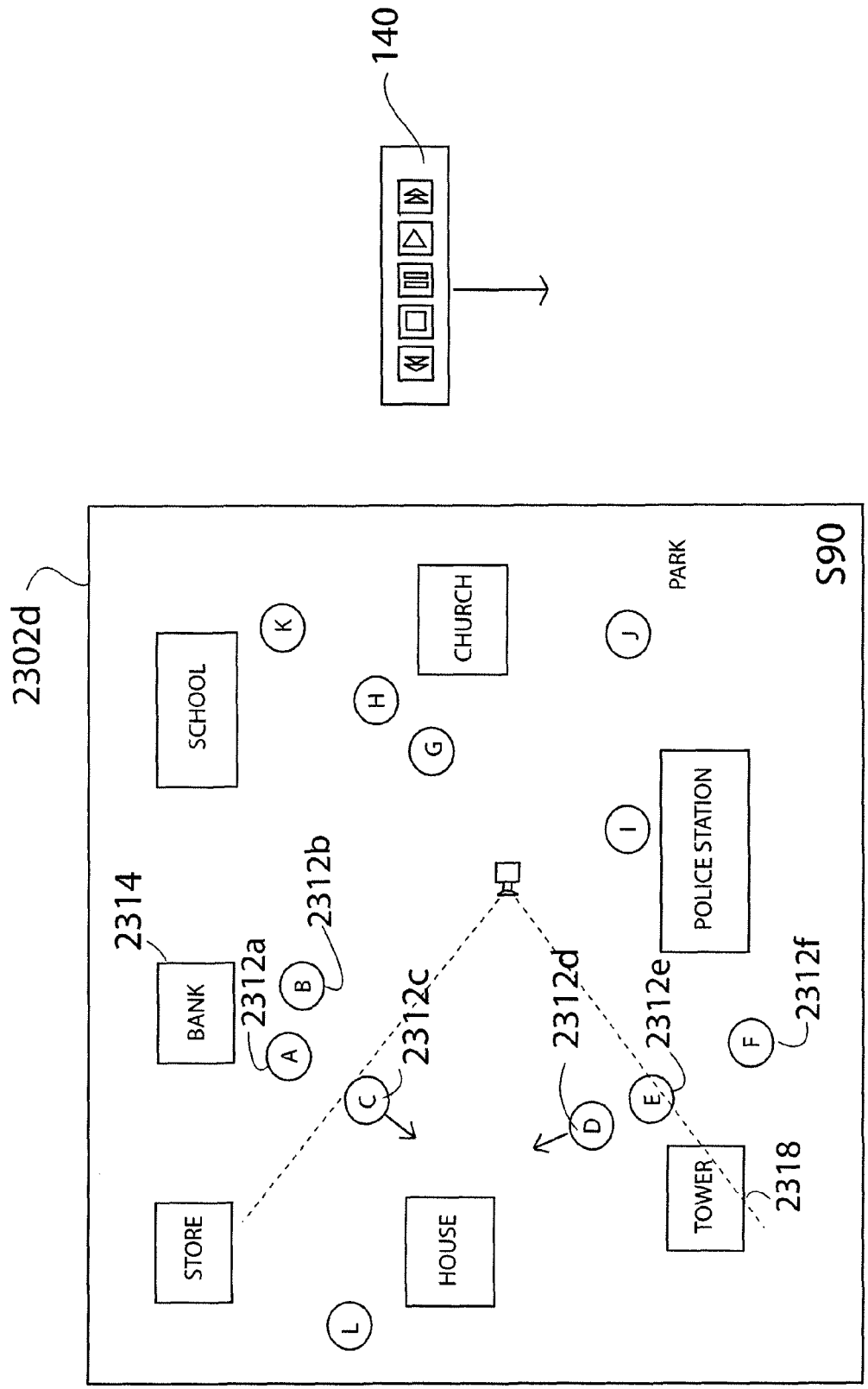
Figure 26E:
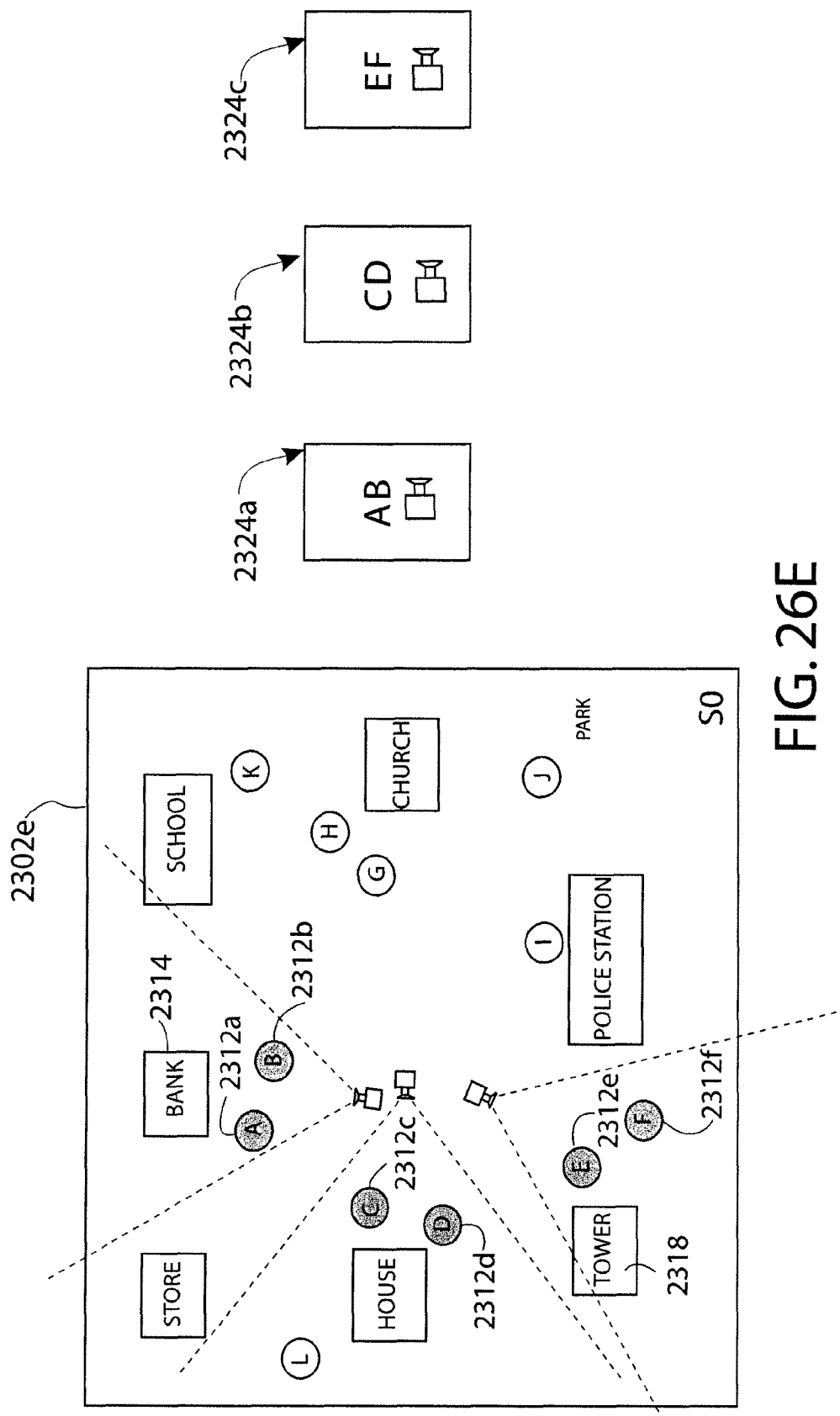

FIG. 26C shows a view 2302c of the simulation at time step 60 where the author has completed two additional scripts 2320a and 2320b using camera positions 2322a and 2322b. The author may have advanced the simulation using the transport 140 as shown in FIG. 26B until agents C and D 2312c, 2312d had reached the bank 2314 and tower 2318 respectively. Having observed this, the author stopped using the transport 140 and launched the text editor 126 to script the additional content at the tower and bank. In FIG. 26D, the author uses the transport 140 to advance the simulation. Agents C and D are seen in view 2302d returning to the house, and in FIG. 26E the author writes a set of three scripts 2324a-2324c at the bank, house and tower, for view 2302e.

Figure 27A:
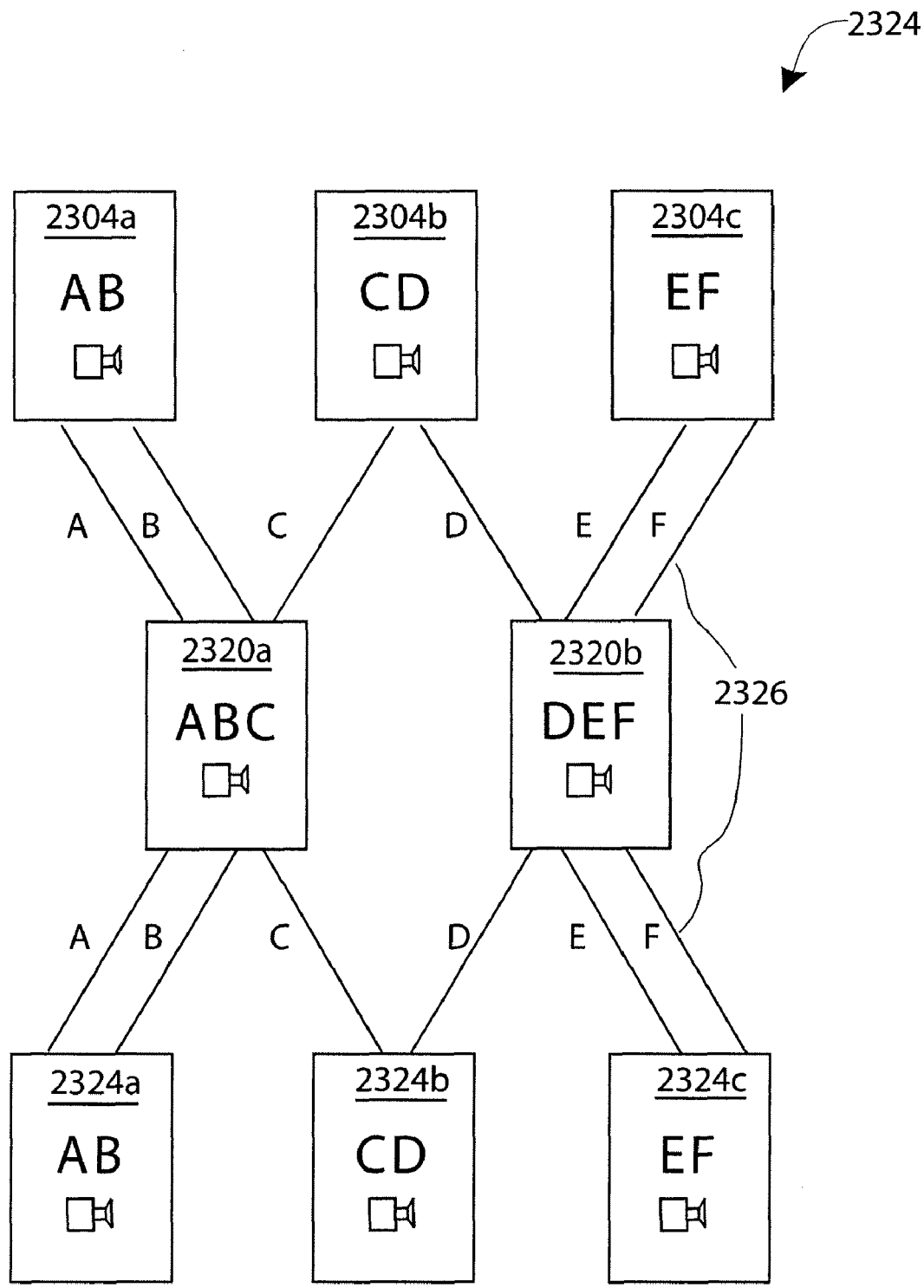
Figure 27B:
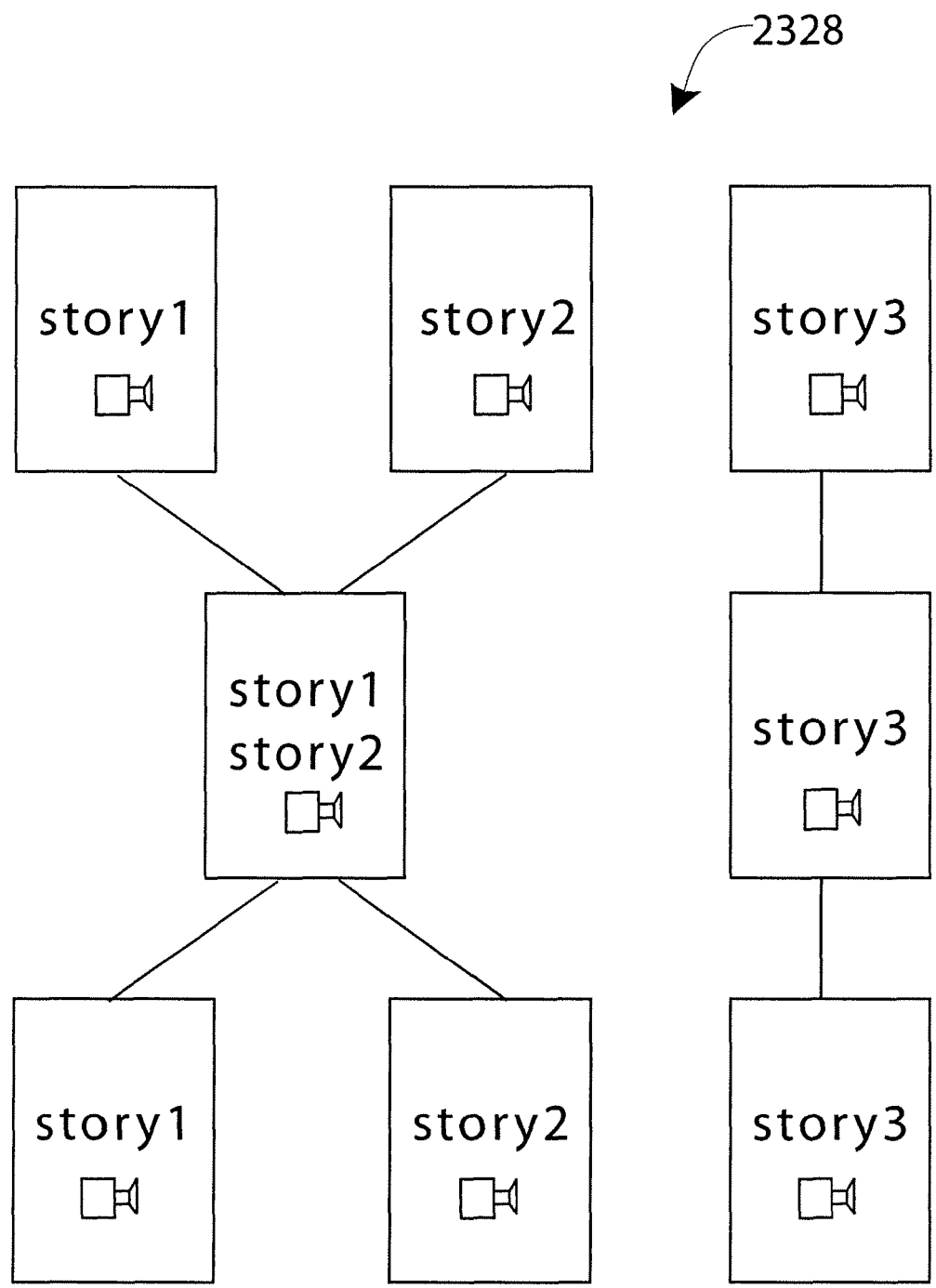

FIG. 27A shows the structure of the content developed in FIGS. 26A-E according to agent participation in the scripts. The scripts 2304a-c, 2320a-b, and 2324a-c are shown with agent tags and lines 2326 representing the paths of agents to and from scenes. Here, characters' paths converge and diverge. More complicated structures involving hundreds of characters traveling to and from scenes are possible. It is also possible to author converging and diverging story lines using the tools described above. A story structure 2328 involving three stories and eight scenes (e.g., based on "story" tags inserted by the author) is shown in FIG. 27B.

FIGS. 28A through 28I, 29, 30A, and 30B illustrate an example of the script organizing interfaces in use. In each subsequent FIG. 28A-I, the author has scripted an additional scene. This is illustrated in the drawings by a camera icon being positioned on a location including one or more characters. In practice, this process would include the text editor and transport to move to the starting time step of each new script. Accordingly, in each subsequent figure, a box representing the added scene is added to the location view and one or more boxes are added to the character view.

FIG. 28A shows a third-person idealized view 2402 of a simulation with an indication 2408 of the current time step in the corner, and an adjacent location view 2404 and character view 2406. In this figure, the author has positioned the camera 2410 on agents A and B 2412a, 2412b, at the bank 2416. The text processor has tagged a script (142 in FIG. 2) with the location tag "bank" and the character tags "A" and "B." The location view 2404 adds a box 2414a corresponding to the tagged script in the bank column beginning at a vertical position corresponding to time step 0. The character view 2406 adds two boxes 2414b and 2414c, also corresponding to the tagged script, one in character A's column and one in character B's column. Still at time step 0, the author proceeds in FIG. 28B to script another scene by positioning the camera 2410 on agents F and H 2412f, 2412h at the police station 2418. The location view 2404 shows a box 2416a added to the police column at step 0. The character view 2406 shows two boxes added, 2416b and 2416c, one in F's column and one in H's column, all corresponding to the new script for this scene. In FIG. 28C the process is repeated for a scene at the house 2420 involving agents C and D 2412c, 2412d, adding boxes 2422a-2422c.

Figure 28E:
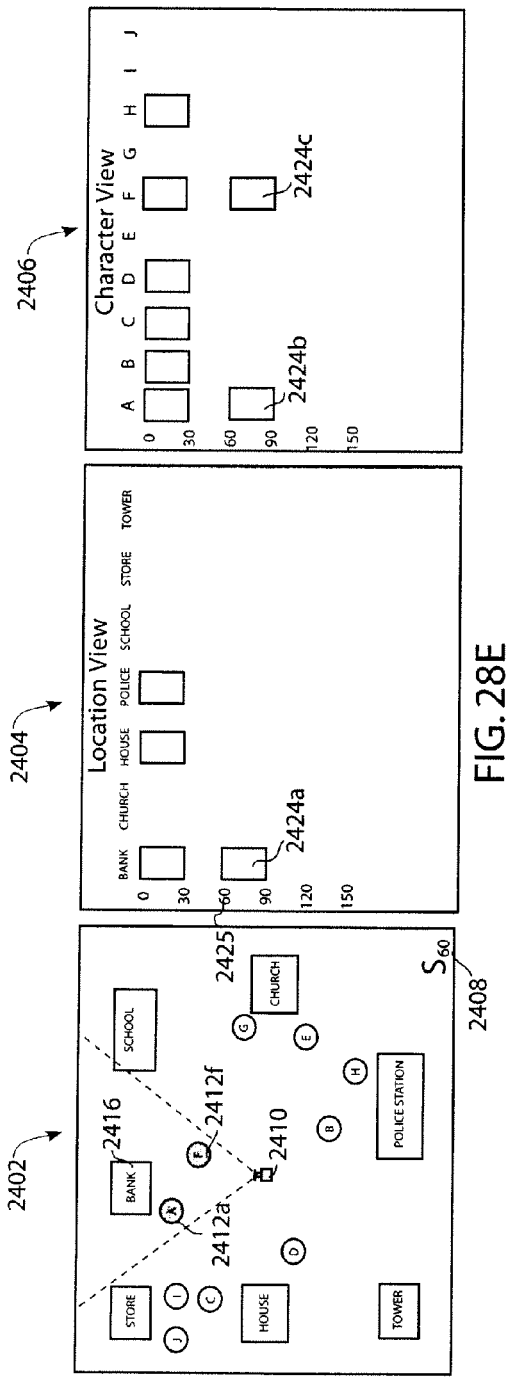
Figure 28F:
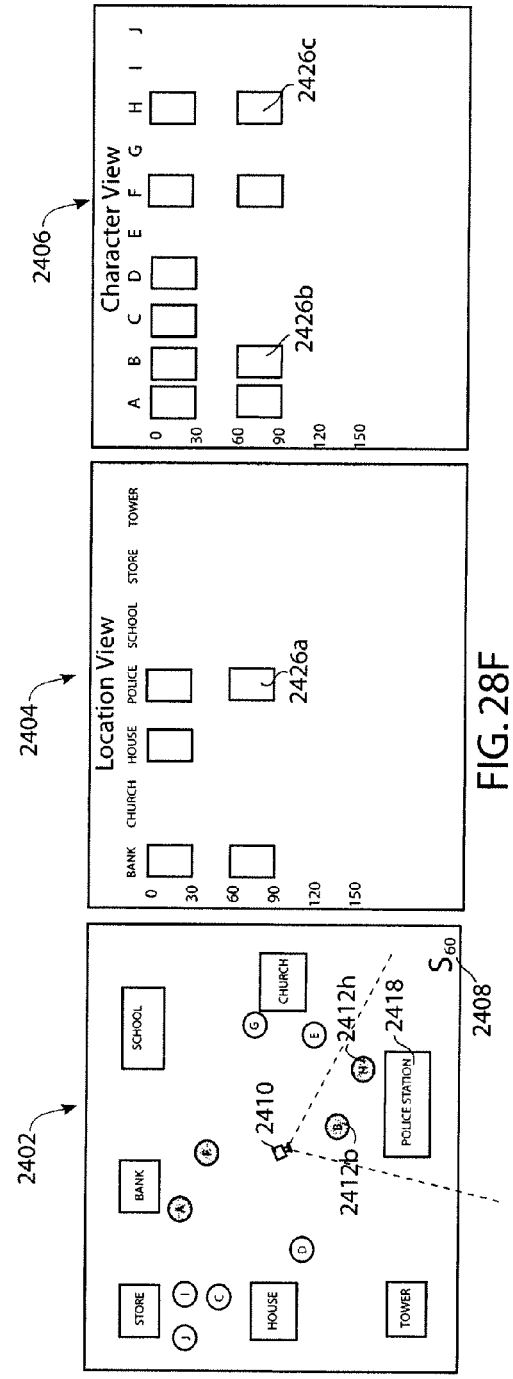

FIG. 28D shows the use of the transport control 140 to advance the simulation. The current indicated state (2408) is time step 45. The author has positioned the camera 2410 in the corner for viewing the simulation while it plays according to a play function of the transport control. FIG. 28E shows camera 2410 positioned for a scene involving characters A and F 2412a, 2412f at the bank 2416 beginning at time step 60 (2408). The location view 2404 shows a box 2424a at vertical position 2425 corresponding to time step 60. The character view 2406 shows additional boxes 2424b and 2424c. FIG. 28F shows the camera 2410 positioned for a scene involving characters B and H 2412b, 2412f at the police station 2418 beginning at the same time step 60 (2408). The location view 2404 shows a box 2426a and the character view 2406 shows additional boxes 2426b and 2426c. FIG. 28G shows the camera 2410 positioned for a scene involving characters J and C 2412j, 2412c at the store 2430, again beginning at time step 60 (2408). The location view 2404 shows a new box 2428a and the character view shows additional boxes 2428b and 2428c. FIG. 28H shows the use of the transport control 140 to advance the simulation to yet another time step. FIG. 28I shows the camera 2410 positioned for a scene involving characters B, C, E, F, and G at the church 2434 beginning at time step 120 (2408). The location view 2404 shows a single added box 2432a and the character view shows multiple additional boxes 2432b-2432f, reflecting participation of many characters in a single scene at a single location. Participation would be determined by the text processor according to the commands parsed in the script for the scene, not by visibility as might be suggested by the drawing.

FIG. 29 shows how the camera tags associated with the scripts enable the document view playback functionality. The combination of camera tags and script organizing interfaces results in a rich set of playback functions. In FIGS. 28A through 28I, seven points of view, cameras 2410, were used. One camera agent was added to the simulation for each of the scripts, and the text processor tagged each script with a reference to that camera agent, shown in FIG. 29. In this example, there is a one-to-one correspondence between cameras and scripts. This allows for generic use of the identifier "camera" in the commands of any script. The cameras of each script exist in the simulation like any other agent. Commands controlling a camera are written in the script, enabling each script to provide specific action and a particular set of camera movements tailored to view that portion of action. This has the triple effect of providing a way of navigating a simulation while scripting, storing a point of view used to author a script for use in returning to view the script, and enabling intermittent or prolonged periods of author-controlled camera angles providing specific narrative guidance, for occasions when the end-user wishes to relinquish control of the camera when viewing the simulation.

In some examples, if the author clicks on a box in FIG. 29, the user interface changes to the rendered perspective of FIG. 31, described in more detail below, and the point of view is set using the camera tag (i.e., one of cameras 1-7) associated with the script represented by the clicked-on box. Clicking on the bank column 2452 causes playback of the simulation using a series of POVs defined by the camera tags 1 and 4 in the scripts 2454a and 2454b comprising the bank sequence. Clicking on character B's column 2454, causes playback of the simulation using a series of POVs defined by camera tags 1, 5, and 7 in the scripts 2456a-2456c for character B. User input causing the playback of a sequence may be obtained by tracking user interaction with the script organizing interface as shown below in FIGS. 34A-D.

FIGS. 30A and 30B show a model view constructed at two time steps, time step 15 (FIG. 30A) and time step 70 (FIG. 30B) according to the set of scripts authored in FIGS. 28A-I. In FIG. 30A, the author, represented by the camera icon 2410, is viewing a portion of the model including the house 2420 and bank 2416. The agents in the area of the house and bank are shown highlighted and contain references 2450 to the scripts in which they are participating at time step 15 (see indicator 2408). The script references 2450 in the model view correspond to scripts represented by boxes in the location view and the character view intersected by dashed lines 2446 and 2448 at the current time step. The model view is useful for viewing and retrieving scripts affecting a particular portion of the model at a specific time step. Use of the location view for this purpose may require scanning across multiple unrelated columns to locate boxes representing locations in use at the current time step. If, for example, the locations are arranged in alphabetical order, the boxes in a single scene may not be aggregated in one area of the location view 2404. The model view 2402 makes all scripts affecting a portion of the model readily available from within the model at a particular time step.

In FIG. 30B, the author's point of view (camera 2410) is on the store 2430 and the bank 2416. The agents A, C, F, and J in the area are highlighted and contain references 2450 to scripts in which they are participating at time step 70. As in FIG. 30A, the references 2450 correspond to scripts represented by boxes in the location and character views 2404 and 2406 intersected by the dashed lines 2446 and 2448. Here the benefit of the model view is more pronounced, in that boxes pertaining to the bank and store are further apart in the location view 2404. In a simulation containing hundreds of locations, the model view becomes an efficient alternative for viewing coverage of particular areas across time. The model view also provides feedback on overall script coverage at a given time step and a way to retrieve scripts without having to leave the authoring perspective of being "inside" the simulation.

This script organizing interfaces includes several useful features. The interfaces provide a way to break down a single non-linear medium into multiple linear passes through the medium. Each view, character, location, etc., provides a different matrix, or two dimensional slice, of a three dimensional medium. Use of successive views or slices breaks down scripts defining a complex medium into human-readable interfaces.

In the example of FIGS. 28A through 28I, seven scripts at various locations involving various groups of characters have been authored. The content generated by these scripts may be converging and diverging, resulting in a non-linear simulation medium evolving over the course of time. Though the action may unfold naturally in the 3D simulation, it may be very complicated to visualize and work with the complete set of scripts. As discussed in the above examples, the system addresses this difficulty by breaking down the complexity of the non-linear medium using views representing multiple linear passes through the same content according to different types of information required while authoring. Though comprehension of large numbers of scripts defining content in a non-linear medium may be difficult or impossible to follow at some levels, it remains possible to gain an understanding by successive views of linear passes through the same content.

Having scripts arranged into linear sequences by object allows an author to follow particular sequences and aids in finding gaps in those sequences. In the example of FIGS. 28A through 28I, there are no boxes in the school and tower columns 2436 and 2438, indicating a lack of scripted content at either of those locations. The author, seeing this, may act by returning to those locations to add content. The character view 2404 shows a significant gap 2442 for characters E and G, and a lack of action scripted for character I in column 2440.

For certain types of content, including authoring a simulation of an entire city, there may be no single document view that provides definitive feedback on script coverage. For types of content that require a populated, life like feel, both the character and location views may need to show adequate coverage before a simulation of a city is considered complete.

To help the author assure completeness, the script organizing interfaces have the dual effect of aiding comprehension of individual sequences pertaining to objects and providing a way of measuring overall script completeness according to different types of objects. An indication of this dual effect is illustrated by the fact that if the individual column headings on a document view were removed, leaving only an indication of the type of the view (i.e. location or character), these views would remain useful as a means of measuring one type of script coverage (location, character etc.). This effect is more pronounced in simulations involving large numbers of characters or locations as illustrated in the user interface drawing of FIG. 38A. A thorough measure of completeness is provided by the use of these script organizing interfaces which are capable of dynamically generating different views of the same set of scripts.

Figure 31:
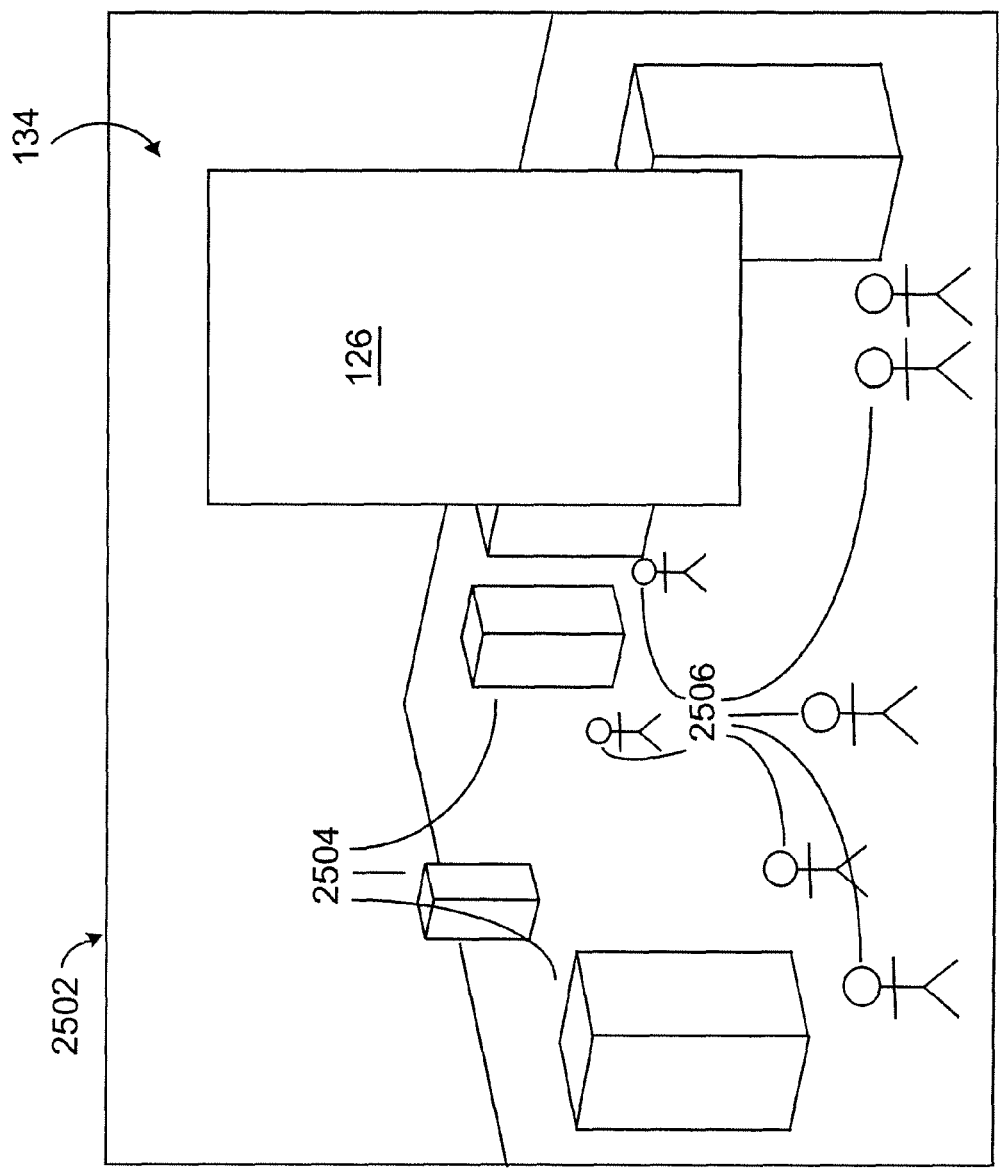
FIGS. 31 and 32A-G show a scripting editor and a simulation image.

FIG. 31 shows an example user interface 2502 including the text editor 126 positioned over the rendered view 134. The rendered view 134 includes buildings 2504 and agents 2506. Other layouts of these components are possible.

FIGS. 32A through 32G illustrate the operation of the system in the context of a large 3D simulation. The text editor window 126 is shown next to the rendered view 134. The rendered view 134 contains a perspective view of agents and buildings, including agents Bob 2604 and Fred 2606 and buildings including a house 2602. The perspective view may have been configured by manipulating the POV control 138 and transport control 140 (not shown) to set the view and the time step in the simulation. In some examples, after the view is selected using the POV controls, a camera agent is added to the simulation by copying the position and direction parameters of the POV control into a tag associated with a script. The camera agent can now be referenced in the script in the text editor window 126 to control the point of view used to generate the rendered view 134. The script is initialized automatically by the text processor to the current time step (as noted by indicator 2608 on the first line of text), which is time step 20 (noted by indicator 2610) in FIG. 32A.

Figure 32A:
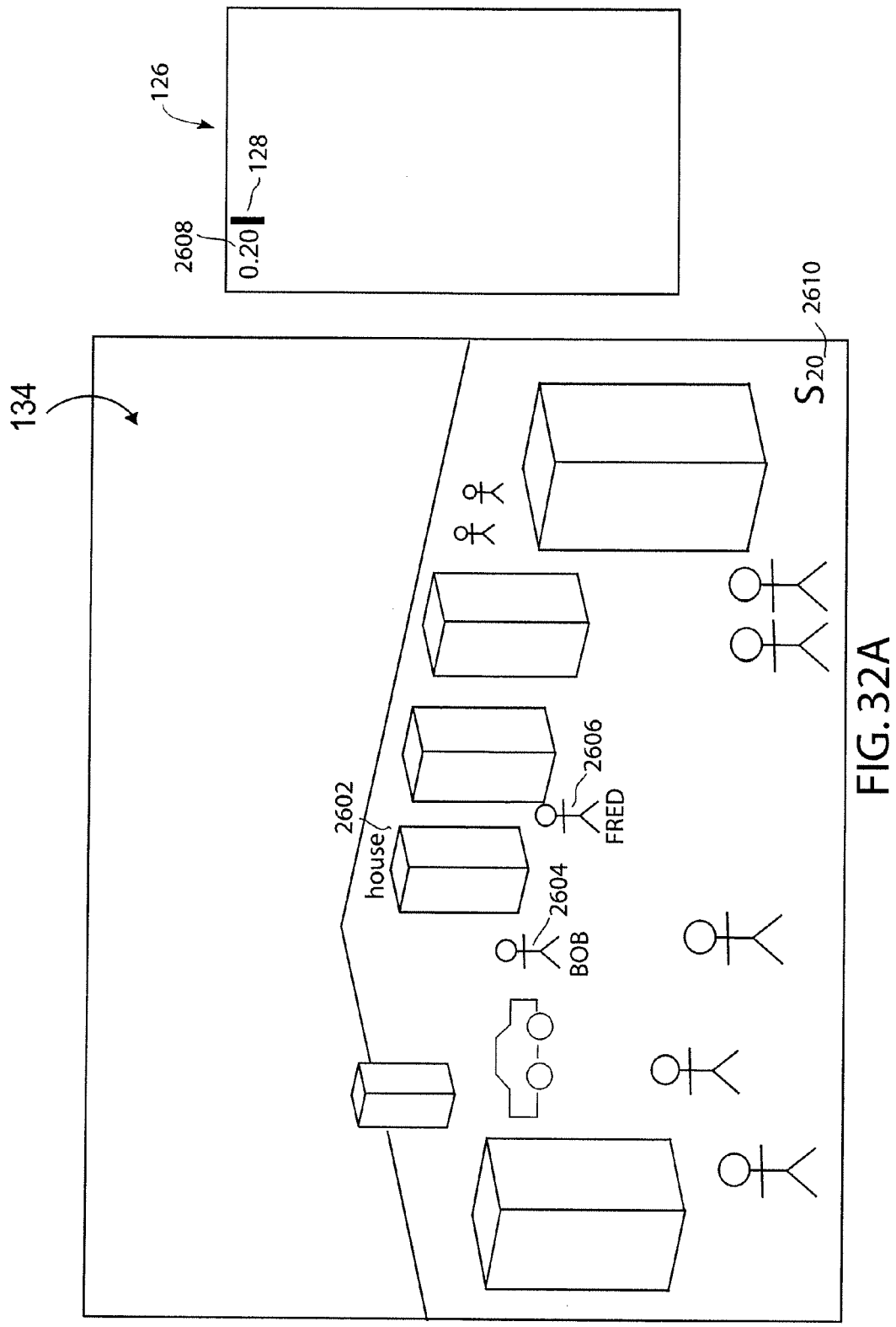
Figure 32B:
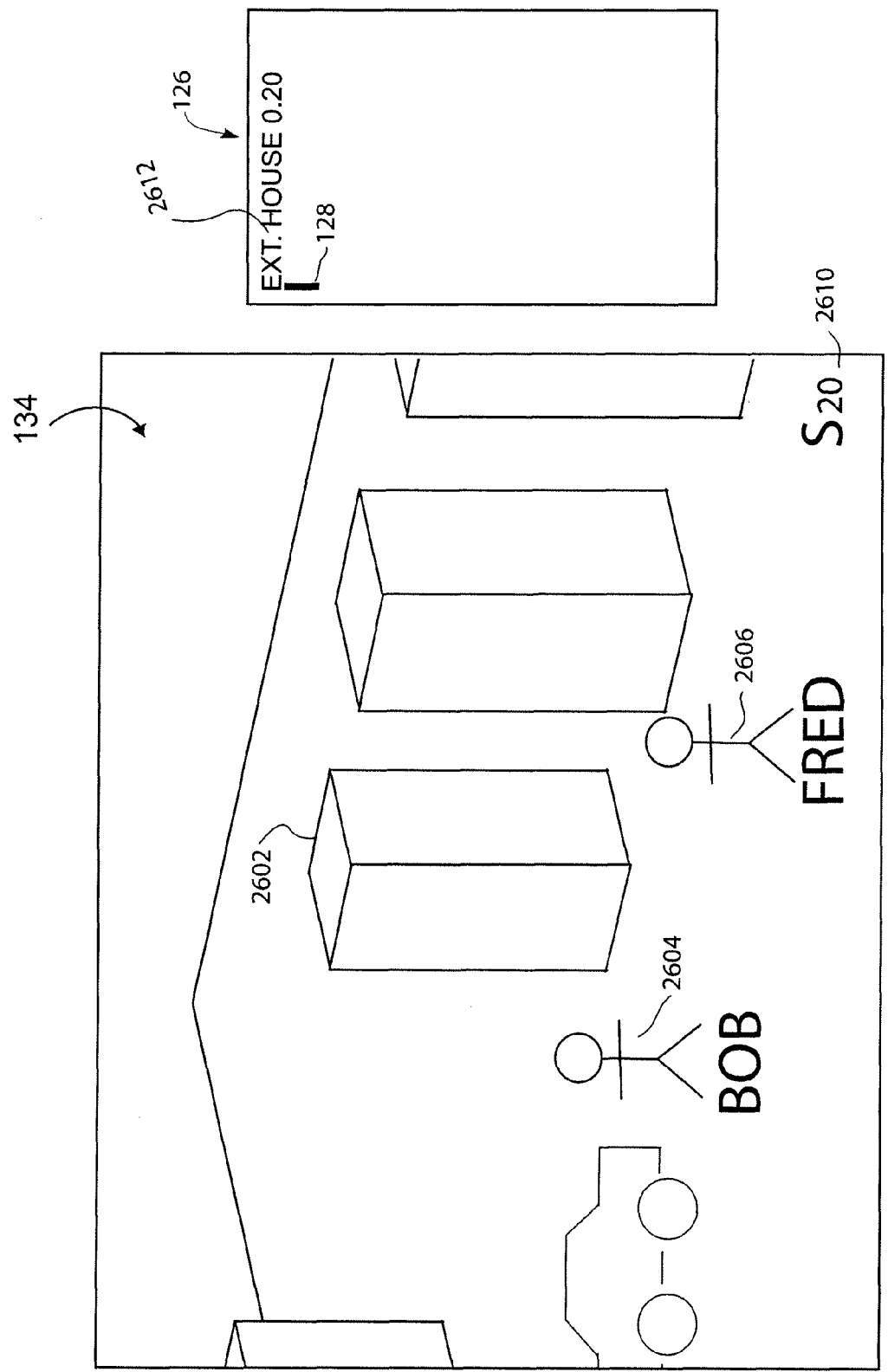
Figure 32C:
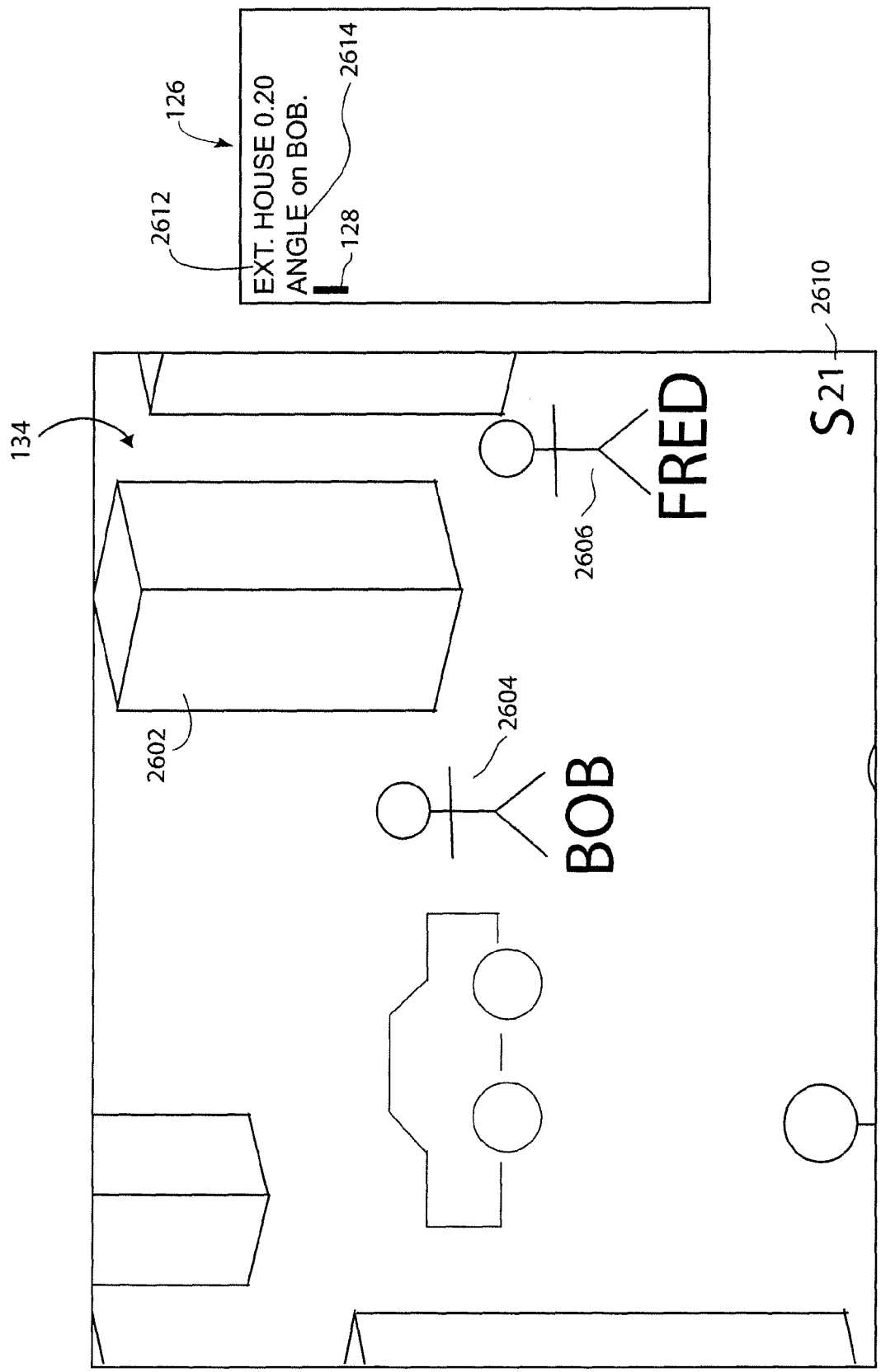
Figure 32D:
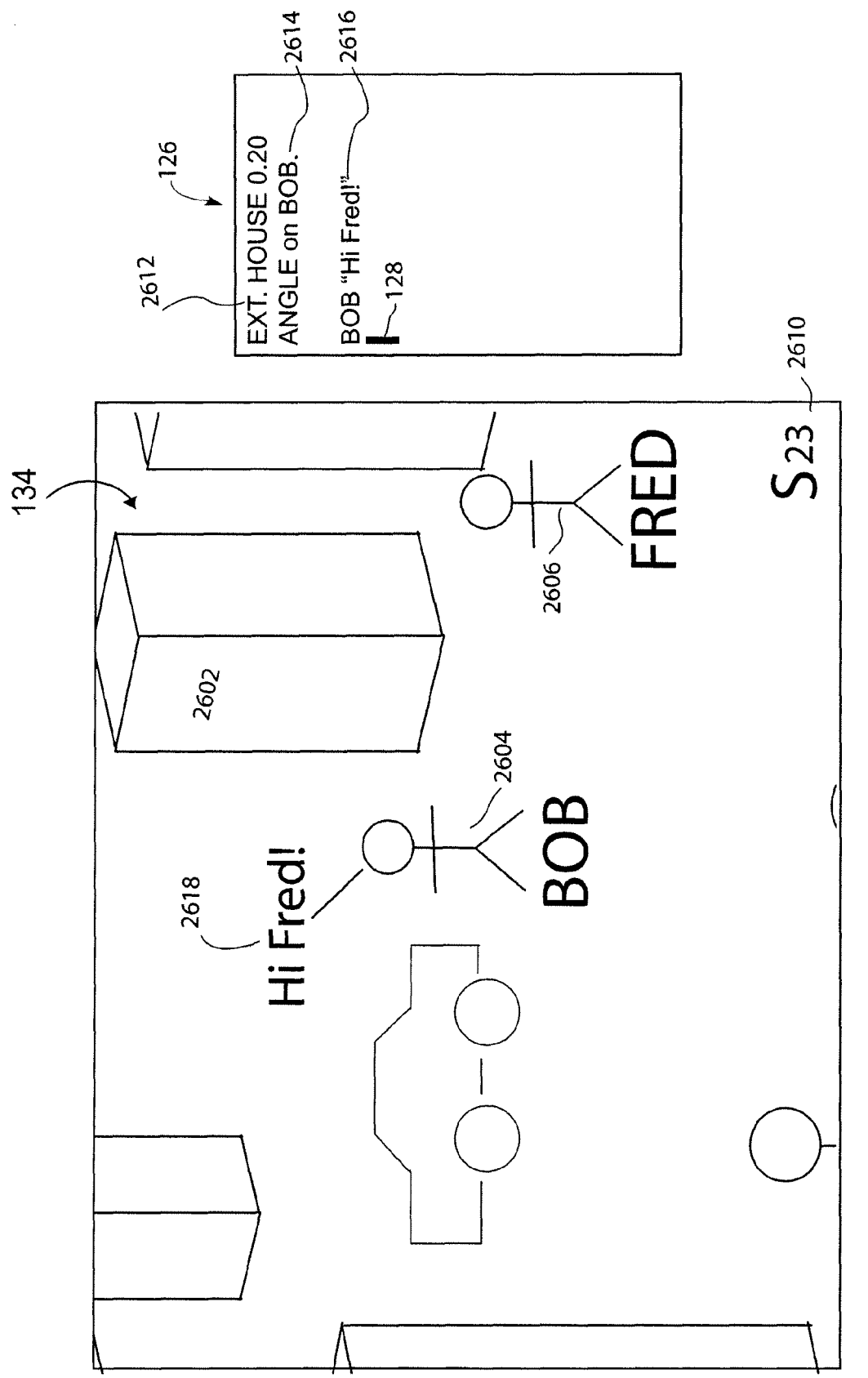
Figure 32E:
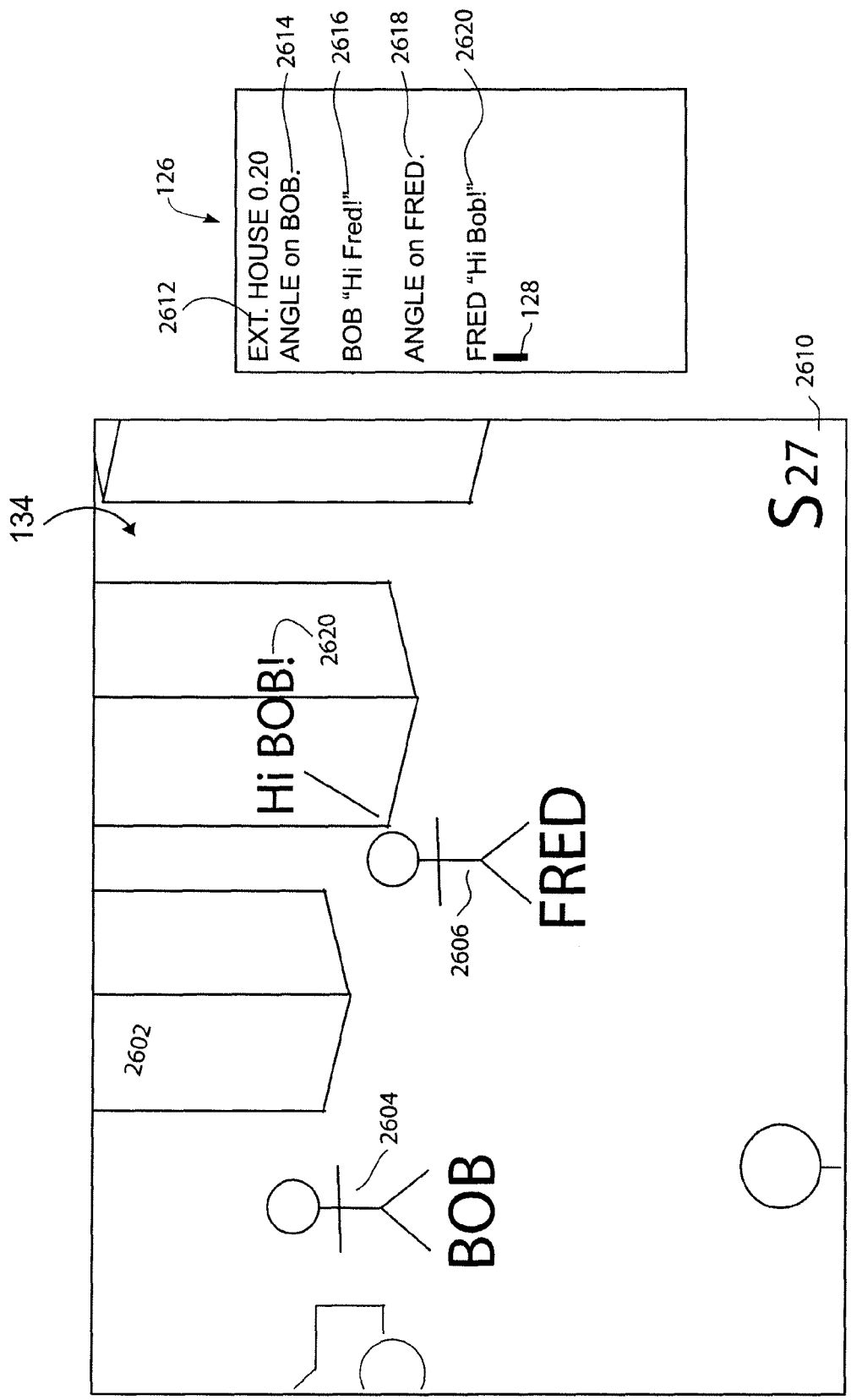
Figure 32F:
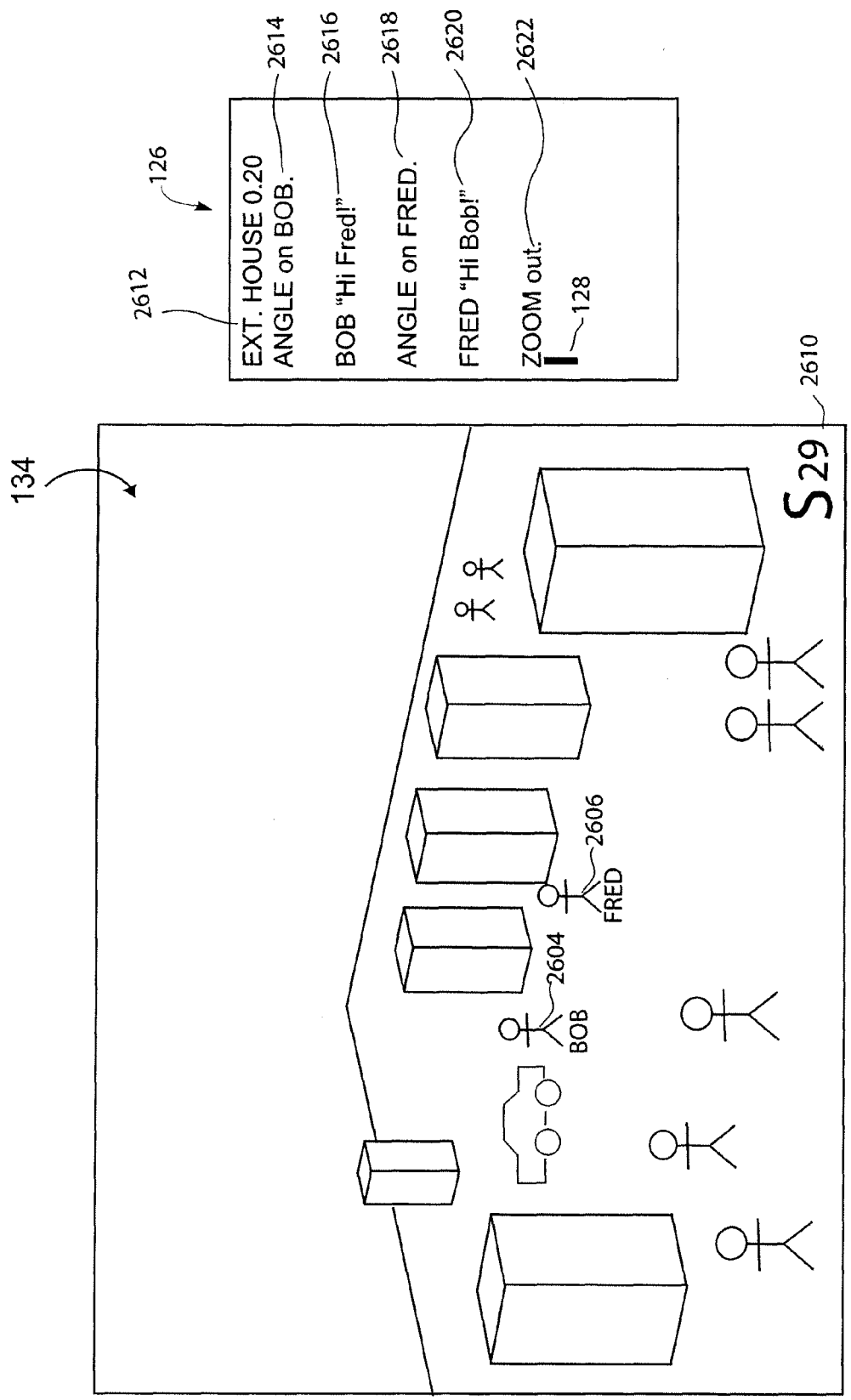

In FIG. 32B, the author has added text 2612 including the header "EXT. HOUSE" in the first line, preceding the time step indicator 2608. The text processor recognizes this as a camera command by its position and a message is sent to the camera agent associated with the script. The camera agent uses the coordinates of the model of the house 2602 to change the point of view. In this manner, the text editor provides a way to navigate within the simulation without using a second user interface. If the user were to delete the text 2612 and type the name of another location, the camera would be re-directed to another position to view the new location.

FIGS. 32C through 32F illustrate subsequent scripting of the scene by the author. As additional commands 2614, 2616, 2618, 2620, and 2622 are entered, the text processor sends the commands to the agents, including the camera. Commands 2614, 2618, and 2622 for the camera control the point of view for the rendered view 134 accordingly. Program execution is controlled by the position of the cursor 128 and advances the state of the simulation at the speed at which the user types. The scripting concludes in FIG. 23F with a "ZOOM out" command 2622 which the text processor identifies as a camera command, in response to which the POV changes to a pulled-back perspective.

Figure 32G:
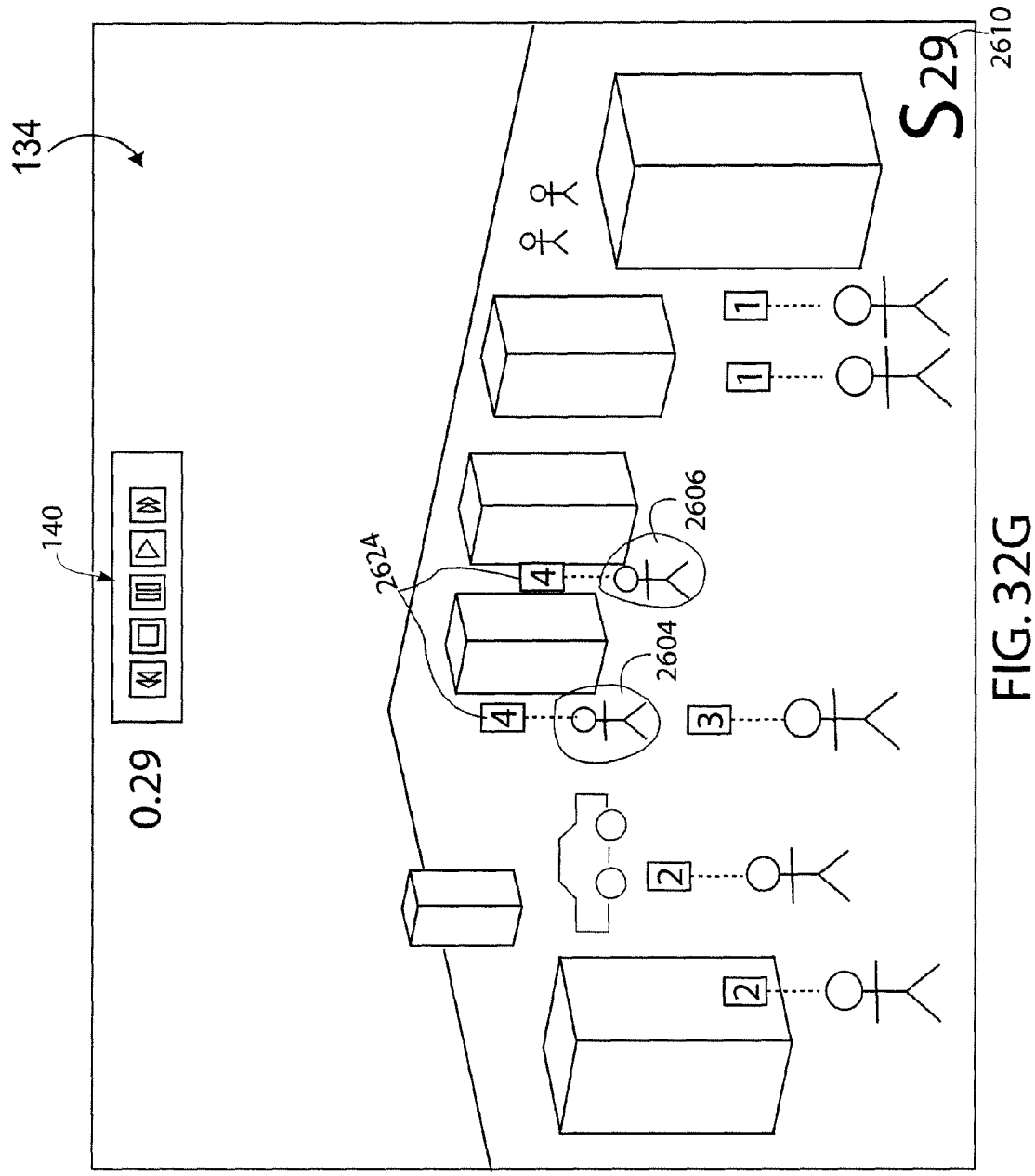

FIG. 32G shows a rendered view of the state of the simulation at step 29, including the transport, after the author has closed the text editor 126 of FIGS. 33A through 33F. As described above, agents Bob and Fred 2604 and 2606 are now highlighted and include references 2624 to the script completed in FIG. 32F. Clicking on agents Bob or Fred would cause the user interface to return to the state shown in FIG. 32F, where the author could review or edit the script. At the next time step, these agents would not be highlighted because they are no longer the subject of any script. Using the model view to evaluate script coverage at step 29, the author may next proceed to author a scene for agents who are not highlighted. In some examples, this process is initiated by user input on the keyboard, which launches a text editor window initialized with a new script for the current step. In some examples, the scripting process is initiated by double clicking on agents. In some examples, the author uses the transport control 140 to move the simulation to a prior state and set the simulation running to observe the results, using the POV control (not shown) to freely navigate during playback.

Figure 33A:
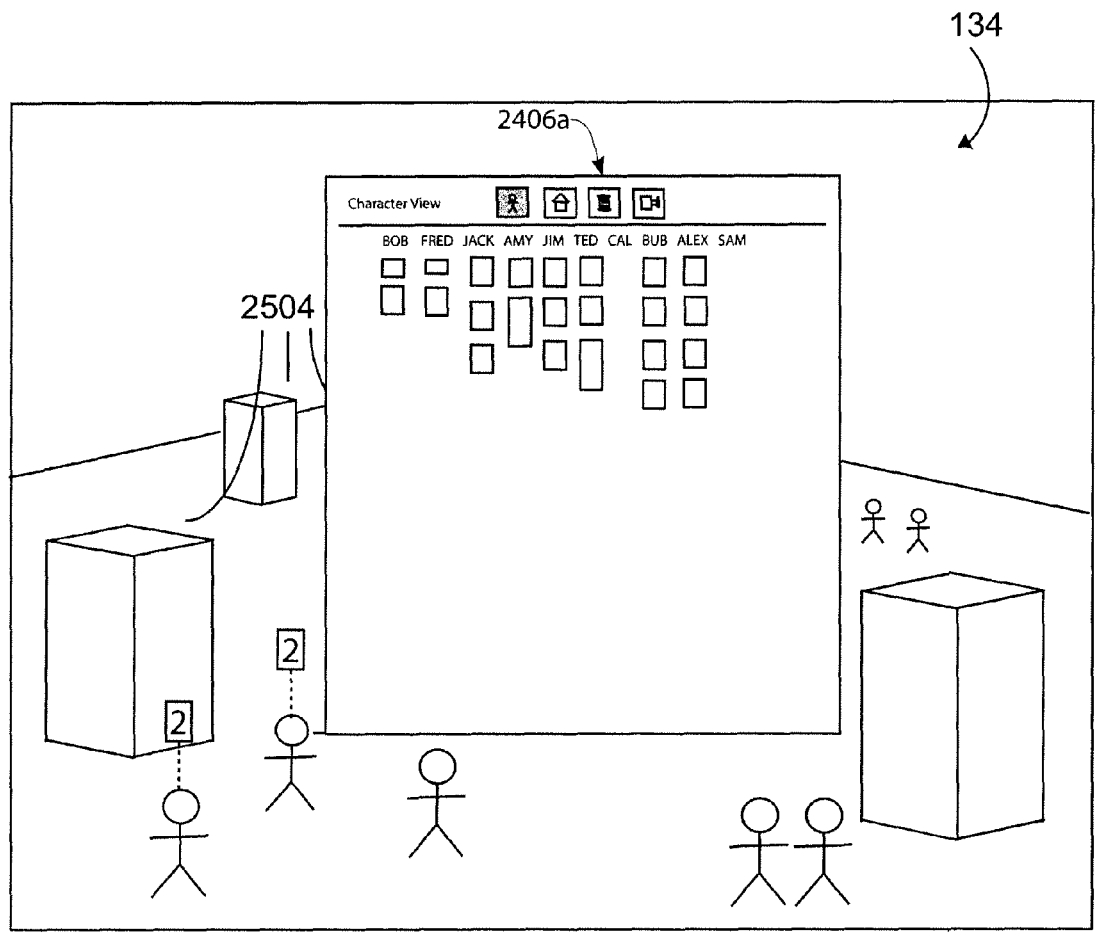
FIGS. 33A-B show a script organizing interface with a simulation image.
Figure 33B:
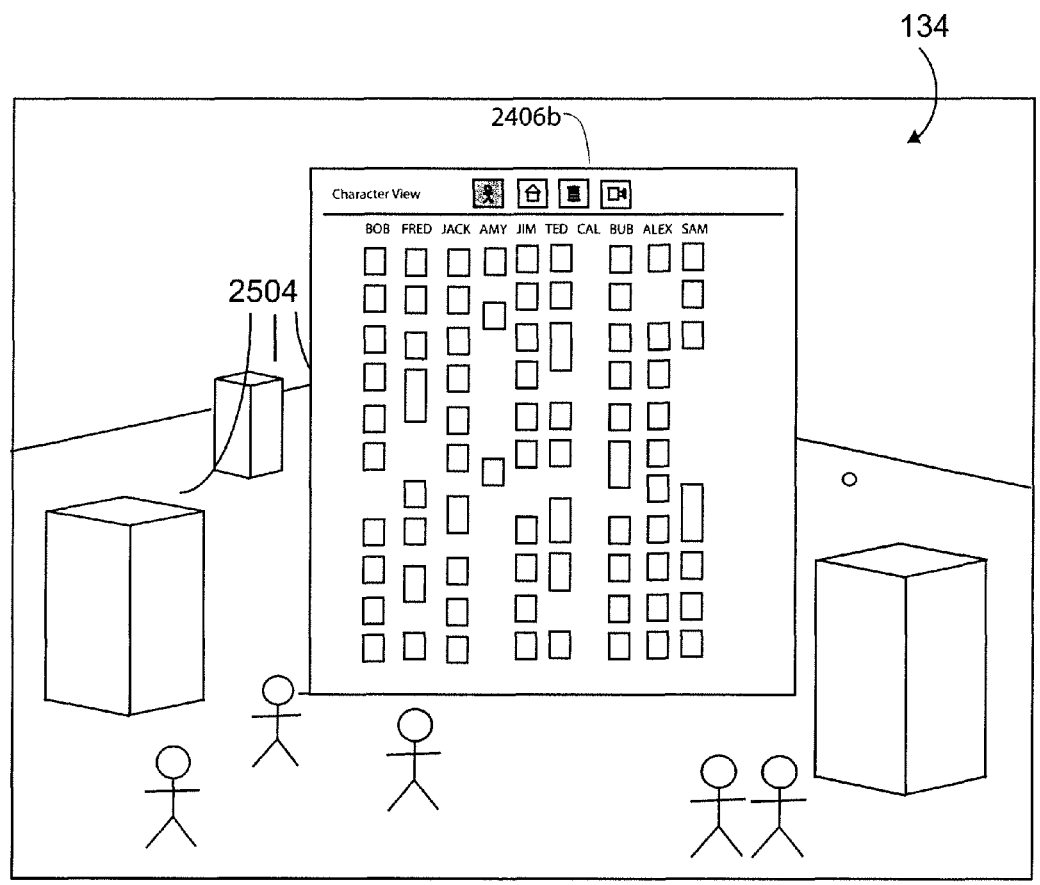

In some examples, as shown in FIGS. 33A and 33B, script organizing interface 2406a as described above is overlaid on a rendered simulation view 134. The script organizing interface may be launched by user input on the keyboard. In this example, a view of scripts according to a cast of characters is displayed. The author may observe that the character SAM has not been scripted at any time step. To add a scene for SAM, the author may close the script organizing interface, navigate to SAM's location in the model by manipulating the POV controls, and launch a text editor window containing a new script. FIG. 33B shows a second script organizing interface 2406b representing the same hypothetical simulation shown in 33A, but with scenes added for SAM and additional scenes for other characters. From this, the author can see that gaps now exist in AMY's script.

Figure 34A:
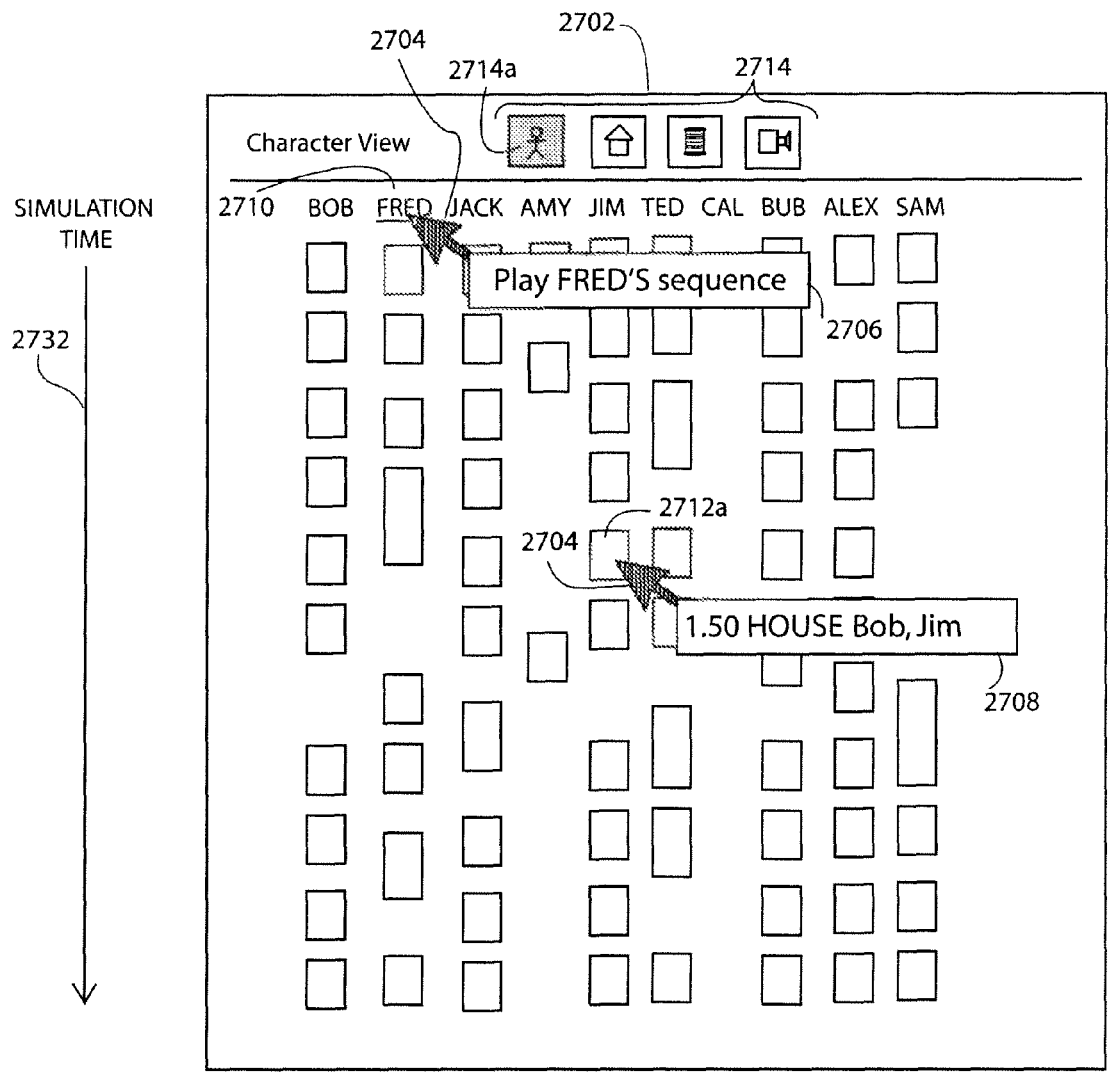
FIGS. 34A-D show user interaction with a script organizing interface.
Figure 34B:
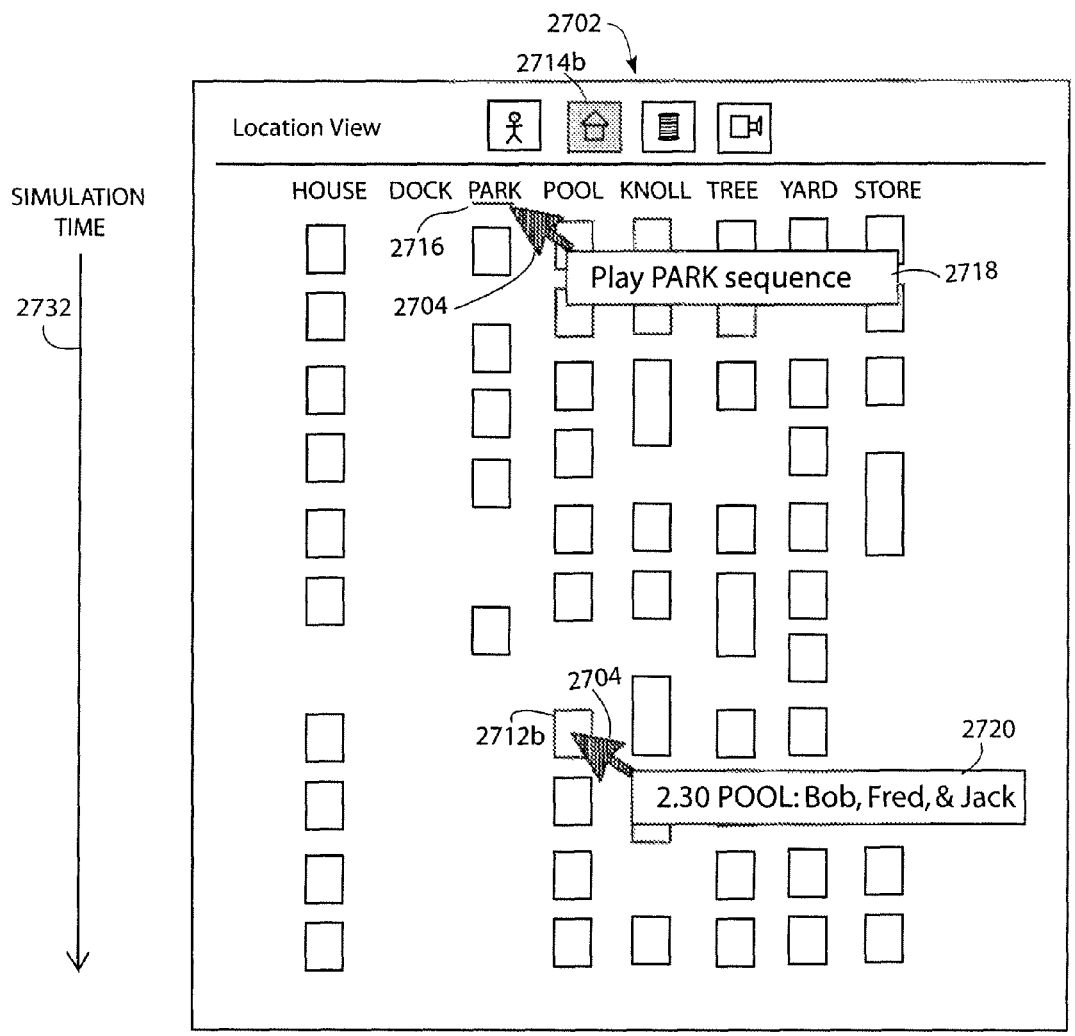

FIGS. 34A through 34D show user interaction with a script organizing interface 2702 in different modes. In FIG. 34A, the interface 2702 is in a character view. The author manipulates a mouse pointer 2704 over the character view to select an agent FRED's sequence for playback. In some examples, text indicating the location, time and cast of a script can be assembled into tool tips 2706, 2708 using the tags associated with a script. The time refers to the simulation timeline 2732. The tool tips 2706, 2708 are presented to the user when the mouse 2704 is held over the name 2710 of a particular character or a box 2712a representing a particular script. While in the character view, it is useful to present information about the location of a script in this manner. In the script organizing interface 2702, the selected basis for script organizing is indicated by a darkened state of one of several picture buttons 2714 used to activate the interface. In the example of FIG. 34A, the selected mode indicated by the character button 2714a. FIG. 34B shows the script organizing interface 2702 in the location view, as indicated by the darkened picture button 2714b. In the location view, it is again useful to have information about characters involved in a script 2712b shown in a tool tip 2720. Another tool tip 2718 indicates what will happen if the user clicks on a location indicator 2716.

Figure 34C:
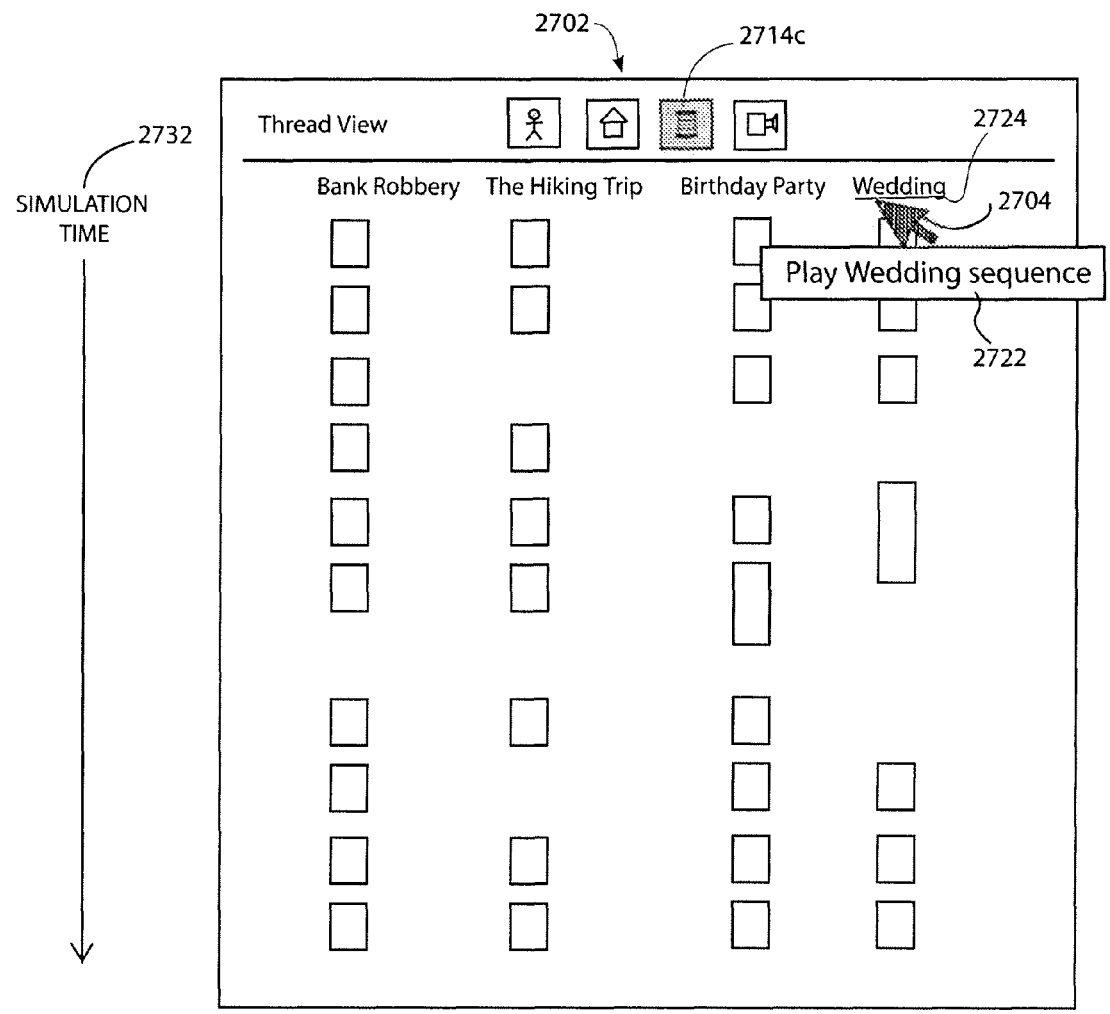
Figure 34D:
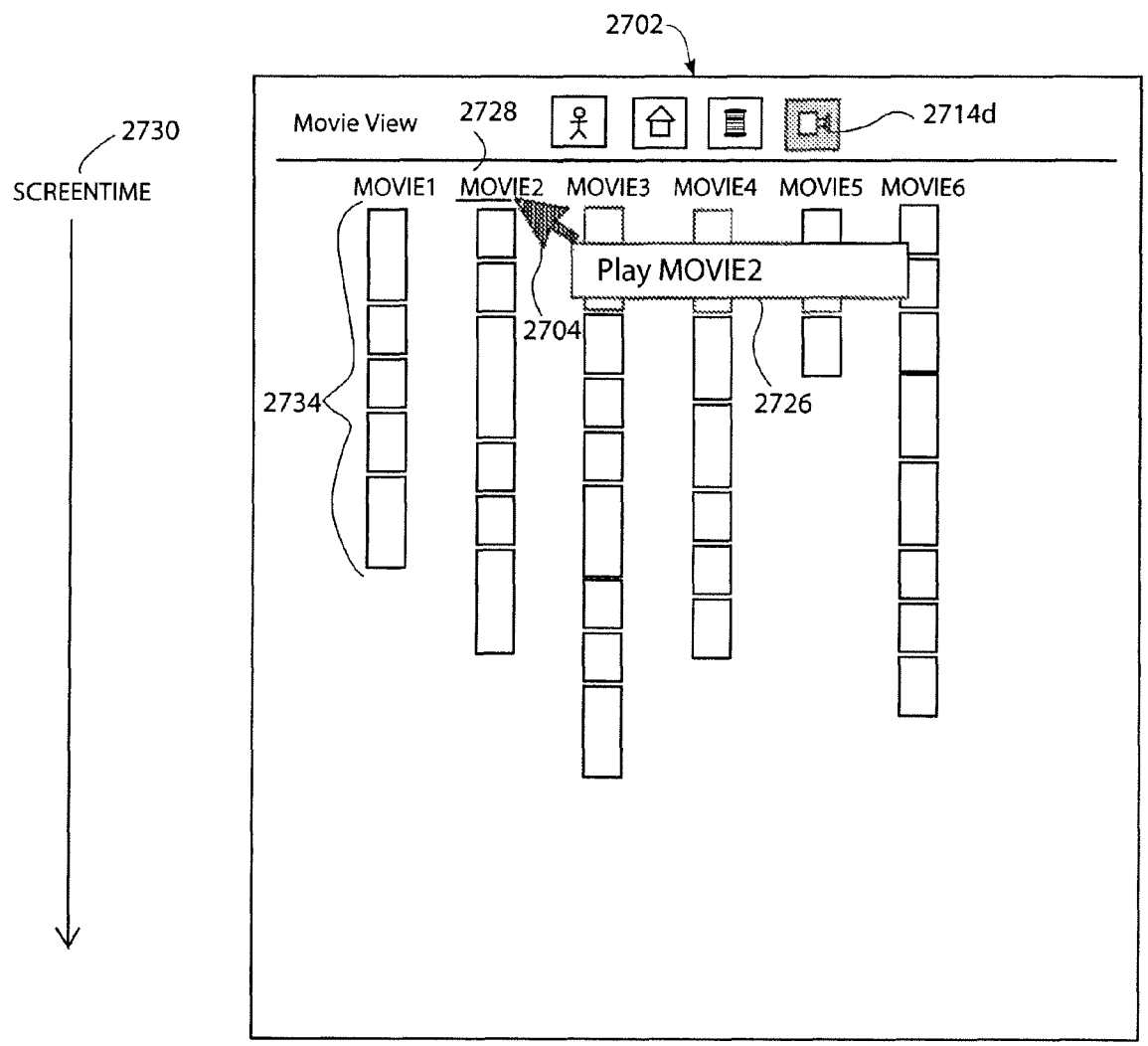

FIG. 34C shows the script organizing interface 2702 in a thread mode, indicated by the highlighted button 2714c. The author may have identified keywords or phrases, e.g., "wedding" 2724, to define narrative threads running through a simulation over time. The text processor is configured to determine membership of a script in a thread and tag the script accordingly. A tool tip 2422 indicates that the author may view the sequence of scripts making up the wedding thread by clicking on the wedding keyword 2724. FIG. 34D shows the script organizing interface 2702 changed to movie mode, indicated by the highlighted button 2714d. In movie mode, boxes 2734 representing scripts in custom defined sequences, e.g., MOVIE2 2728, are displayed in relation to screen time 2730, as opposed to the simulation time 2732 used in the other modes in FIG. 34A-34C. Because the movie sequences run directly after each other (representing an arbitrary passage of time determined by the length of each scene), there are no vertical gaps between the boxes 2734. In some examples, these sequences are defined by the author selecting a sequence of scripts using one of the views of FIGS. 34A through 34C.

The discussion above has described scripting in the context of a new fixed-work simulation medium. However, the grammar of FIGS. 13A and 13B provides for an intuitive means of editing time-based commands that are also useful to traditional content development systems. For example, the system may be employed in traditional timeline-based animation systems common in the film and animation industry.

Figure 35A:
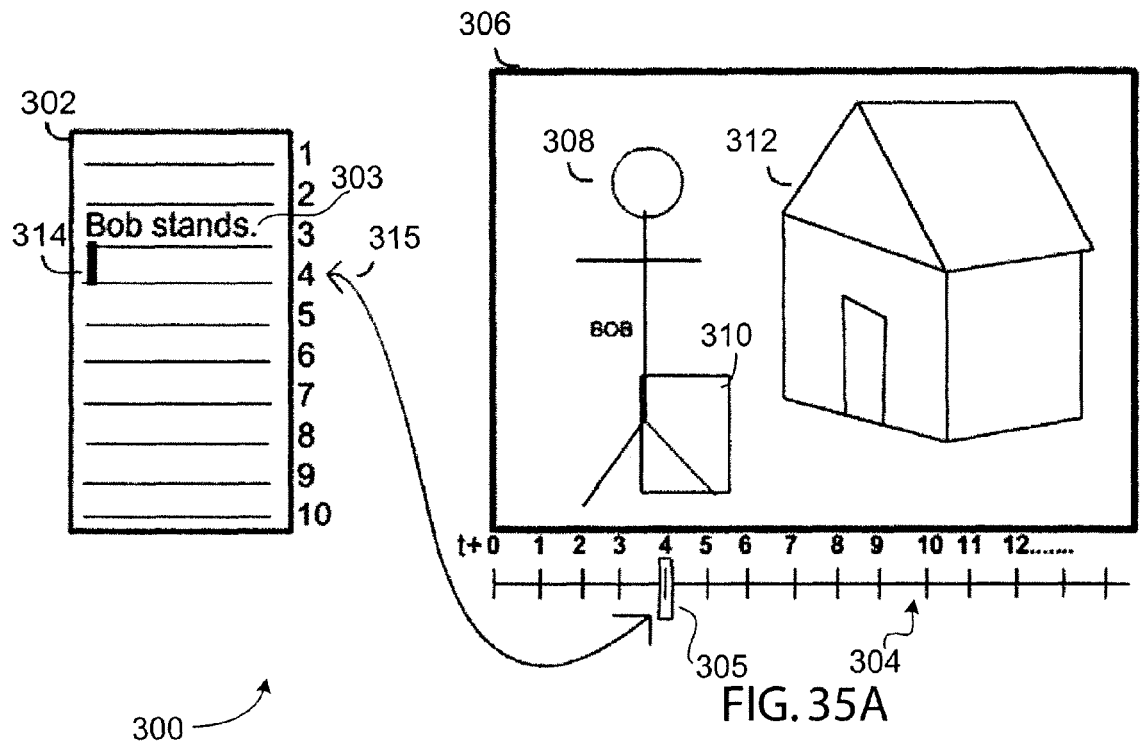
FIGS. 35A-L show a scripting editor, timeline, and simulation image.

Use of the system for timeline-based animation is illustrated in FIGS. 35A through 35J, which show an idealized version 300 of the interface discussed above. In FIG. 35A, a text editor window 302 has lines 1-10, with the command 303 "Bob stands" on line 3. The lines 1-10 of the text editor window correspond to time steps 1-10 on a timeline 304 under a view 306 of the simulation. The simulation includes a person 308, labeled as Bob, a box 310, and a house 312. The time step 305 shown in the view 306 of the simulation is the time step corresponding to the position of a cursor 314 in the editor 302 (indicated by arrow 315). In FIG. 35A, the cursor is on line 4, so the view 306 shows time step 4 in the simulation. Because the command "Bob stands" was on line 3, which is in the past, Bob is standing in the view 306.

Figure 35B:
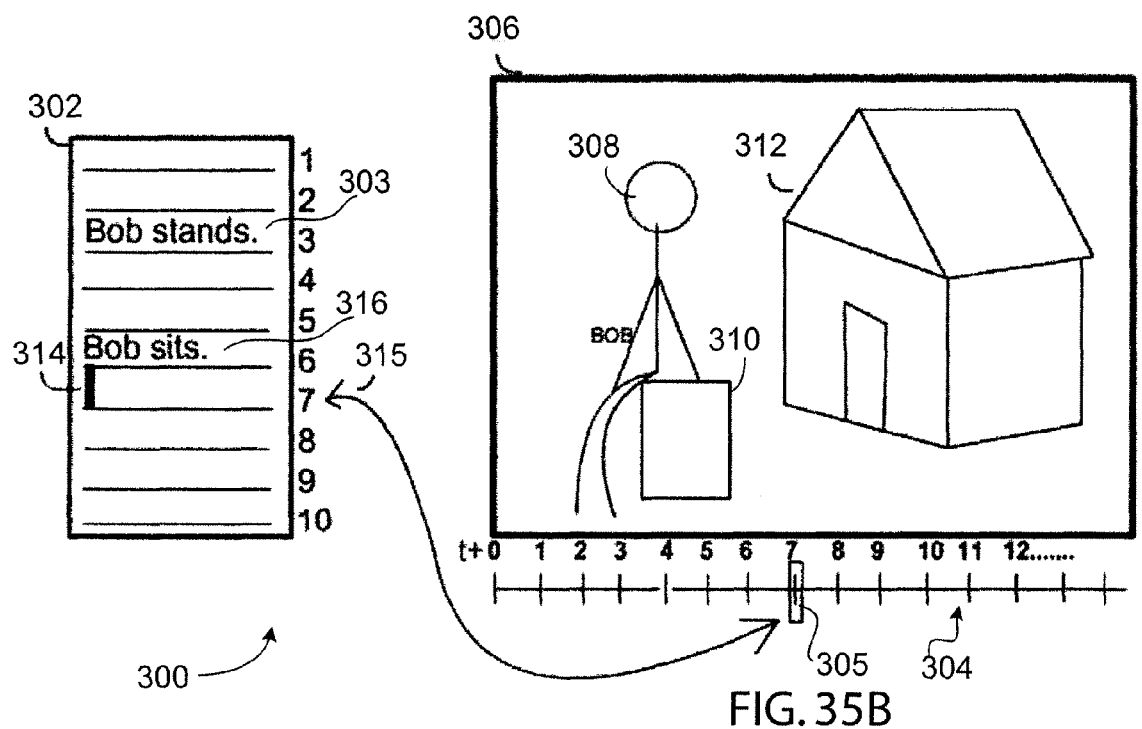
Figure 35C:
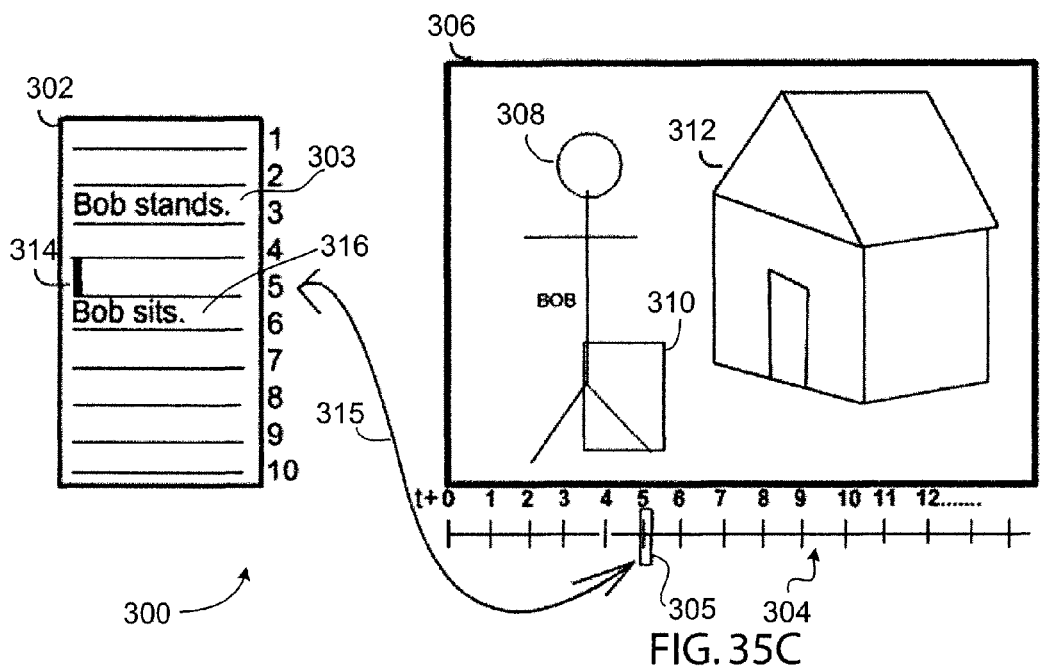

In FIG. 35B, a new command 316 "Bob sits" has been entered on line 6 in the editor, and the cursor 314 is on line 7. The view 306 is now showing time step 7, and Bob is sitting. In some examples, the command may have included "on the box" to tell Bob where to sit. In some examples, objects have properties that determine how they may interact, so, for example, given the command "Bob sits" (as processed by the text processor) without an explicit target, the simulation may make Bob sit on the nearest object that has "sittable" as a property, in this case the box 310. In FIG. 35C, the cursor 314 has been moved back to line 5, so the simulation view 306 accordingly moves to time step 5, at which point Bob is still standing.

Figure 35D:
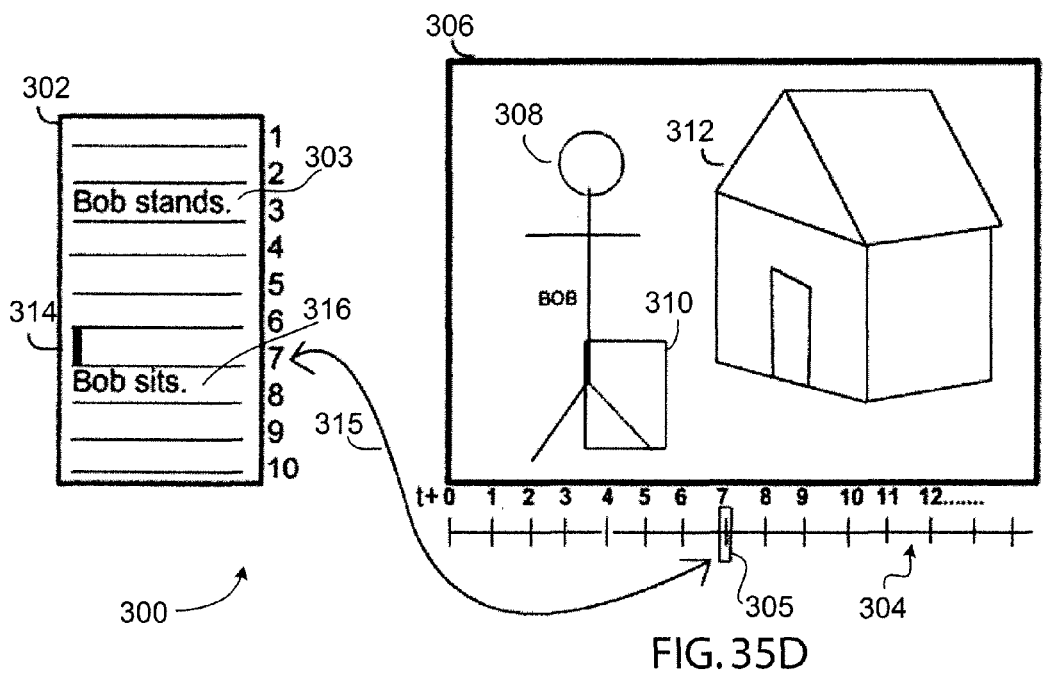
Figure 35E:
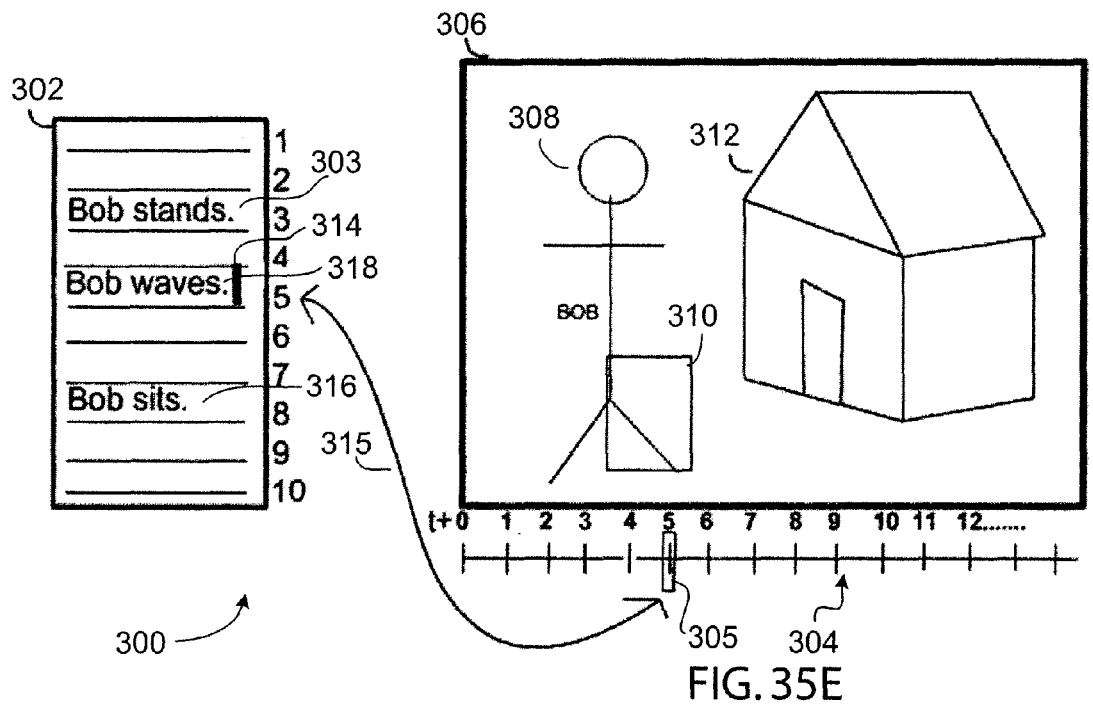
Figure 35F:
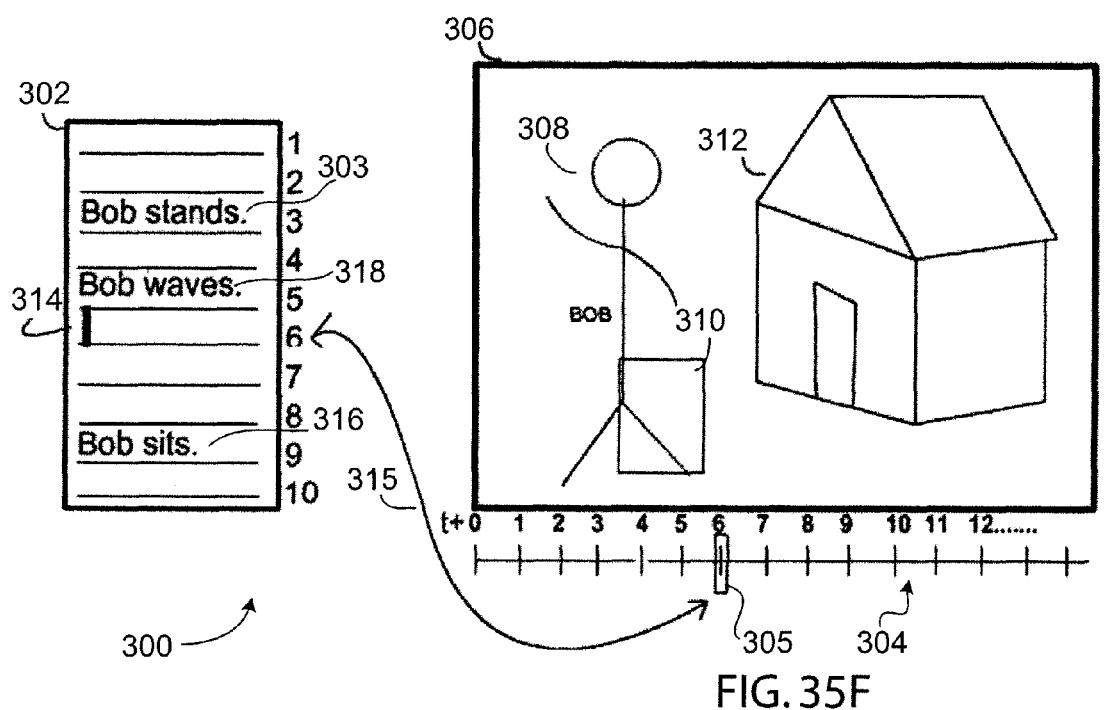
Figure 35G:
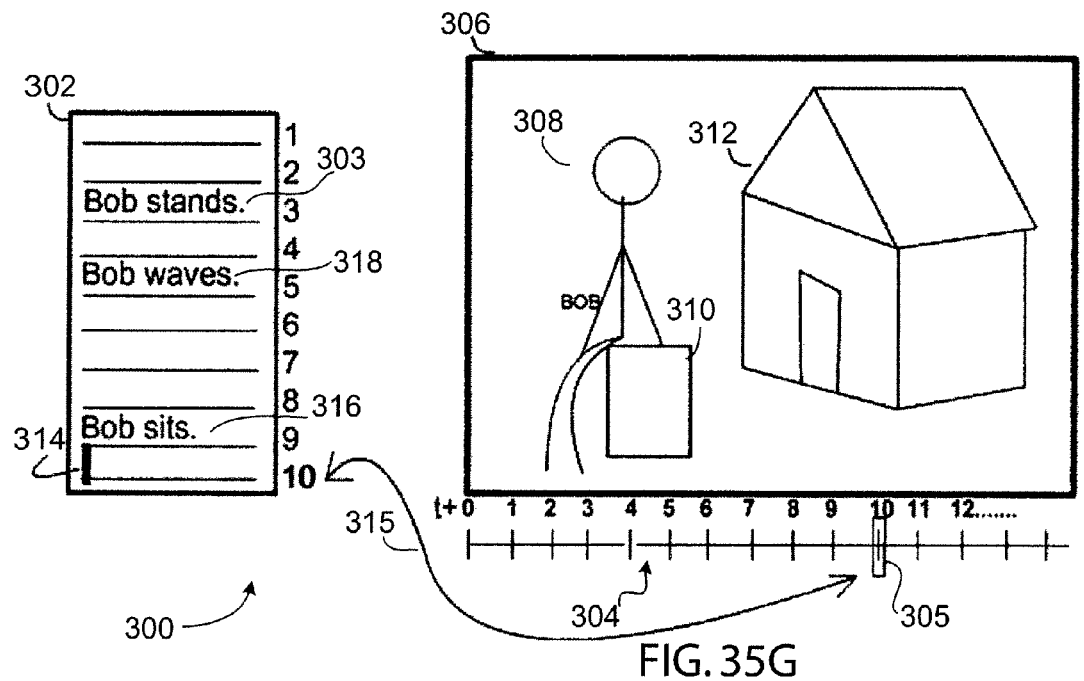

In FIG. 35D, two new lines have been added, pushing the "Bob sits" command 316 down to line 8. Adding time to the simulation is as simple as adding new lines to the script. As the cursor 314 is still above that command, the view 306 has not changed, even though it is now showing time step 7. In FIG. 35E, the command "Bob waves" 318 is added at line 5, but not yet carried out because the cursor 314 has not been advanced (i.e., the new line of text has been typed, but not forwarded to the text processor 130). In FIG. 35F, the cursor is moved from line 5 to line 6, committing the changes on line 5, so the command 318 is carried out and Bob waves in the view 306 of the simulation. In FIG. 35G, the cursor has been moved to line 10, past the "Bob sits" command 316, and the view 306 is updated accordingly.

Figure 35H:
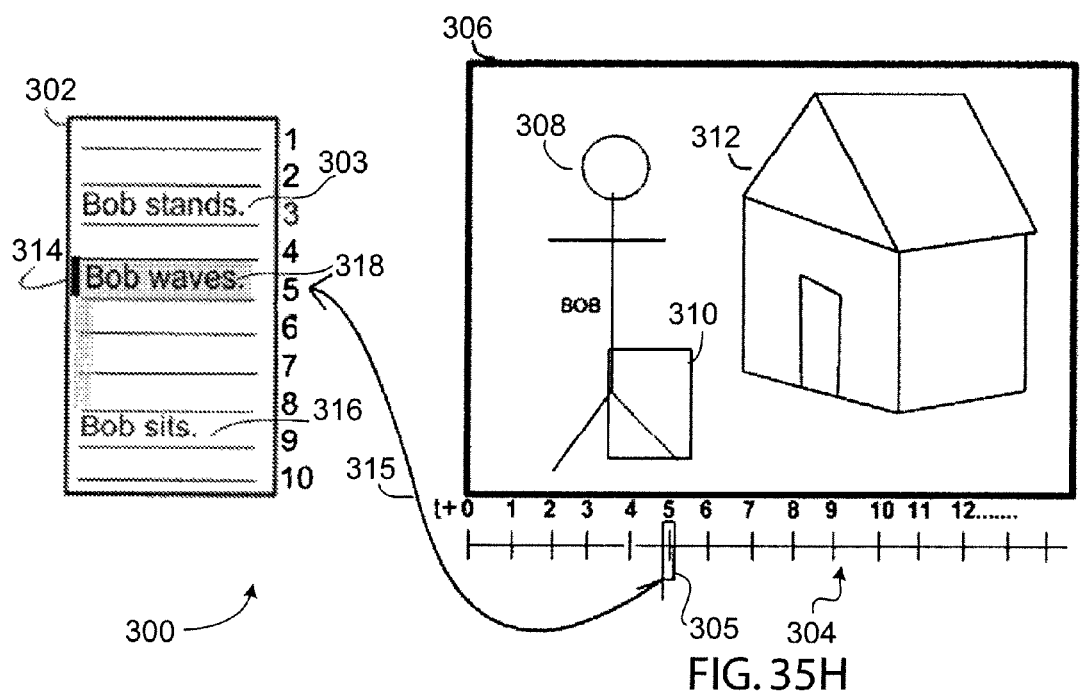
Figure 35I:
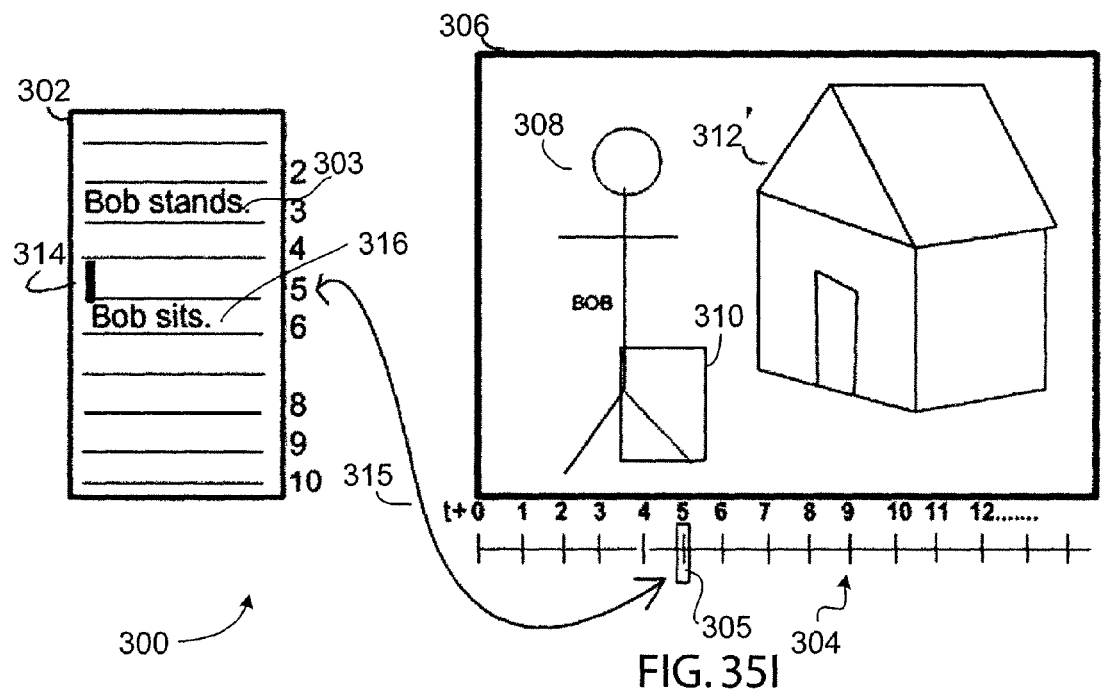
Figure 35J:
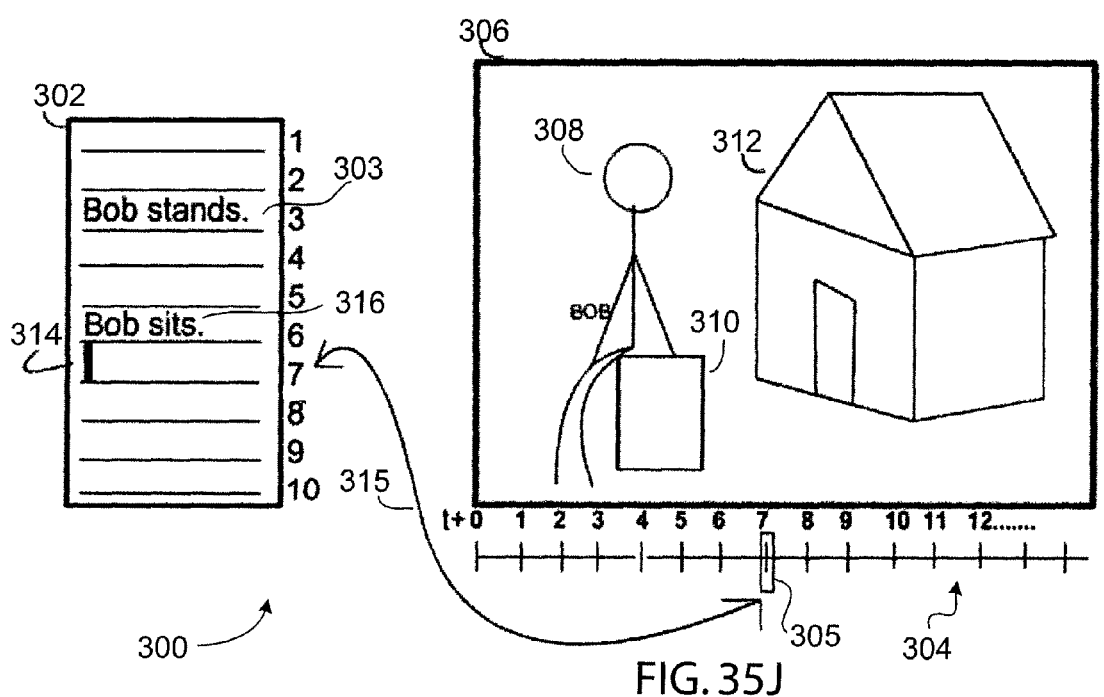

In FIGS. 35H and 35I, the lines 5-8, including the command "Bob waves" 318 are selected (FIG. 35H) and deleted (FIG. 35I). This removes Bob waving from the simulation and advances the time at which he sits, so that in FIG. 35J, where the cursor 314 is on line 7, Bob is sitting at time step 7 in the view 306, while in FIG. 35D, he was standing when at time step 7. Note that in FIG. 35H, the selection of lines 5 to 8 was made by dragging the cursor up the screen, thus the cursor 314 is in line 5 and Bob is not yet waving in the view 306.

Figure 35K:
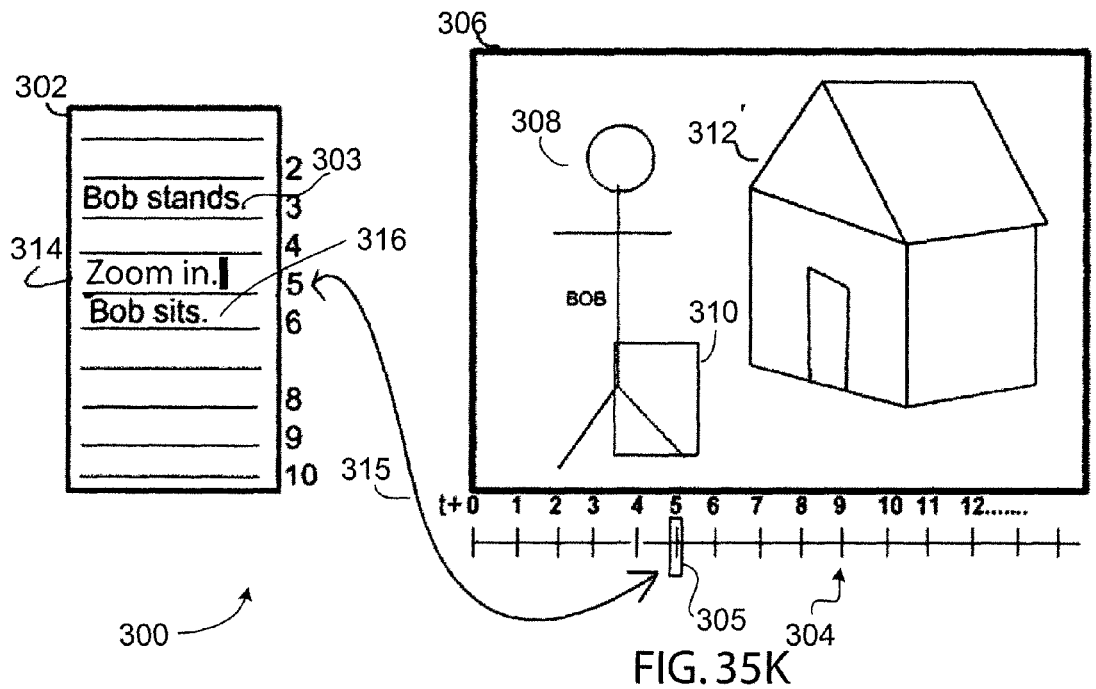
Figure 35L:
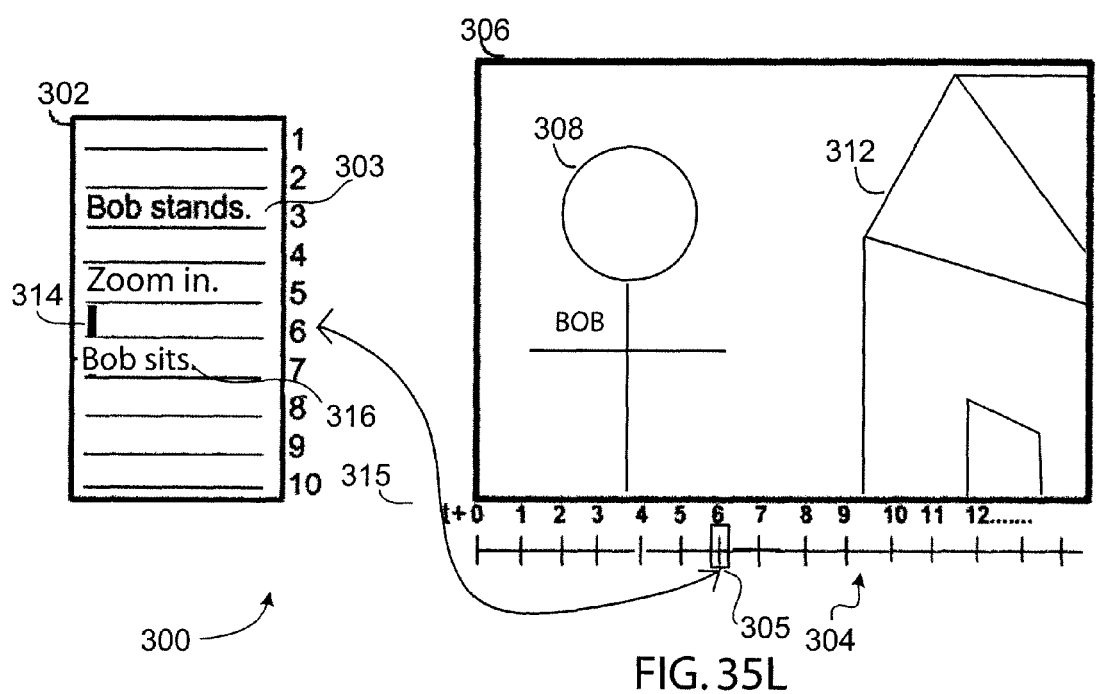
Figure 36A:
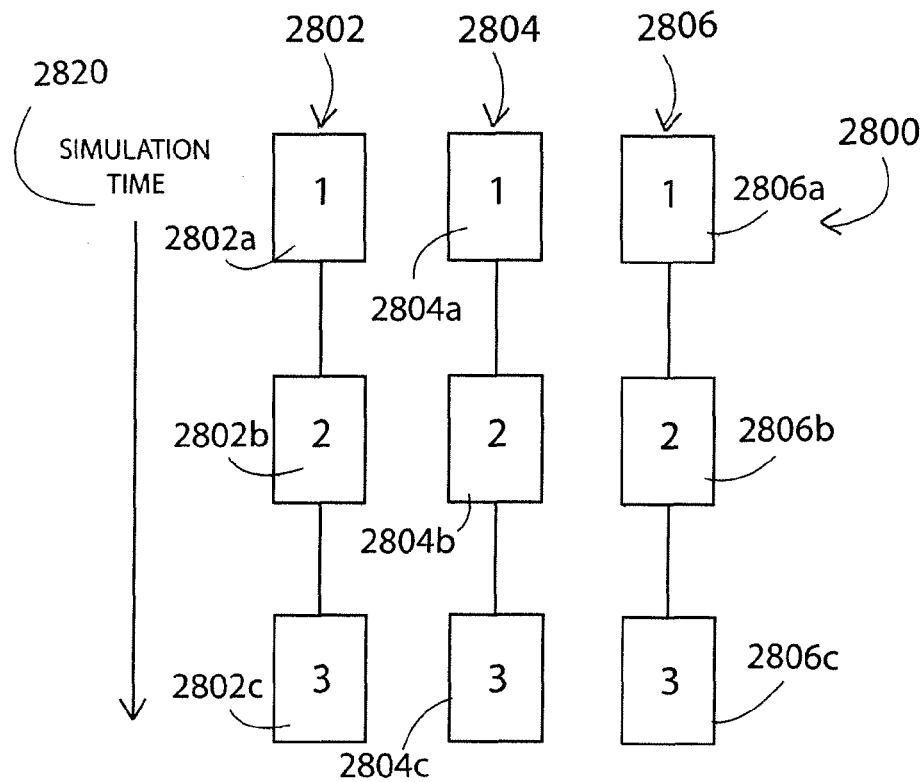
FIGS. 36A-B and 37 show schematic representations of viewing methods for a fixed work simulation.
Figure 36B:
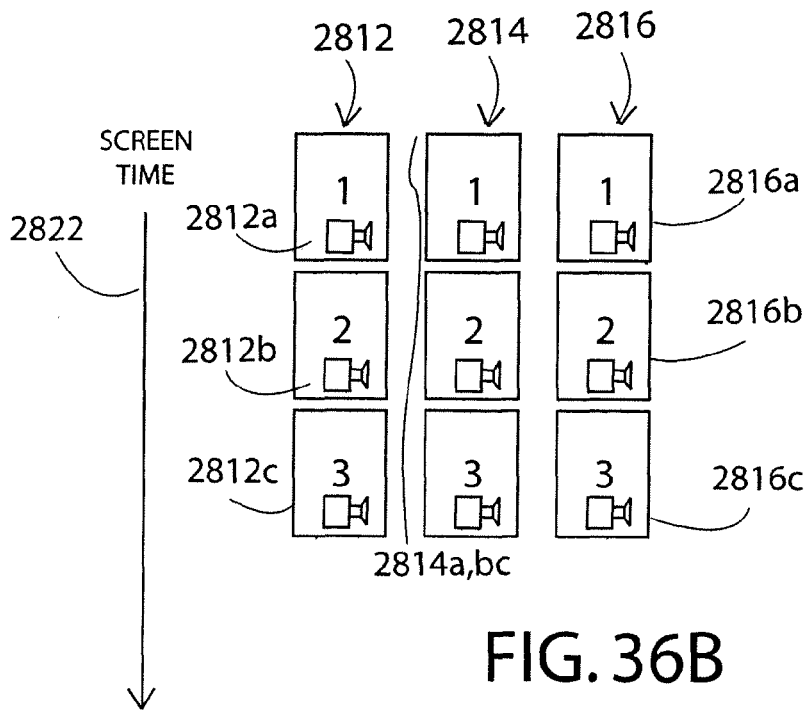
Figure 37:
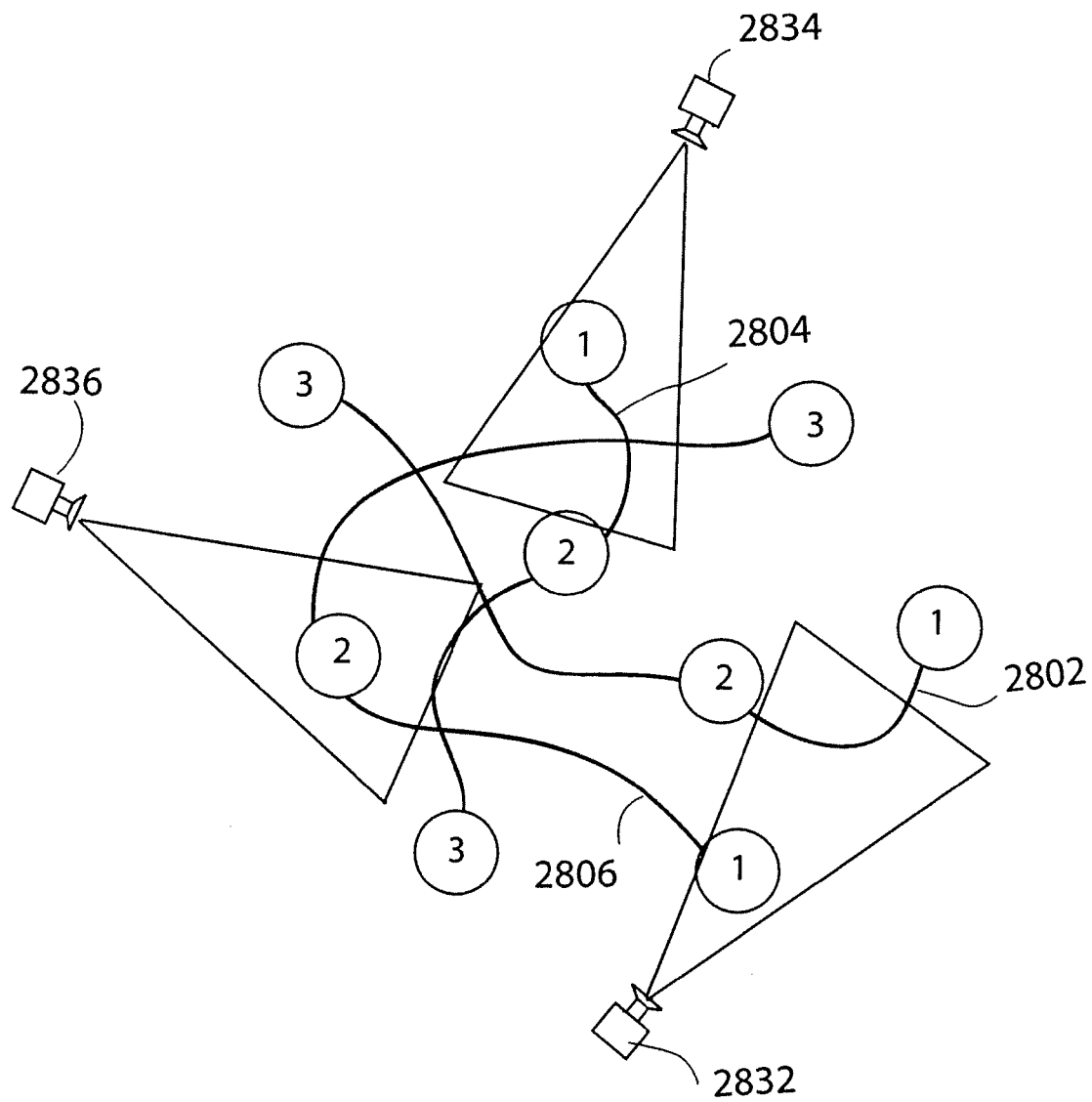

In FIG. 35K, a new command "Zoom in" 320 is added to line 5, and in FIG. 35L it is carried out. The text processor 130 and simulation 118 recognize this as a command for the camera, which causes it to be interpreted as a command affecting the view of the simulation, and not the activities of the objects in the simulation. That is, the command 320 affects how Bob is drawn, but not the state of Bob himself FIGS. 36A, 36B, and 37 show viewing options for a fixed-work simulation entertainment device using content authored by the simulation scripting system described above. FIG. 36A represents an idealized view 2800 of a work containing three stories 2802, 2804, 2806 unfolding in parallel. Using the cameras associated with each of the scripts 2802a-c, 2804a-c, 2806a-c comprising the three stories, a playback interface (on any suitable playback device—not shown) can be configured to present a list of movie choices to a viewer. The sequences 2802, 2804, 2806 defining the movies may include custom sequences developed using the movie view of FIG. 34D, or sequences automatically generated by the system as shown in the character and location interfaces of FIGS. 34A and 34B. As shown in FIG. 36B, each sequence 2802, 2804, 2806 of scripts (which may take place at non-sequential times according to the simulation time 2820) is turned into a continuous sequence 2812, 2814, 2816 of scenes 2812a-c, 2814a-c, 2816a-c according to the screen time.

User selection of one of the sequences 2802, 2804, 2806 results in the user relinquishing control of the camera for a period to allow for playback of the selected story according to the scripted camera views and timing. Playback proceeds using authorial control of the camera defined in each of the scripts comprising a story. All the movie sequences for a given fixed-work simulation show stories unfolding in the same virtual reality space. Interesting combinations of converging and diverging narrative threads can be developed and presented to the viewer. In some examples, a set of characters from one story end up incidentally appearing as "extras" in other stories. Conversely, significant characters or entire scenes may be shared by two or more story lines.

In some examples, the use controls the camera. FIG. 37 is an idealized representation of such an example. Three different camera positions 2832, 2834, 2836 are shown, giving three different perspectives on the three stories 2802, 2804, 2806 unfolding in the same virtual reality space. The position of the markers 2842a-c, 2844a-c, and 2846a-c indicates the geographic locations in the simulation of the settings for the corresponding scripts 2802a-c, 2804a-c, and 2806a-c. In some examples, an entertainment device is configured to offer both the scripted-camera/scripted scenes sequence viewing options of FIG. 34B and the user-controlled camera/scripted events option of FIG. 34C.

In some examples, the primary mode of the playback interface gives the user control of the camera and freedom to roam the simulation, while a secondary mode provides movies of selected scenes and camera angles which can be viewed to provide narrative guidance to the simulation. In some examples, the primary mode is a packaged work containing one or more movies shot in the same virtual reality space. The secondary mode of the interface grants the user control of the camera at any point during the playback of a selected movie, while the order of scenes is still controlled by author. This would result in a movie the user can walk around in.

Figure 38A:
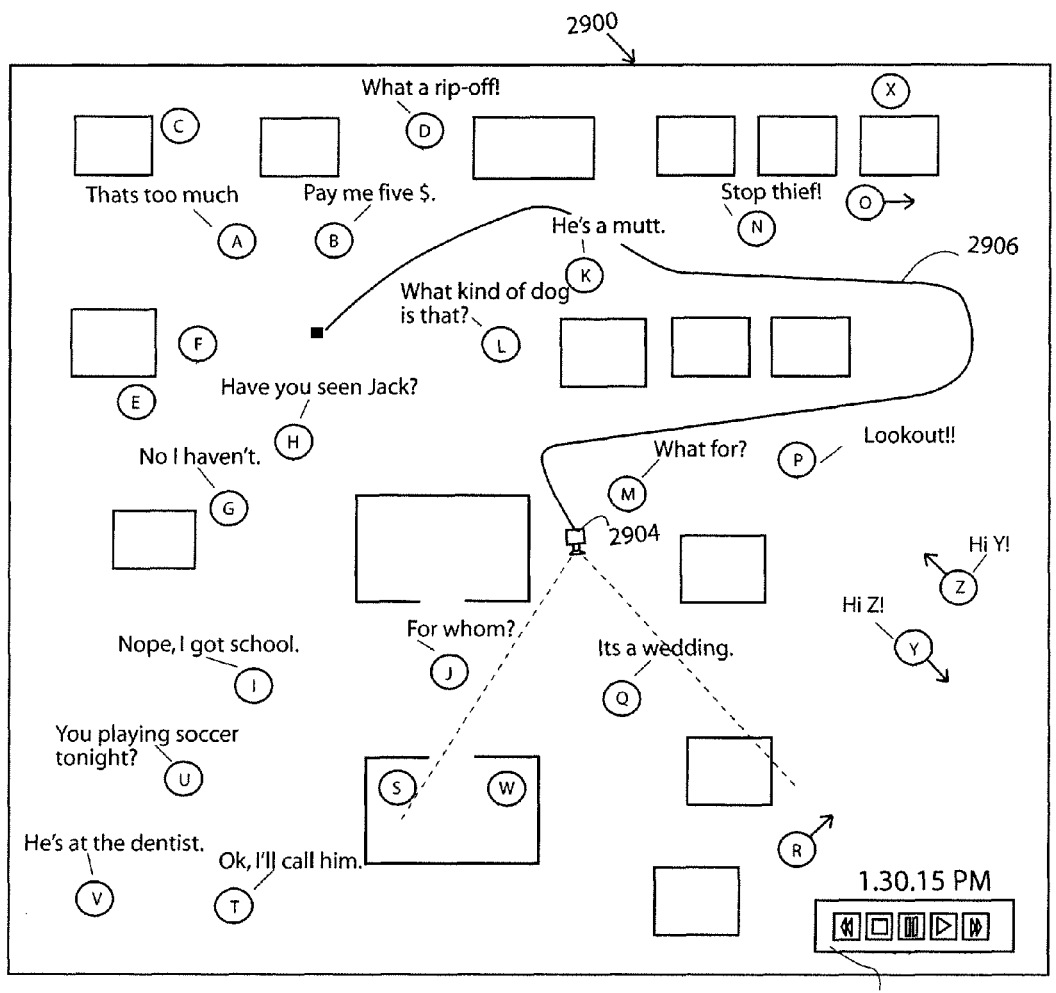
FIG. 38A-C show user interaction with a fixed work simulation mediums.
Figure 38B:
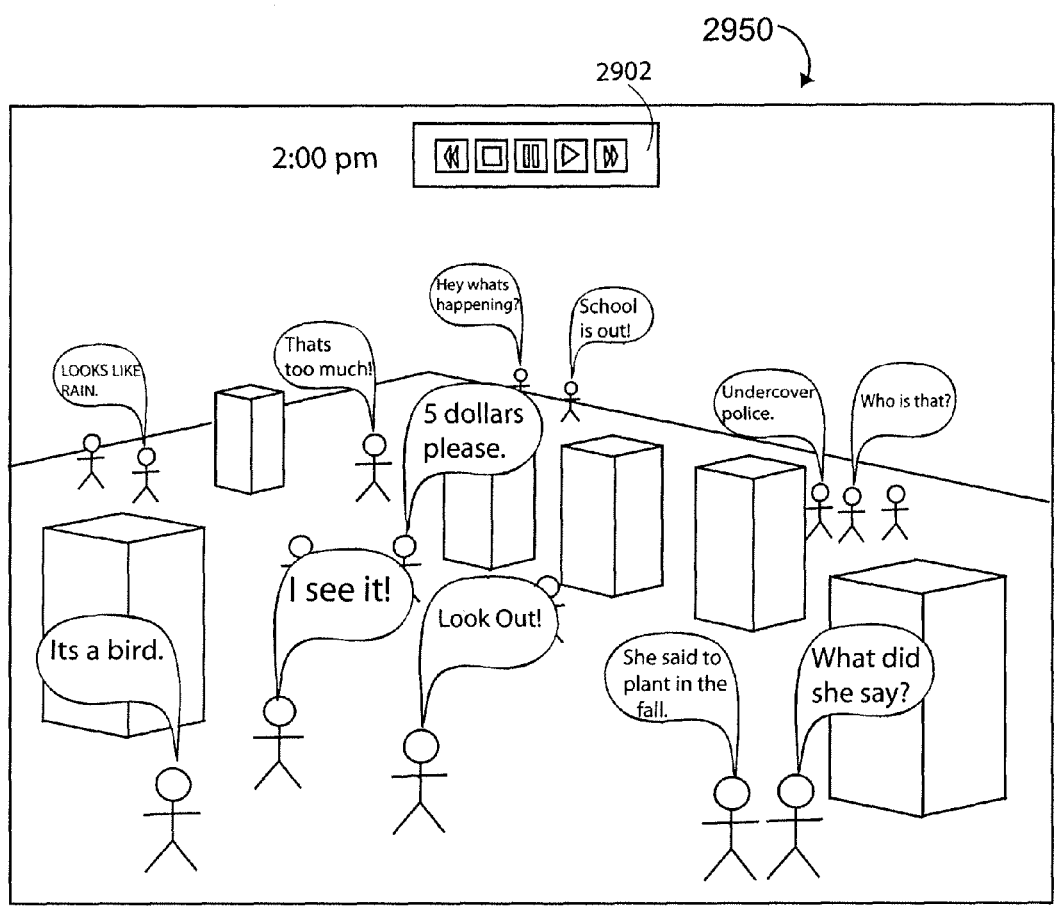
Figure 38C:
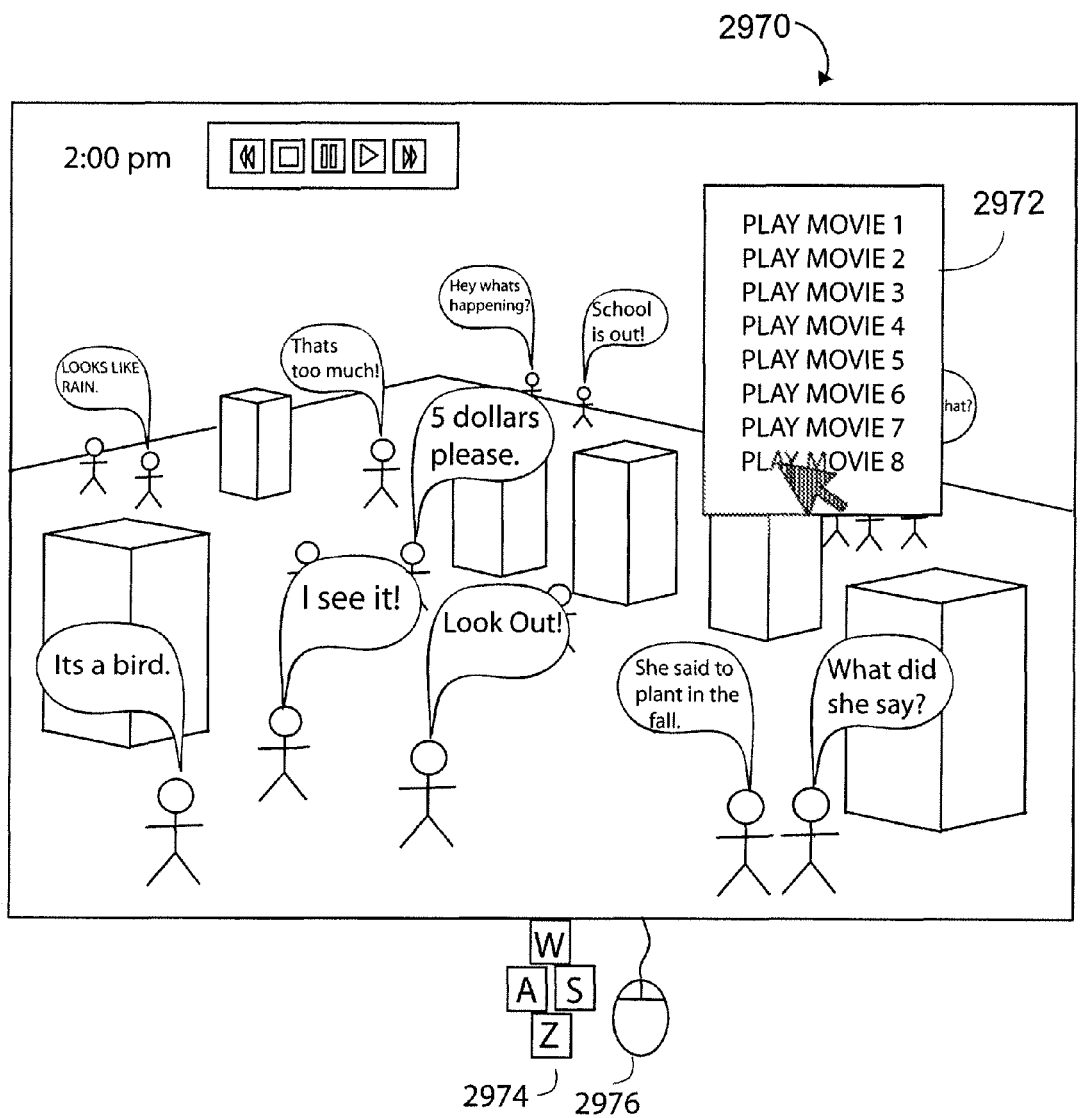

FIGS. 38A through 38C show examples of playback interfaces 2900, 2950, 2970 playing content developed by the simulation scripting system. In FIG. 38A, the viewer manipulates a POV control (not shown) to move a virtual camera 2904 along a path 2906 representing the user's path through the world. The world contains scripted action and dialogue unfolding in parallel. The user may control time with the transport control 2902 in order to "rewind" the world and follow a different path to view action or dialog missed on prior paths. FIG. 38B show a perspective view 2950 of the same simulation. In the example of FIG. 38C, a second perspective view 2970 includes a menu 2972 of different movies that a user can choose from to control the order of scenes and selected points of view. The user may also use a keyboard 2974 and mouse 2976 to interact with the simulation, e.g., by controlling the point of view, as it plays back the selected movie. In these examples, dialogue may be rendered in comic-strip style balloons. In some examples, audio for dialogue is algorithmically synthesized or recorded by professional actors. Motion capture may be used to capture performance of important scenes by real actors, while the scriptable agents create the bulk of the performance according to the scripts by which they are controlled.

Figure 39:
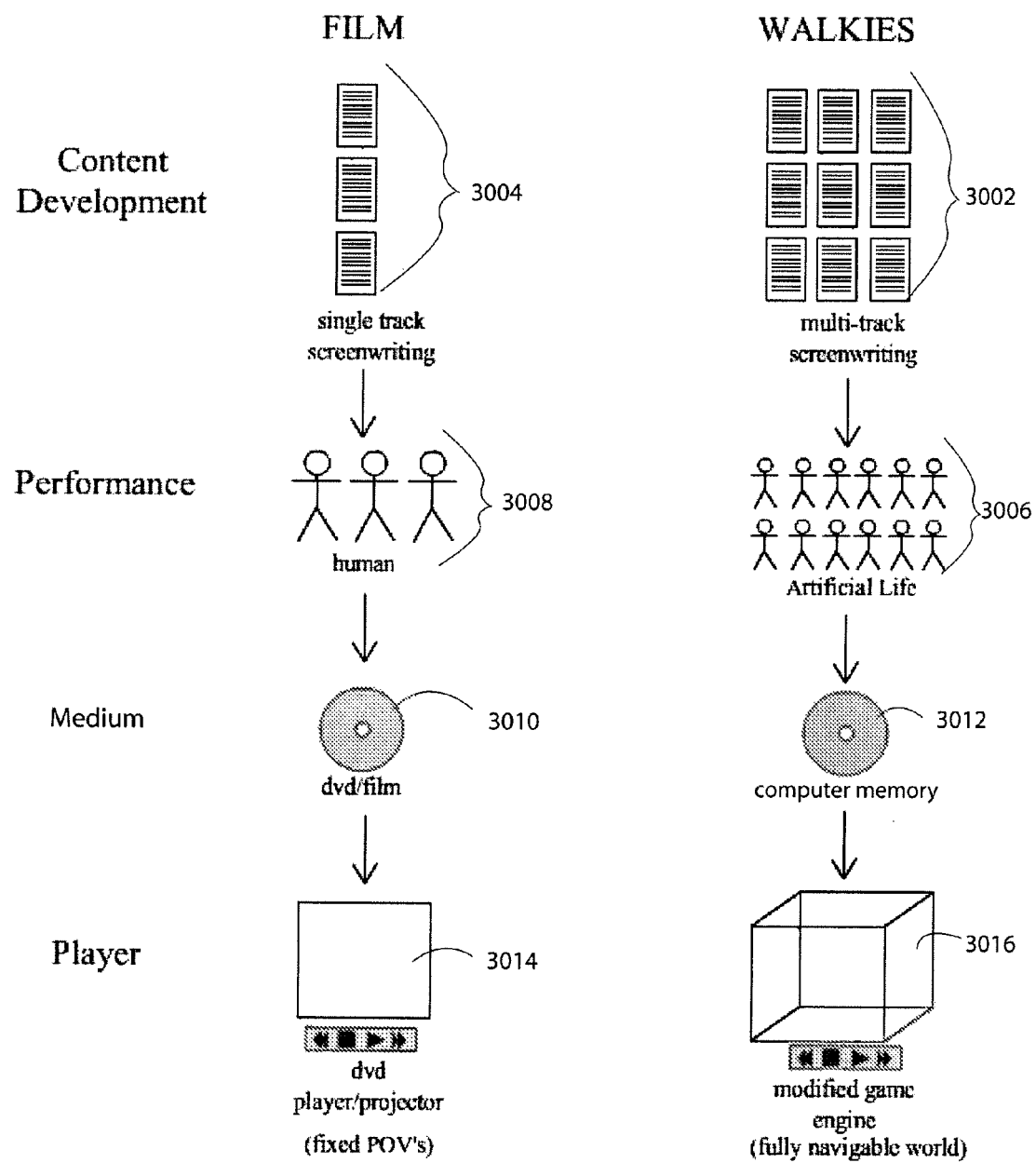
FIG. 39 shows a schematic view of a content development process.

FIG. 39 shows the relationship of a simulation scripting system, production methods, and fixed work medium as it relates to traditional film. The content of a fixed work simulation medium may be as wide as varied as that found in the film industry or book publishing industry, but the ease of creating multiple simultaneous scripts 3002 allows the author to include more content in a single production than a linear scrip 3004 of a film would permit. Titles may include action, drama, adventure, historical fiction/re-enactment, or any other topic. Other uses include language learning environments or other training simulations. More characters are possible because the system parses the multiple simultaneous scripts 3002 to animate numerous artificial actors 3006, as compared to the limited number of human actors 3008 that may be included in a single movie.

Movies are typically stored on a read-only medium 3010, such as DVD or film, and a fixed work simulation is similarly stored on a computer memory 3012, such as a DVD, CD, hard disc, flash memory, or other technology that can be read by the simulation system. The playback interface 3014 for a movie is a standard media playback device or projector, providing the fixed point of view from which the movie was filmed. (Some DVDs and their players provide a choice of camera angles, but only if each choice was previously filmed and included when the DVD was produced). In contrast, the interface 3016 for the simulation system resembles, in some examples, a video game interface. Video game interfaces and the underlying game engines that run them are equipped to render complex worlds, in real-time, with the user controlling the point of view. Once the data needed to recreate the simulation (e.g., data describing the locations and characters, some metadata, and the scripts) is stored, a fixed-work medium is created that a user can load into a player and interact with, either by exploring the simulation as it runs or watching any of the pre-defined or dynamically-defined sequences of scripts. In some examples, keyframes of the simulation may be created from the scripts (e.g., one keyframe for each time step), and the intervening frames filled in by the game engine or other underlying rendering system.

EXAMPLE IMPLEMENTATION

Figure 40:
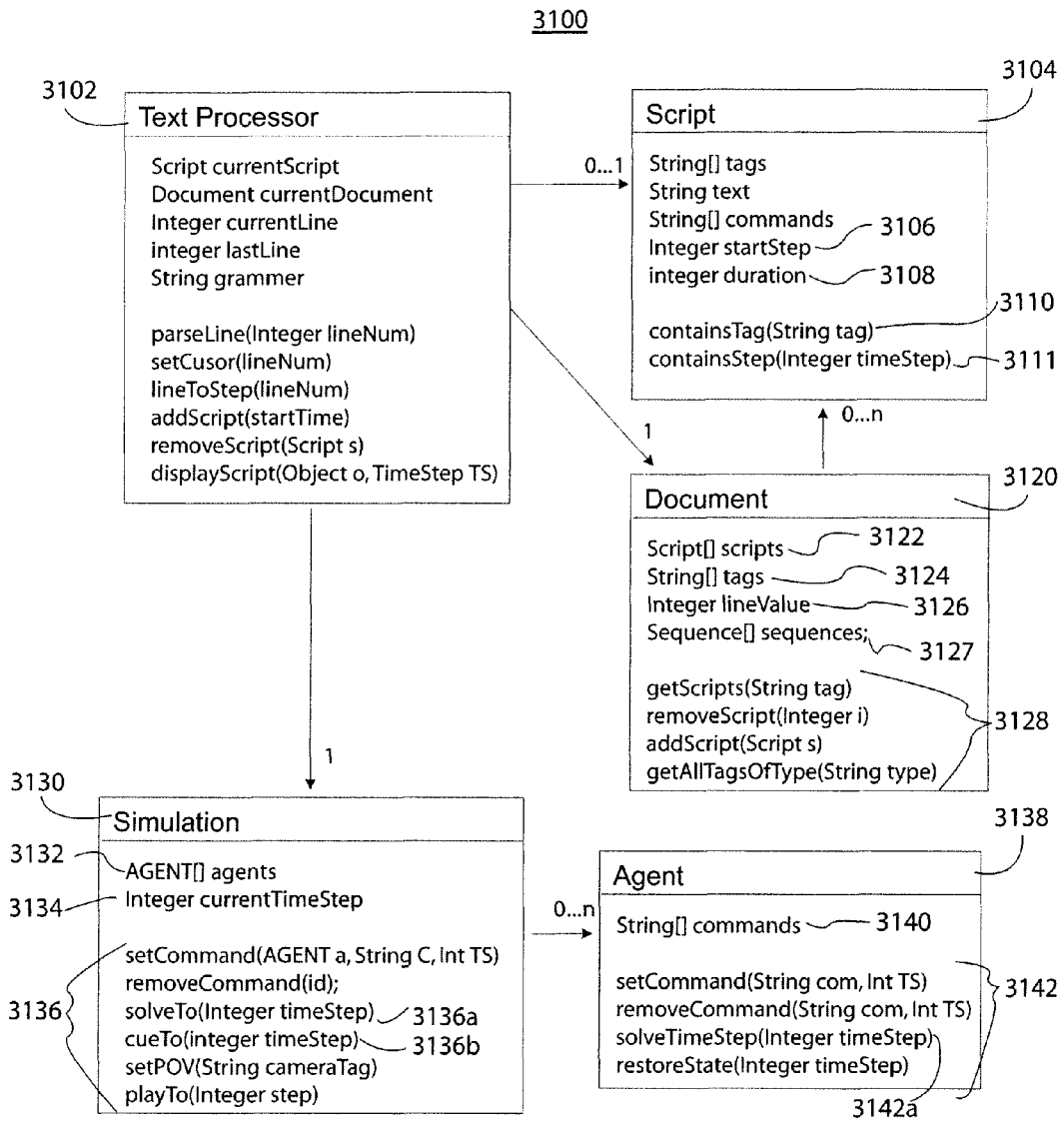
FIG. 40 is a block diagram of a software configuration.

FIG. 2, discussed above, shows the basic components used to implement this system. One possible implementation of such a system is described below. FIG. 40 shows the overall architecture of a system 3100 that implements the user interface items in discussed above and interfaces them to the system of FIG. 2. The text processor 130 may be implemented as a subroutine 3102 that outputs individual scripts 3104, and script documents 3120, to the text editor 126 or receives edits to the text from the text editor. The script 3104 includes metadata describing its start time 3106, its duration 3108, a set of tags 3110, and an indication 3111 of which time steps are included (in some examples, this is derived from the starting time 3106 and duration 3108).

Each script 3104 is a part of a document 3120. The document includes an indication 3122 of its included scripts, the tags 3124 they include, a "line value" 3126, an indication of how many time steps in the simulation correspond to each line of text in the document, and a list 3127 of sequences of the scripts already defined. The text document 3120 can carry out several functions 3128, including retrieving scripts based on their tags, removing a script from the document, adding one, and returning all tags of a particular type.

The system 3100 also includes a simulation routine 3130, which implements the simulation 118. The simulation 3130 includes identifications 3132 of the agents in the simulation and 3134 of the current time step and carries out various commands 3136. The simulation engine 3130 interacts with software agents 3138 for each object that is part of the simulation 118, and the identification 3132 indicates which agents are active at the current time step 3134. The agents are implemented as objects 3138 including an identification of commands 3140 and functions 3142 for receiving and carrying out the commands. In some examples, the list 3140 of commands includes the time step associated with each command. At each time step in the simulation, when the solveTo instruction 3136a is received, the simulation routine 3130 determines which commands apply to each object by referring to the list for that object. It will then carry out the appropriate commands by sending a solveTimeStep instruction 3142a to a software agent 3138 for the object, changing the state of the objects and thereby changing the state of the simulation 118. Other instructions 3142 implemented by the software agents 3138 include setCommand and removeCommand operations to associate or disassociate commands with the objects at specific time steps. Likewise, a setCommand operation in the simulation routine 3130 is used by the line parser subroutine 3250 of the text processor process 3200 (FIGS. 41 & 42) to instruct the simulation routine 3130 to add that command to the corresponding object's agent 3138.

In addition to implementing characters, additional software agents 3138 may implement other features of the simulation, such as cameras corresponding to the view 134 of the simulation 118 rendered by the rendering engine 136. From the point of view of the simulation process 3130, such agents are the same as character agents, and commands (such as Zoom or Pan for a camera agent) can be issued in the same manner as commands for characters.

Figure 41:
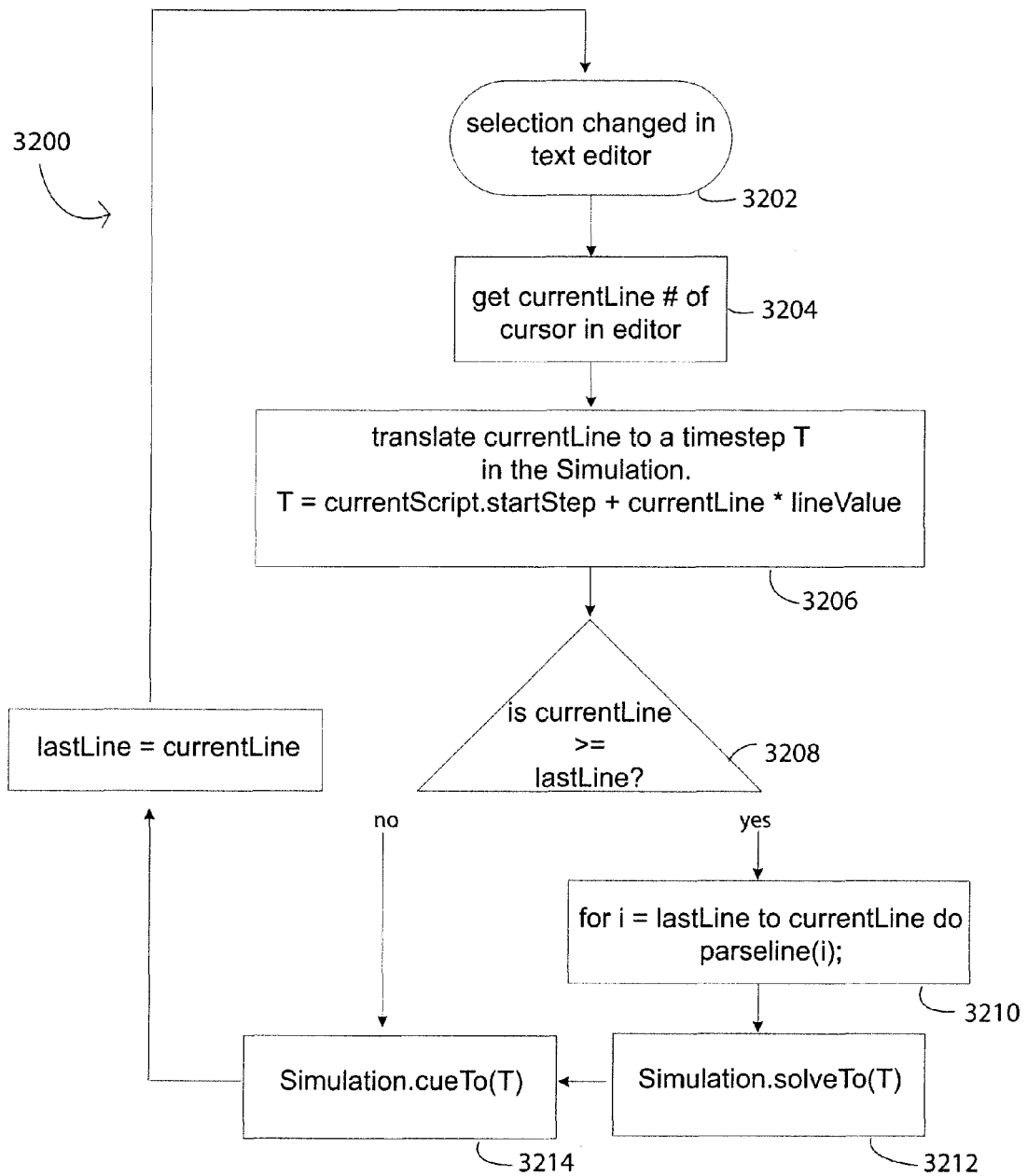
FIGS. 41-51 are flowcharts.

FIG. 41 shows a flow chart for the text processor subroutine 3102. The illustrated process 3200 is called whenever the selection changes 3202 in the text editor 126. This is defined, in some examples, as occurring whenever the position of the cursor 128 changes. The process 3200 first determines 3204 the line position of the cursor in the script 3104 currently being edited. This may be provided to the subroutine 3102 explicitly by the text editor 126 or it may be determined from the data constituting the script 3104. The process 3200 next determines 3206 what time step T in the simulation corresponds to the current line by adding the starting time step 3106 of the current script to the current line T (just determined) multiplied by the line value 3126 of the script document 3120.

Next, the process 3200 determines 3208 whether the user has placed the cursor ahead in the editor or back, relative to its previous position. If the user has advanced in the editor, the user has advanced in time steps, so the present state of the simulation must be computed and the view must be cued to the new position. On the other hand, if the user has placed the cursor on a previous line, the simulation will be cued to a time step for which the state of the simulation has already been computed, therefore a simple cueing is sufficient. This determination 3208 may be made by comparing the current line to a stored value of the previous cursor line position.

When the process 3200 has determined that the user has hit return or enter, or otherwise advanced the cursor to a new line position, any new or edited lines must be parsed for possible commands before computing the state of the simulation and cueing the view. To do this, the process 3200 calls 3210 another subroutine 3250 (FIG. 44) that parses the text for commands and sends them to the simulation routine 3130.

This may be repeated for additional lines if the cursor was moved more than one line. After the subroutine 3250 is completed, the process 3200 sends solveTo and cueTo instructions 3212, 3214 (corresponding to commands 3136a, 3136b in the simulation engine 3130) to the simulation routine 3130, instructing it to compute the state of the simulation at the time T corresponding to the cursor position and cue the view accordingly. If the cursor was moved to a previous line, the process 3200 goes directly to the cueTo instruction 3214.

Figure 42:
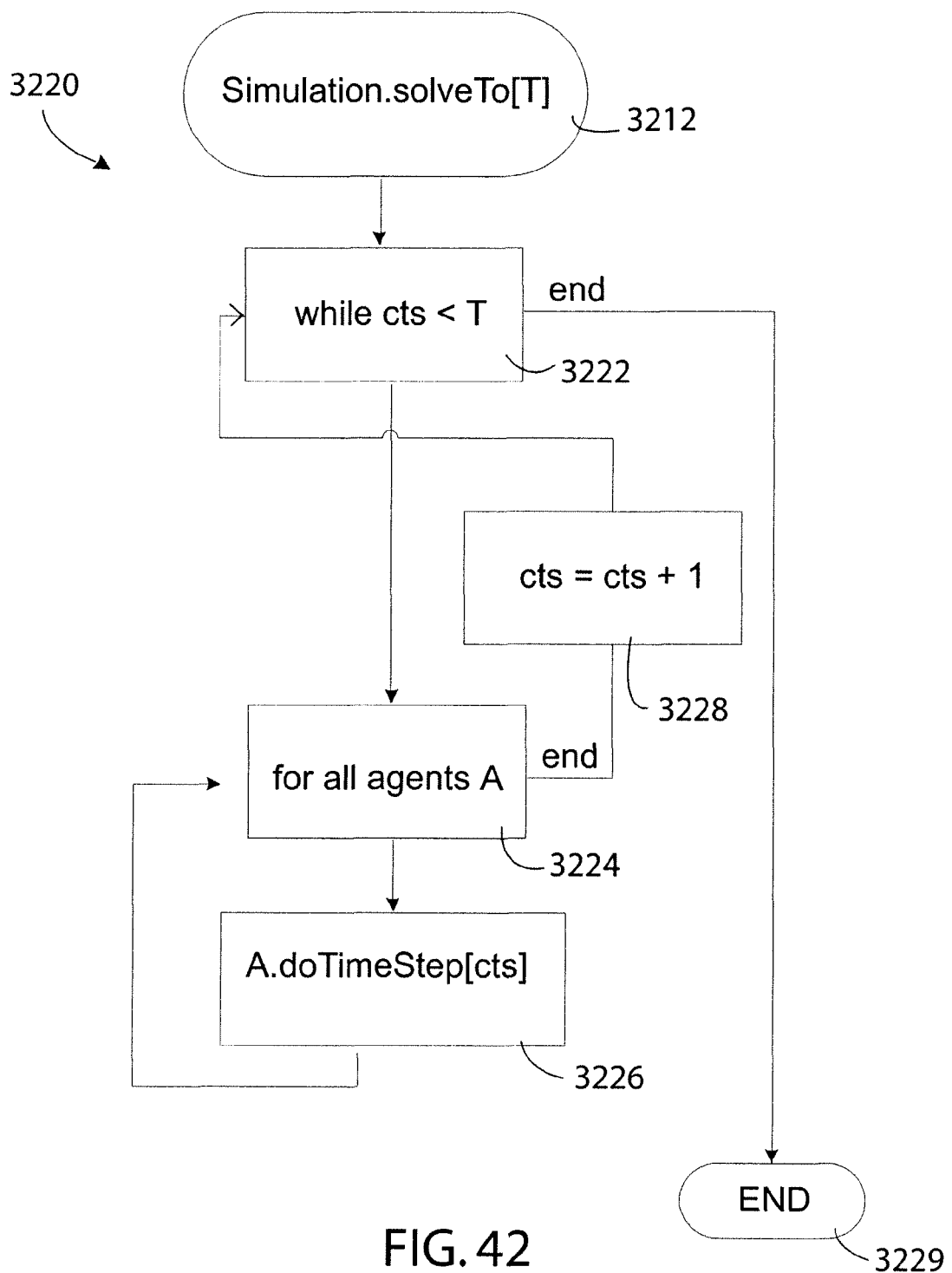

The solveTo instruction 3212 does not cause the simulation processor to redraw the simulation's display, but simply to calculate the state of the simulation from its current time step to the time step T passed as a parameter, as shown, for example, in FIG. 42. The solveTo instruction 3212 uses a process 3220 that begins when the instruction 3212 is called. As long as the current time step is less than 3222 the input time T of the current line, each agent is instructed 3224 to carry out its doTimeStep function 3226 at the current time step. After each agent has been called 3224, the current time step is incremented 3228. Once the current time step has reached 3222 the current line time step T, the process 3220 ends 3229.

Figure 43:
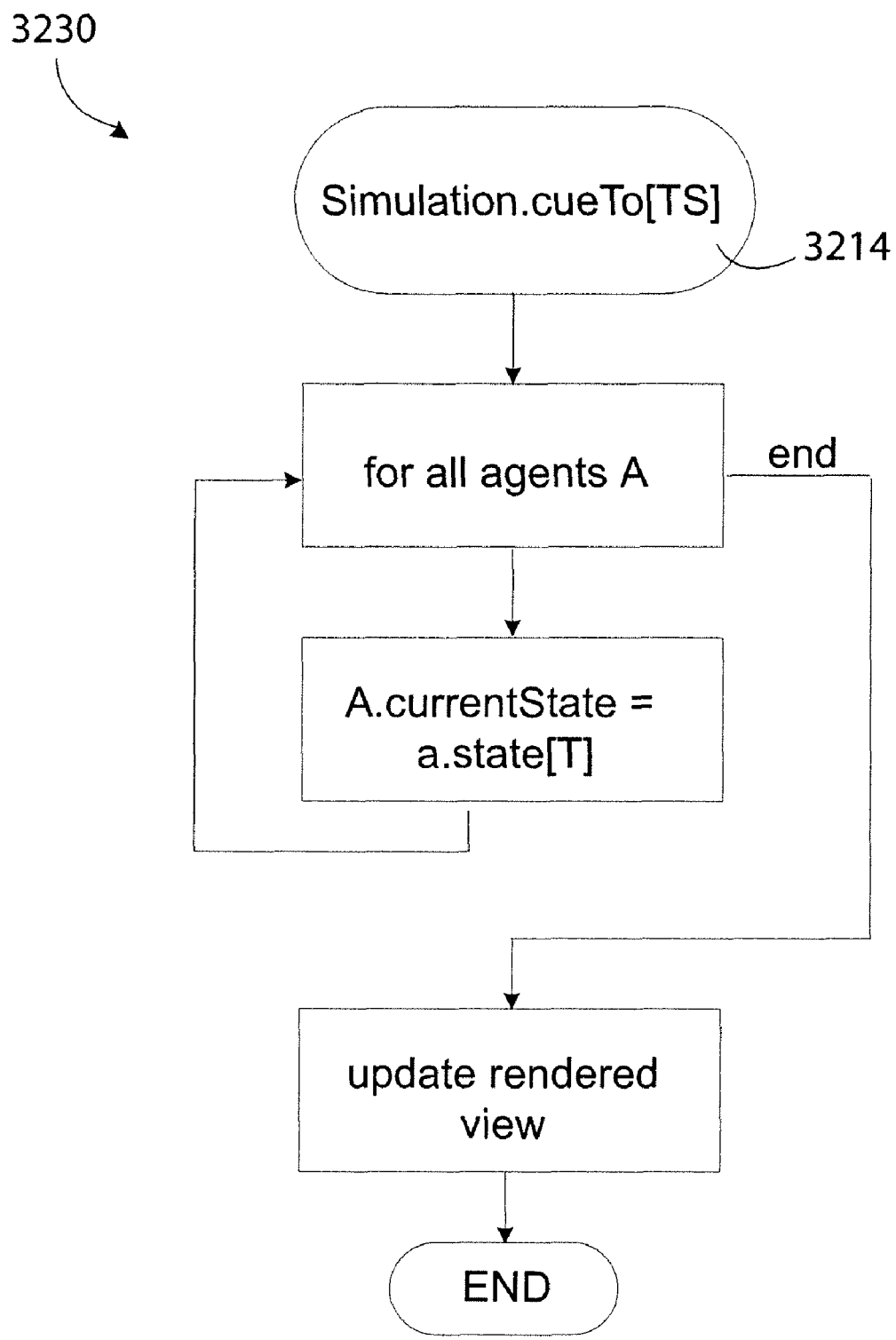

The cueTo instruction 3214 moves the view 134 of the simulation to a time step that has already been calculated, as shown, for example, in FIG. 43. The cueTo instruction 3414 uses a process 3230 that begins when the instruction 3214 is called. Each agent is instructed 3232 to set 3234 its current state to the input time step T of the current line. After all the agents have been updated 3232, the rendered view is updated 3436 and the process 3230 ends 3238.

Figure 44:
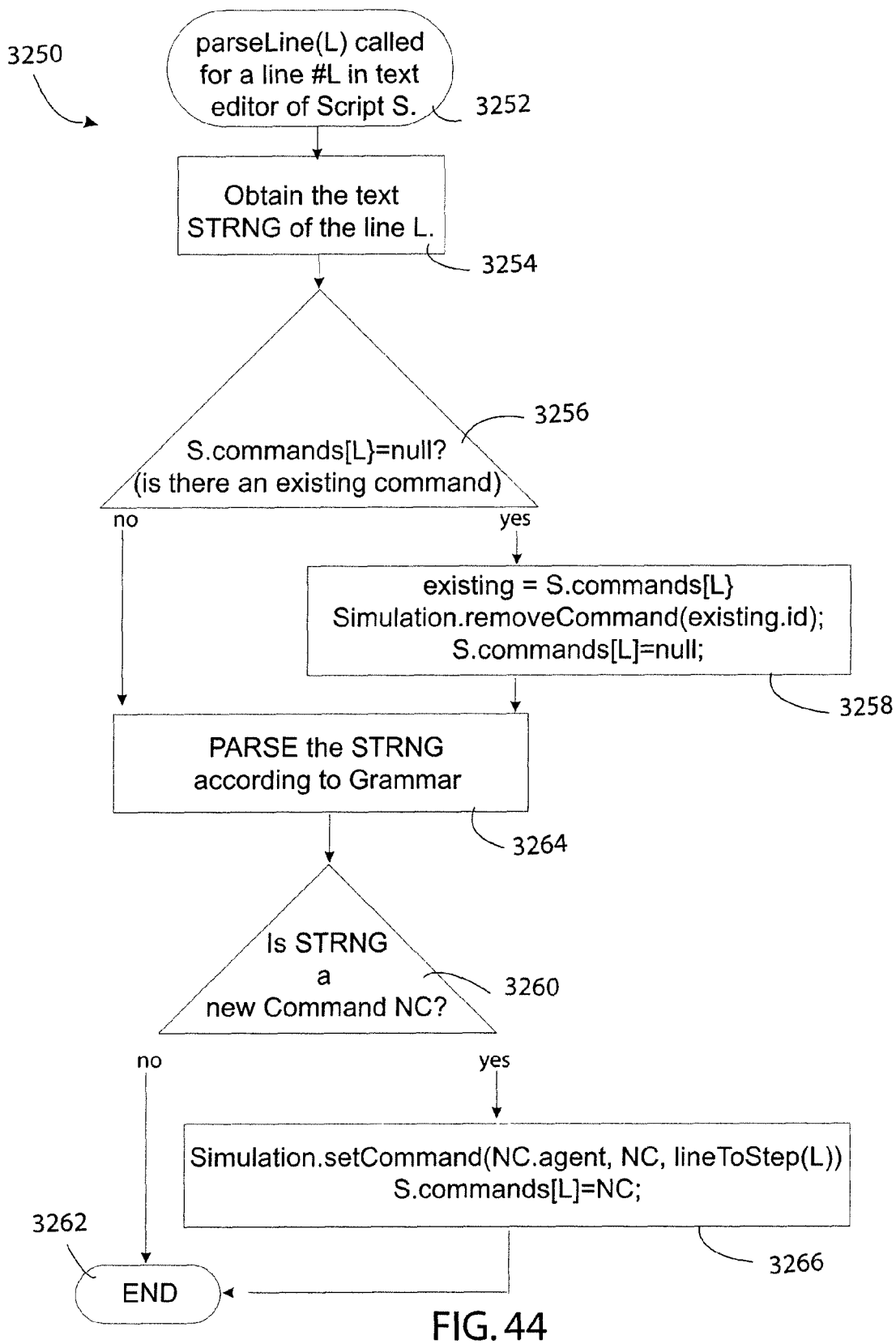

An example process 3250 for the text processor's line parsing subroutine is shown in FIG. 44. This routine begins 3252 when it receives an indication of the line L to parse from the call 3210 in the text editor process 3200. The routine 3250 then obtains 3254 the string of text at line L. In some examples, the text processor stores an array of commands that are associated with each line in the editor so that if one of the commands is removed or changed, the text processor will be able to determine this and update the simulation before adding any new commands. The routine 3250 checks 3256 to see whether there is already a command associated with line L, win which case the command is removed 3258. Next, the process 3250 parses 3264 the string at line L to extract any commands and related objects and evaluates 3260 whether it is a new command. If it is not, the process is complete 3262. If the string is a new command, it is sent to the simulation processor and associated 3266 with the time step corresponding to line L and with the objects to which it relates.

Additional features may be included in this line parsing routine 3250. For example, the text processor can mark up the script in the editor with tags in order to detect when and where commands are added and removed.

In some examples, the simulation 118 has the capabilities of a gaming engine in which scriptable objects exist in a real-time rendered 3D world that also contains a scriptable camera, the objects and camera controlled by agents. Many examples of such engines exists, such as the Unreal Engine created by Epic Games, Inc., of Raleigh, N.C.

Figure 45:
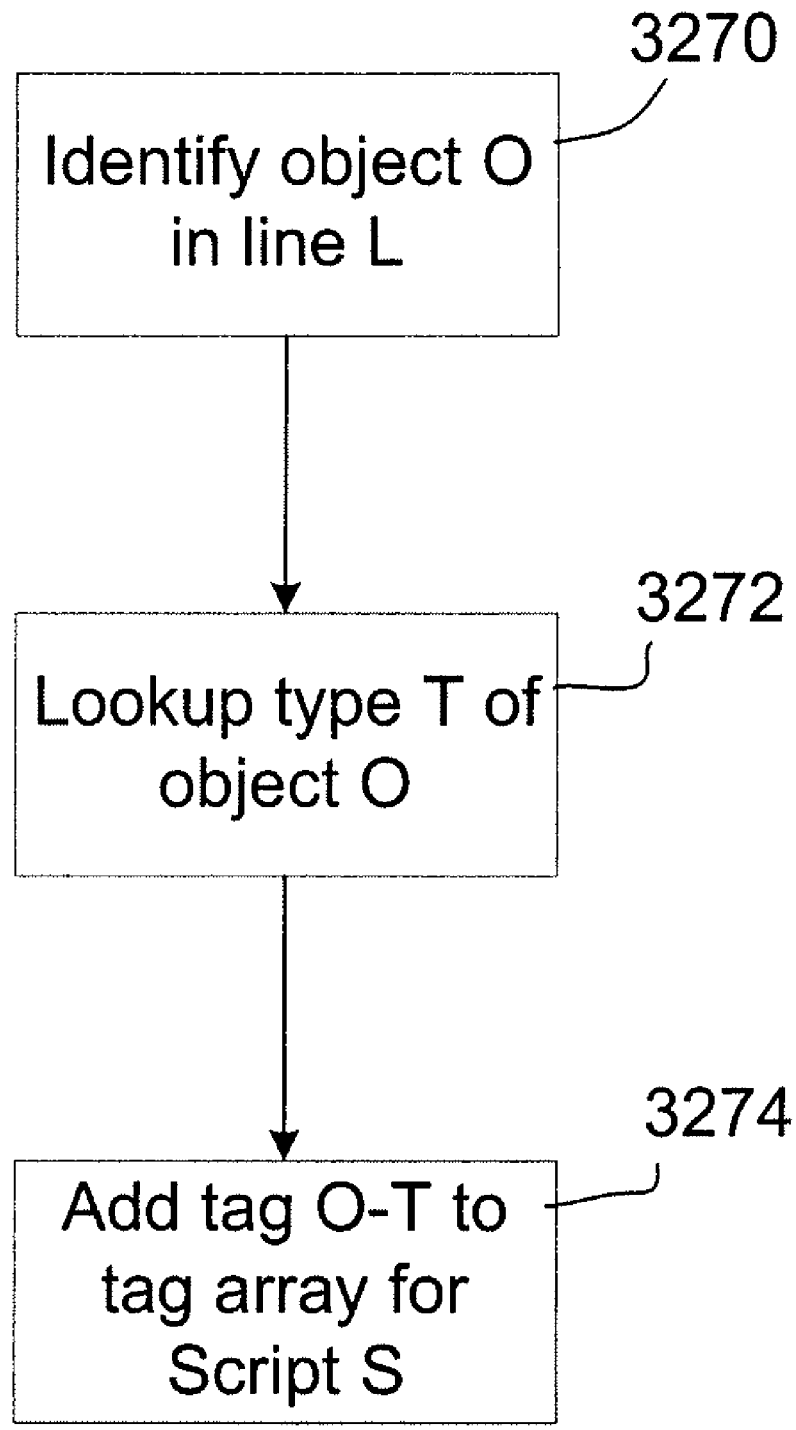

In some examples, the subroutine 3250 in FIG. 44 includes additional steps 3270-3274, shown in FIG. 45, that tag the script being parsed with object tags. For example, if a command is identified as applying to the object Bob 308 in FIG. 4A, the step 3270 parses the command and step 3272 uses the name Bob to lookup the type of object that Bob is, which in some examples could be a character. The command 3274 then creates a tag BOB_CHARACTER and adds it to the tags array 3110 of the script 3104. Thus, the subroutine 3250 automatically tags scripts 3104 for later retrieval and arrangement, as shown, for example, in FIGS. 26A-26E.

In some examples, the grammar rules for parsing commands are determined according to film industry script formatting rules. In this way, the system will allow the user to type a scene, including a scene heading, camera angles, character descriptions, dialogue and action in a standard screenwriting format. All the commands contained in that scene are parsed and associated with the time that is assigned the line on which the commands were typed. The scripts of the scene are tagged for characters, locations, or through lines of a screen play. For example, the text parsing step 3264 of the subroutine 3250 may include an exception for the first line of text in a section that would parse for the location of the scene rather than for commands for objects. The process then stores a tag in the tags array 3110 of the script 3104 such as EXT: HOUSE_LOCATION. This tag indicates that the tag type is location and the tag name is HOUSE. Such tags can be used to form the location-based display of FIG. 21A.

It should be clear that there are many grammars for parsing character strings in such processes. Grammars can easily be defined and parsing routines established to recognize any number of commands, according to the available agents in the simulation processor. In a screenwriting-focused system, these agents may include camera, character, and lighting agents, all dynamically controllable by typing in the screenplay format.

Figure 46:
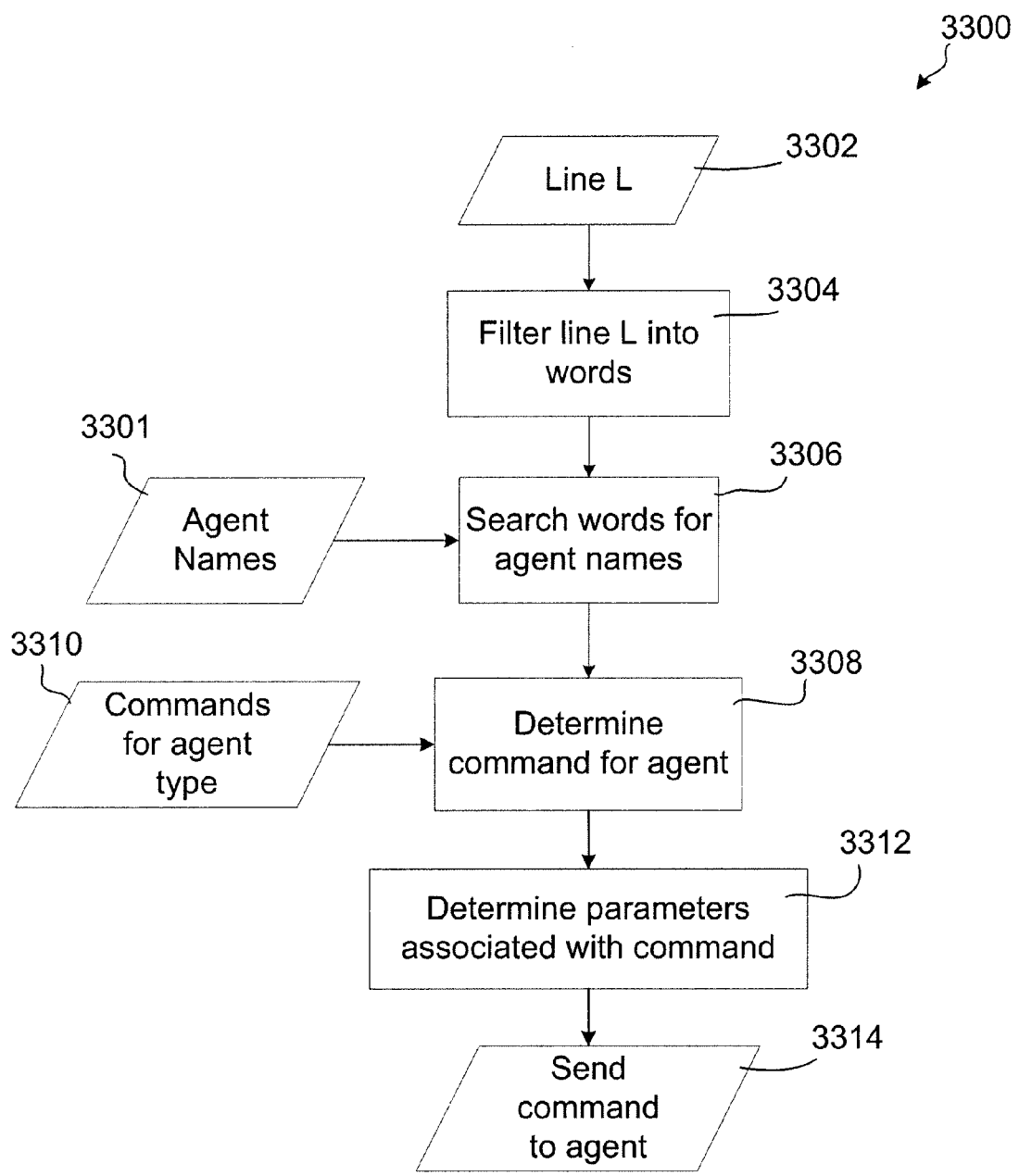

An example process 3300 for parsing the text in a given line is shown in FIG. 46. A list of agent names is maintained in the text processor. The routine 3300 (e.g., the routine shown as the single step 3264 in FIG. 44), begins when the line L, is received 3302. This line of text is filtered 3304 into words and these words are searched 3306 for agent names. If an agent name is discovered, the process advances to the next word and compares 3308 it to a list 3310 of available commands for the agent type to determine what command the agent is being given. If a command is recognized, the process 3300 advances according to the grammar of the command to determine 3312 parameters or objects associated with the command. For example, when a command takes one input, the process uses the next word as that input. When a completed command has been parsed, it is sent 3314 to the agent (e.g., continuing through process 3250 in FIG. 44).

Figure 47:
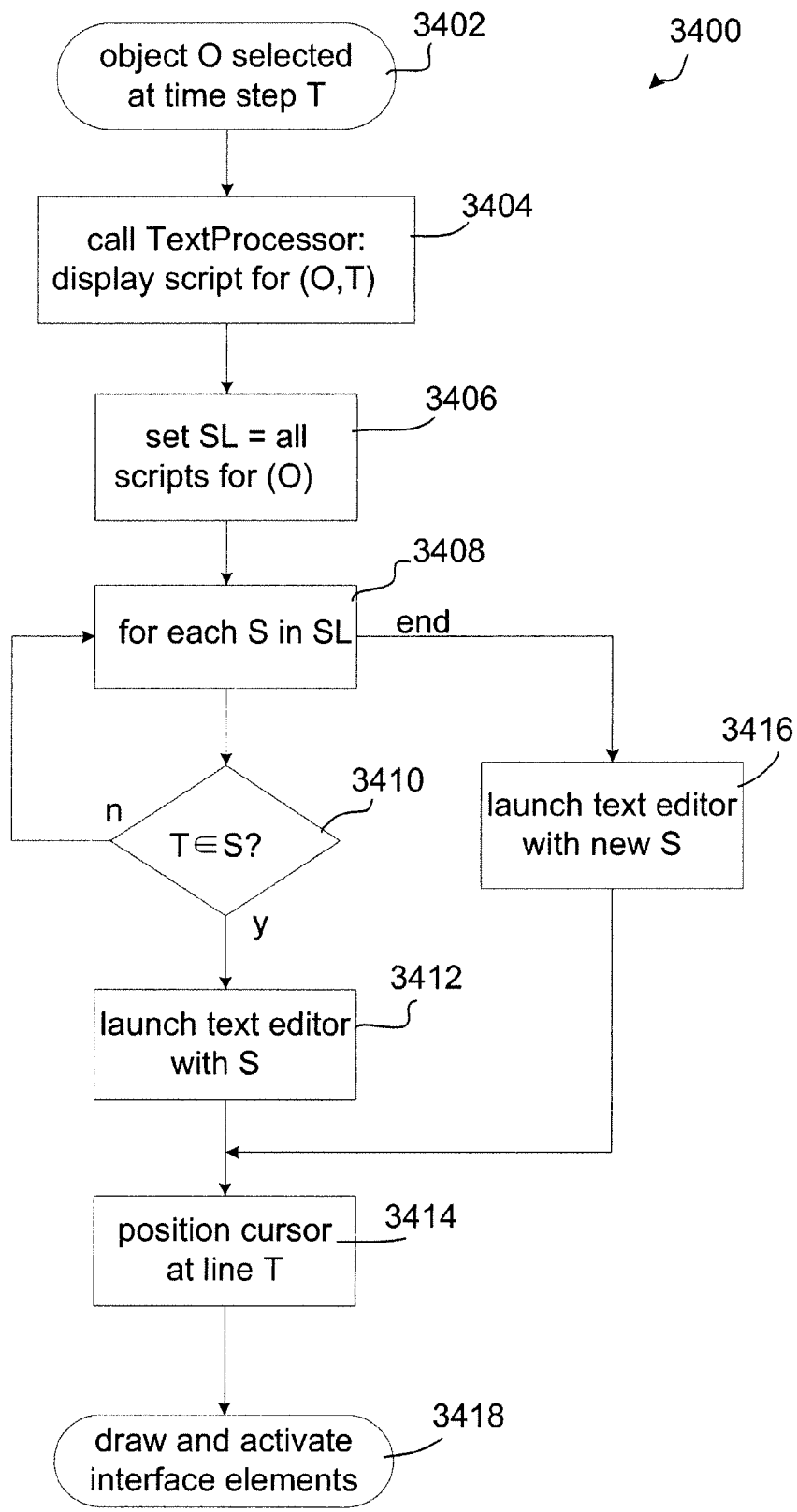

Once the text in scripts is associated with objects in the simulation, the user interface features shown in various figures and discussed above can be generated. FIG. 47 shows the a flowchart describing how in one embodiment of the system the combined text document/simulation view shown, for example, in FIGS. 32A-G can be computed and rendered. A process 3400 begins 3402 when an object O is selected in the simulation view at a particular time step T. A call is made 3404 to the text processor 126 to display a script corresponding to the object O at the time step T. This causes a list SL of sections to be assembled 3406 consisting of each section TS in the text document TD that is tagged with the name of the object O (see script 3104 and text document 3120 in FIG. 40, described above). The process then scans through each script TS the list SL 3408 looking for the one containing lines corresponding 3410 to time T. If the user interface restricts the user to selecting an object only when there are commands for that object at the displayed time step, then this process will always find a script. In some examples, the same process may be adapted to add 3416 a new script if an object without lines at the time step T is selected. Once the correct script is found or created, the text editor 126 is launched 3412 or 3416 and the cursor is positioned 3414 in the editor at the line corresponding to time T. Other interface elements are then drawn and activated 3418 to complete the user interface.

Figure 48:
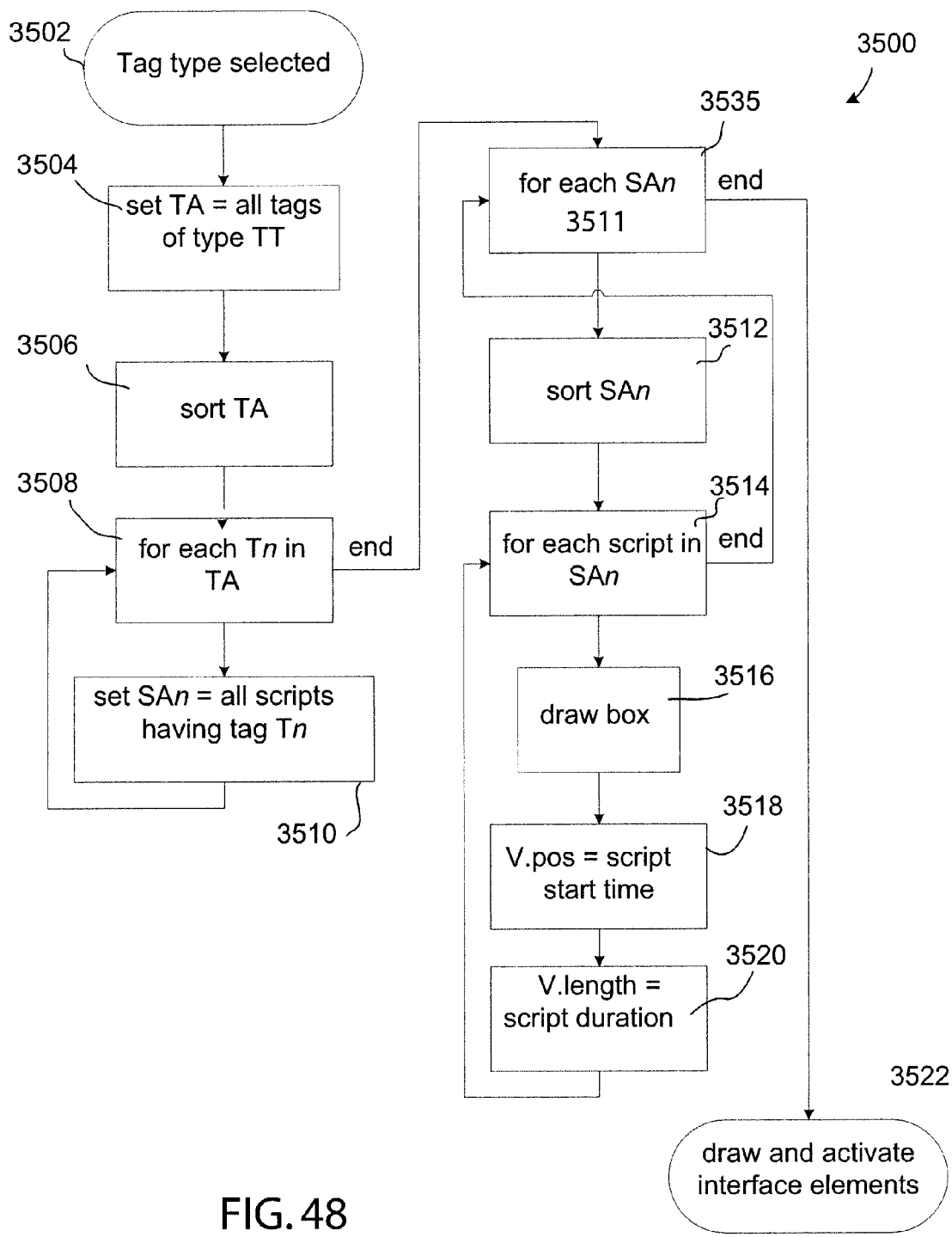

In some examples a process 3500, as shown in FIG. 48, is used to generate the text views like those in FIGS. 28A through 28I. The process 3500 begins 3502 when a user requests an arrangement by character, location, or some other tag type TT. Tags are already associated with lines of text as discussed above. An array TA of tags is created 3504 containing all tags of the type TT (e.g., all character names or all locations). This array TA is sorted 3506 by some relevant attribute, such as alphabetically. For each tag Tn in the array TA (3508), an array of sections SA.n is created 3510 containing each section that has tag Tn associated with it. Within each section array SA.n (3511), the sections are sorted 3512 by the start times associated with each section. Columns are then created for each array SA.n (3514) by drawing 3516 a box for each script in the array at a vertical position determined 3518 by the section's start time and a length determined 3520 by its duration. Other interface elements are then drawn and activated 3522 to complete the user interface.

Figure 49:
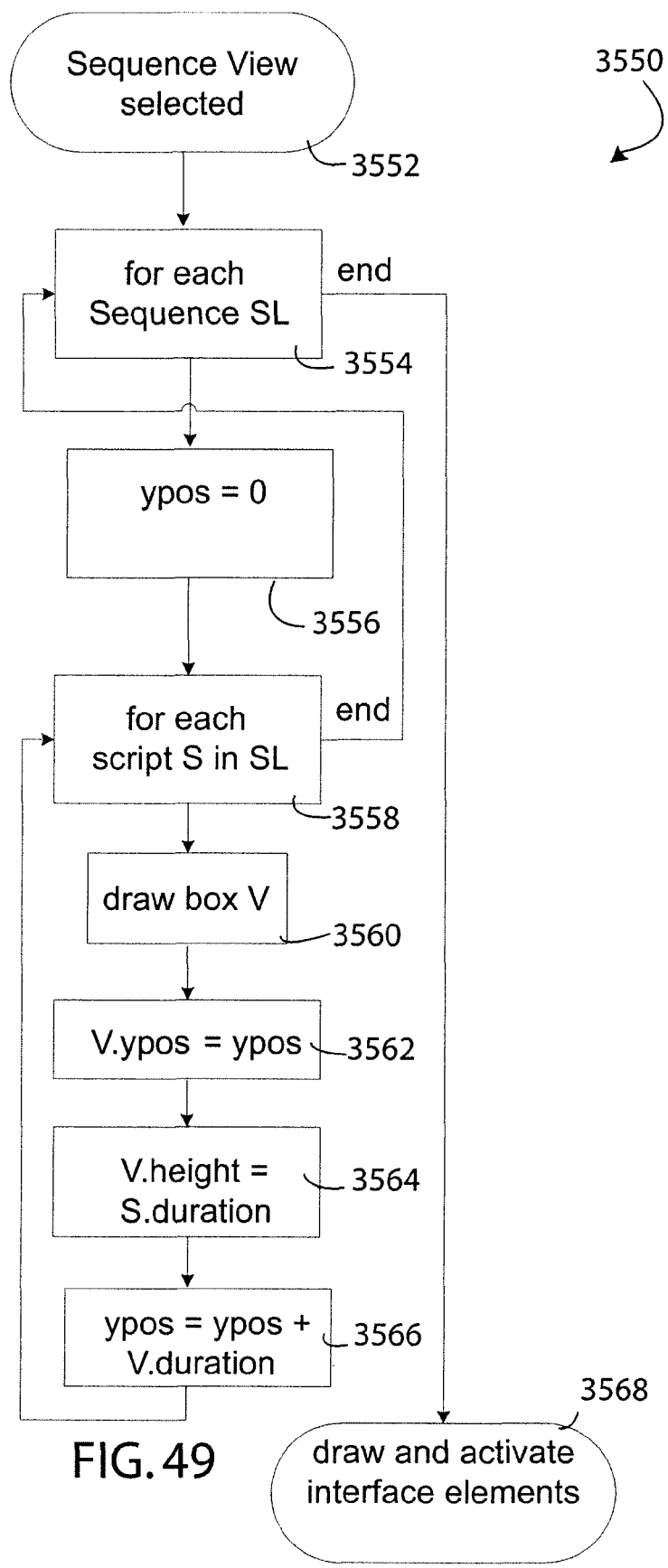

In some examples, a process 3550, as shown in FIG. 49, is used to generate sequences, such as those in FIG. 34D. Starting when the sequence view is selected 2552, each sequence is taken in turn 3554. The vertical position for the first script in the sequence is set to zero 3556. For each script in the sequence 3558, a box is drawn 3560 and its vertical position is set 3562 to the current vertical position. The height of the box is set 3564 to a height corresponding to the duration of the script, and the current vertical position is increased 3566 by the height of the current script. Once this has repeated for each script in each sequence, the appropriate interface elements are drawn and activated 3568.

Figure 50:
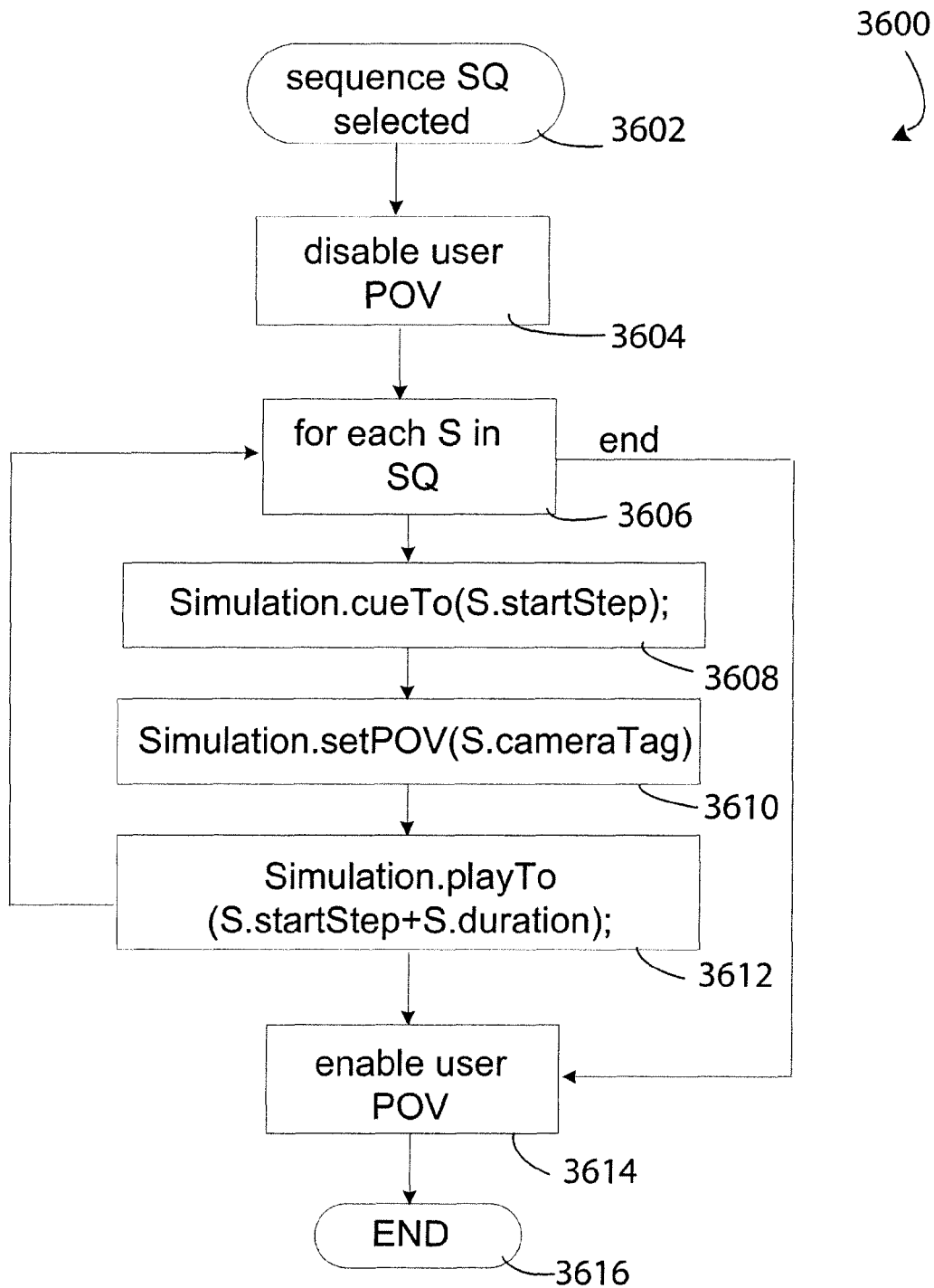

Once generated, a sequence may be played back like a movie using a process 3600, as shown in FIG. 50. After a sequence is selected 3602, the user POV control 140 is disabled 3604. For each script S in the sequence of scripts (3606), the simulation is given commands to cue 3608 to the starting time step of the script, set 3610 the point of view to the POV associated with the script, and play 3612 the simulation for the duration of the script. After each script has been played 3606, the user POV control is re-enabled 3614 and the process ends 3616.

Figure 51:
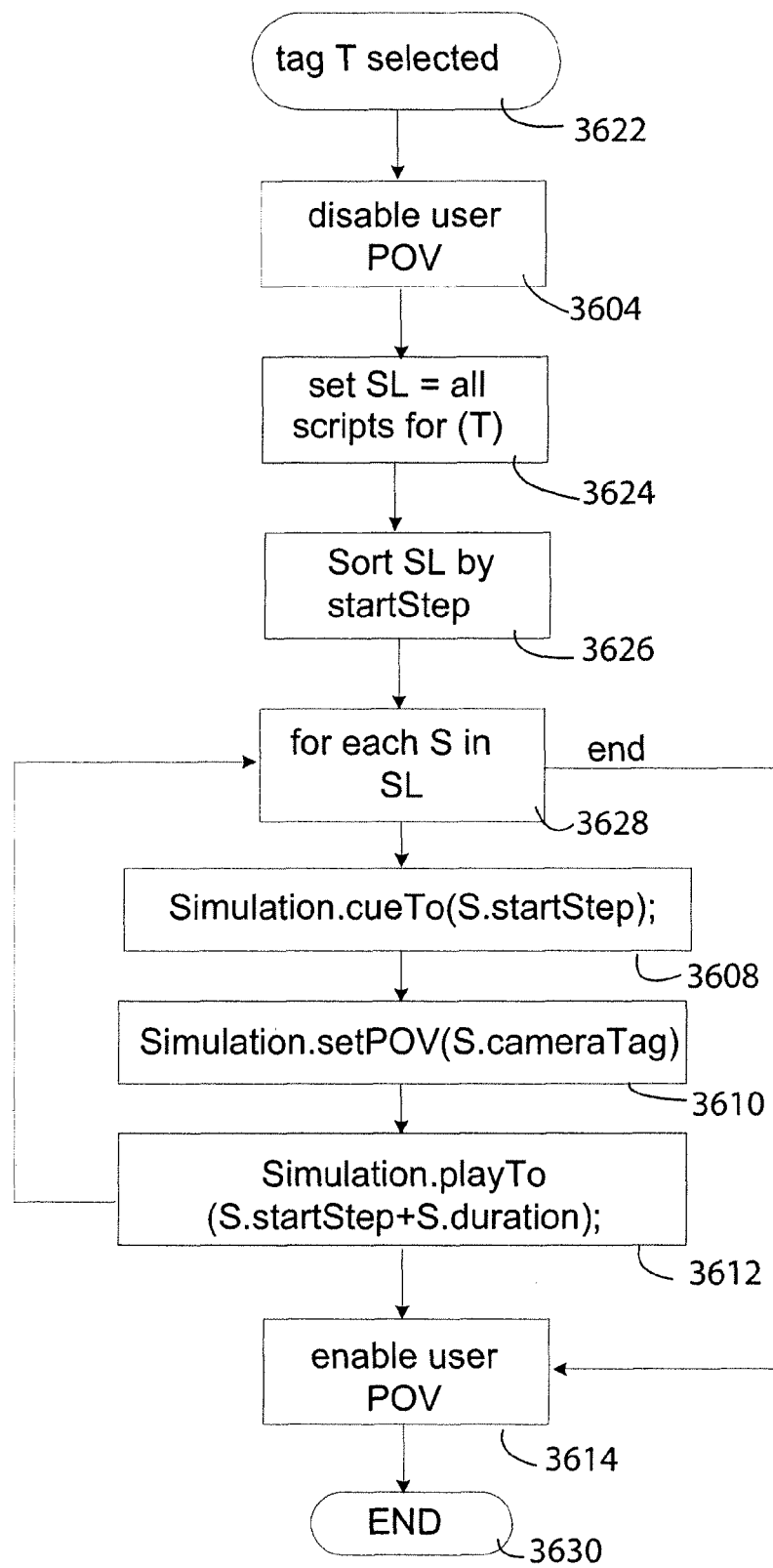

A similar process 3620 may be used to create and play back a sequence of scripts corresponding to a single tag, such as a particular character or location, as shown in FIG. 51. When the tag is selected 3622, the user POV control 140 is disabled 3604 as before. A set of scripts is identified 3624 as all the scripts including the selected tag. This set of scripts is sorted 3626 by the starting time step of the scripts, and for each script in the sorted set (3628), the steps 3608-3612 from process 3600 are carried out to play back the scripts. User POV control is then re-enabled 3614 and the process ends 3630.

Figure 52:
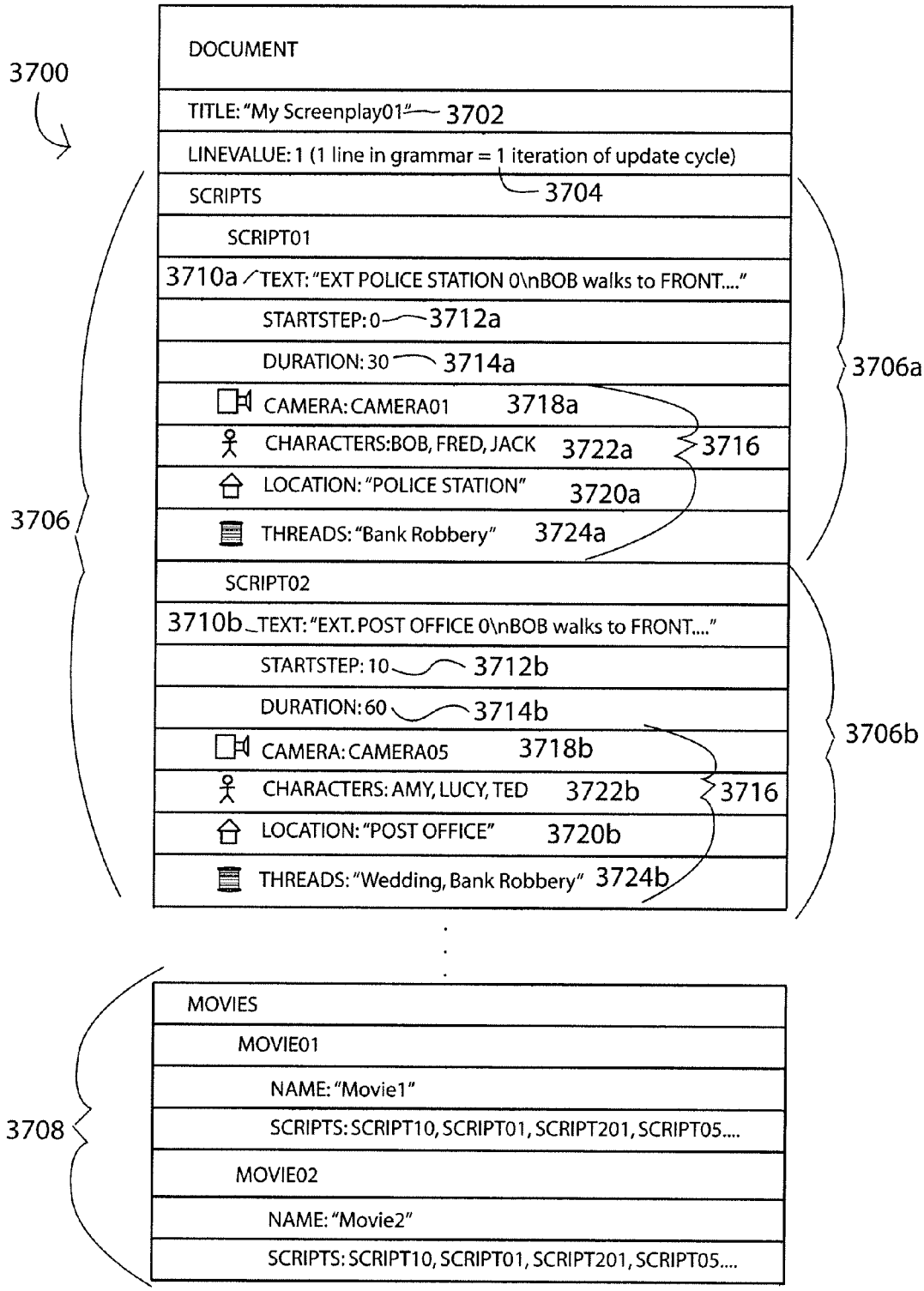
FIG. 52 is a block diagram of a data structure for script storage.

In some examples, storage for persistence between authoring sessions is implemented using the data structure shown in FIG. 52. A block 3700 of data defining the elements of a document contains a title 3702, line value 3704, a script block 3706, and a block 3708 of sequences. The line value 3704 corresponds to a default setting chosen by the user configuring the system for scripting. A line value of one indicates one line equals one time step in the simulation. A script block 3706 contains a sequence of scripts 3706*a/b*, etc. Scripts 3706*a/b* store the text 3710*a/b* of a script, the start step 3712*a/b*, and the duration 3714*a/b* as parsed by the text processor. In a screenwriting example, tags 3716 are stored using named variables, including reserved blocks for the camera 3718*a/b*, location 3720*a/b*, characters 3722*a/b*, and threads 3724*a/b* associated with a script 3706*a/b* as determined by the text processor 126. The sequence block 3708 contains a collection of named custom sequences, such as movies described above.

Other implementations are within the scope of the following claims and other claims to which the applicant may be entitled.

What is claimed is:

1. A method comprising:
    receiving input from a text editor containing lines of text of a script;
    identifying commands to control objects in a simulation in the lines of text in the editor;
    receiving an indication that the input changed a command in a particular line of text;
    identifying an object in the simulation affected by the changed command;
    applying the changed command to the identified object to update a state of the object at an increment of time in the simulation associated with the line containing the changed command; and
    displaying the simulation in a graphical display.

2. The method of claim 1 in which
    the object is a camera, and applying the command comprises changing a point of view from which the display of the simulation is rendered.

3. A method comprising:
    receiving input from a text editor containing lines of text of a script;
    associating lines of the script with objects in the simulation;
    associating the script with a start time corresponding to a first increment of time in the simulation;
    associating the script with an end time corresponding to a second increment of time in the simulation;
    displaying the simulation in a graphical display; and
    in the display of the simulation, highlighting displayed objects associated with lines of the script and associated with increments of time in the simulation greater than the start time and less than the end time.

4. The method of claim 3 in which associating the script with an end time comprises:
    identifying a duration of the script and adding a number of increments of time in the simulation corresponding to the duration to the increment of time corresponding to the start time.

5. A method comprising:
    associating a first object in a simulation with a first line of text referencing the first object in a first script comprising lines of text bearing commands that control objects in the simulation;
    associating the first line of text with a first increment of time in the simulation;
    associating a section of the first script including the first line of text with the first object, the section of the script including second lines of text associated with increments of time near the first increment of time;
    storing the association of the section of the script with the object.

6. The method of claim 5 further comprising:
    for each line of the first script, for each object referenced by the line, determining a type of the object and associating the type with the line.

7. The method of claim 6 in which determining the type of the object is based on a context of commands in the line referencing the object.

8. A method comprising:
    within a set of scripts each comprising lines of text bearing commands that control objects in a simulation, identifying scripts having stored associations with each of a set of the objects;

within each script of the set, identifying a starting increment of time and an ending increment of time to which the lines of text in the script correspond in the simulation; and displaying, in a graphical display, representations of each of the identified scripts sorted into columns corresponding to the objects of the set referenced by each identified script, and arranged vertically according to the starting and ending increments of time of each identified script.

9. The method of claim 8 in which each script of the set comprises a dynamically selected set of contiguous lines in a document.

10. The method of claim 8 in which the set of objects is dynamically determined based on a type associated with each object and the scripts are identified by their association with the type.

11. The method of claim 8 further comprising;
displaying, in the graphical display, a rendered image of a set of the objects in the simulation showing a state of each object in the set at an increment of time in the simulation; and
displaying an indication in the representations of the identified scripts of the increment of time displayed in the rendered image.

12. The method of claim 11 further comprising:
displaying, in the graphical display, a sequence of rendered images of the set of objects showing the state of each object in the set at a corresponding sequence of increments of time in the simulation;
associating an active status with each object at each increment of time in the sequence for which the object is associated with one of the identified scripts including lines corresponding to the increment of time; and
graphically indicating the active status of any of the objects in the image that have an active status.

13. The method of claim 8 in which arranging the representations vertically comprises:
displaying each representation at a top vertical position based on the start time of the represented script, and with a vertical extent within its column corresponding to a number of increments of time between the start time and the end time of the represented script,
corresponding increments of time in each column being aligned.

14. The method of claim 8 further comprising:
identifying a camera position associated with each identified script;
receiving user input indicating one of the objects of the set of objects;
setting a state of the simulation to a saved state representing the state at the start step of first script in the column corresponding to the selected object;
setting a point of view used to produce rendered images of the simulation to the camera position identified for the first script in the column corresponding to the selected object;
determine a sequence of increments of time in the simulation defined by the starting and ending increments of time associated with each script in the column corresponding to the selected object; and
displaying, in the graphical display, a sequence of rendered images of a set of the objects in the simulation showing a state of each object in the set at the sequence of increments of time.

15. A system comprising:
a graphical display;
a memory storing lines of text bearing commands that control objects in a simulation; and
a processor configured to identify scripts comprising sets of the lines of text having stored associates with each of a set of the objects;
within each identified script, identify a starting increment of time and an ending increment of time to which the lines of text in the script correspond in the simulation; and
display, on the graphical display, representations of each of the identified scripts sorted into columns corresponding to the objects of the set referenced by each identified script, and arranged vertically according to the starting and ending increments of time of each identified script.

16. The system of claim 15 in which the processor is further configured to:
display, in the graphical display, a rendered image of a set of the objects in the simulation showing a state of each object in the set at an increment of time in the simulation; and
display an indication in the representations of the identified scripts of the increment of time displayed in the rendered image.

17. The system of claim 16 in which the processor is further configured to:
display, in the graphical display, a sequence of rendered images of the set of objects showing the state of each object in the set at a corresponding sequence of increments of time in the simulation;
associate an active status with each object at each increment of time in the sequence for which the object is associated with one of the identified scripts including lines corresponding to the increment of time; and
graphically indicate the active status of any of the objects in the image that have an active status.

18. The system of claim 15 in which the processor is further configured to:
identify a camera position associated with each identified script;
receive user input indicating one of the objects of the set of objects;
set a state of the simulation to a saved state representing the state at the start step of first script in the column corresponding to the selected object;
set a point of view used to produce rendered images of the simulation to the camera position identified for the first script in the column corresponding to the selected object;
determine a sequence of increments of time in the simulation defined, by the starting and ending increments of time associated with each script in the column corresponding to the selected object
display, in the graphical display, a sequence of rendered images of a set of the objects in the simulation showing a state of each object in the set at the sequence of increments of time.

19. A computer program stored on a computer readable storage medium and comprising instructions to cause a computer to:
access a memory storing lines of text bearing commands that control objects in a simulation;
identify scripts comprising sets of lines of text having stored associates with each of a set of the objects;
within each identified script, identify a starting increment of time and an ending increment of time to which the lines of text in the script correspond in the simulation; and
display, on a graphical display, representations of each of the identified scripts sorted into columns corresponding to the objects of the set referenced by each identified script, and arranged vertically according to the starting and ending increments of time of each identified script.

20. The program of claim 19 further comprising instructions to:
- display, in the graphical display, a rendered image of a set of the objects in the simulation showing a state of each object in the set at an increment of time in the simulation; and
- display an indication in the representations of the identified scripts of the increment of time displayed in the rendered image.

21. The program of claim 20 further comprising instructions to:
- display, in the graphical display, a sequence of rendered images of the set of objects showing the state of each object in the set at a corresponding sequence of increments of time in the simulation;
- associate an active status with each object at each increment of time in the sequence for which the object is associated with one of the identified scripts including lines corresponding to the increment of time; and
- graphically indicate the active status of any of the objects in the image that have an active status.

22. The program of claim 19 further comprising instructions to:
- identify a camera position associated with each identified script;
- receive user input indicating one of the objects of the set of objects;
- set a state of the simulation to a saved state representing the state at the start step of first script in the column corresponding to the selected object;
- set a point of view used to produce rendered images of the simulation to the camera position identified for the first script in the column corresponding to the selected object;
- determine a sequence of increments of time in the simulation defined by the starting and ending increments of time associated with each script in the column corresponding to the selected object
- display, in the graphical display, a sequence of rendered images of a set of the objects in the simulation showing a state of each object in the set at the sequence of increments of time.

23. A computer program stored on a computer readable storage medium and comprising instructions to cause a computer to:
- retrieve from a memory a set of definitions of objects in a simulation;
- maintain a state of each of the objects in the simulation;
- retrieve from the memory a set of scripts comprising lines of text including commands to control the objects in the simulation at increments of time in the simulation corresponding to lines in the scripts;
- update the state of each object in the simulation at each increment of time according to commands for the object in lines of the scripts associated with the increment of time;
- display, in a graphical display, a sequence of rendered imaged of the objects in the simulation.

24. The program of claim 23 further comprising instructions to:
- receive, from the user, a selection of a first point of view and an instruction to advance the simulation; and
- display the sequence of rendered images by:
  - displaying a first image rendered from the first point of view and corresponding to a first increment of time in the simulation, and
  - displaying subsequent images in turn according to a timeline of increments of time in the simulation.

25. The program of claim 24 further comprising instructions to:
- receive, from the user, a selection of a second point of view; and
- further display the sequence of rendered images by:
  - beginning from the time the selection of the second point of view is received, displaying subsequent images rendered from the second point of view in turn according to the same timeline of increments of time.

26. The program of claim 25 in which receiving the selection of a second point of view comprises receiving a series of instructions controlling movement of the point of view in the simulation.

27. The program of claim 26 in which the series of instructions comprise instructions from a video game controller.

28. The program of claim 24 further comprising instructions to:
- receive, from the user, a selection of an increment of time; and
- further display the sequence of rendered images by:
  - displaying a second image corresponding to the selected increment of time and
  - displaying subsequent images in turn according to the timeline of increments of time in the simulation, continuing from the selected increment of time.

29. The program of claim 28 in which receiving the selection of the increment of time comprises receiving a forward or rewind command.

30. The program, of claim 24 in which
the first increment of time is an increment of time associated with an initial line of text in one of the scripts.

31. The program of claim 23 further comprising instructions to:
- receive a user selection of a sequence of scripts;
- display the sequence of rendered images by:
  - displaying a rendered image corresponding to the increment of time in the simulation corresponding to each line of each of the scripts in the sequence, in an order determined by a definition of the sequence.

32. The program of claim 31 in which
each rendered image is rendered from a point of view designated by a line in a script of the sequence corresponding to the increment of time of the image.

33. The program of claim 31 in which
each rendered image is rendered from a point of view designated by the user, at the time the image is rendered.

34. The program of claim 31 in which
the order of scripts determined by the definition of the sequence differs from an order of the increments of time in the simulation associated with the lines of the scripts.

35. The program of claim 31 in which
receiving the user selection of the sequence of scripts comprises receiving a user indication of one of the objects in the simulation; and
the sequence comprises each script of the set of scripts containing a line including a command for the indicated object,
the order of the scripts determined by a timeline of the increments of time in the simulation.

36. The program of claim 31 in which
receiving the user selection of the sequence of scripts comprises receiving a user indication of a location in the simulation; and
the sequence comprises each script of the set of scripts containing a line including a command for objects located near the indicated location, the order of the scripts determined by a timeline of the increments of time in the simulation.

37. The program of claim 31 in which
receiving the user selection of the sequence of scripts comprises receiving a user indication of an attribute of a subset of the scripts; and the sequence comprises each script of the set of scripts having the attribute, the order of the scripts determined by a timeline of the increments of time in the simulation.

38. The program of claim 37 in which the attribute is an association with a storyline.

39. The program of claim 23 in which the set of definitions and the set of scripts are also stored on the computer readable medium.

40. An apparatus comprising:
   a signal output for a graphical display;
   a signal input for user input;
   a processor programmed to:
     retrieve from a memory a set of definitions of objects in a simulation;
     maintain a state of each, of the objects in the simulation;
     retrieve from the memory a set of scripts comprising lines of text including commands to control the objects in the simulation at increments of time in the simulation corresponding to lines in the scripts;
     update the state of each object in the simulation at each increment of time according to commands for the object in lines of the scripts associated with the increment of time;
     output on the signal output a sequence of rendered imaged of the objects in the simulation.

\* \* \* \* \*